(12) United States Patent
Carlisle et al.

(10) Patent No.: US 12,543,712 B2
(45) Date of Patent: Feb. 10, 2026

(54) GENETICALLY MODIFIED MOUSE WITH A DISRUPTION IN AN AANAT GENE

(71) Applicant: University of Pittsburgh—Of the Commonwealth System of Higher Education, Pittsburgh, PA (US)

(72) Inventors: Diane L. Carlisle, Pittsburgh, PA (US); Robert Max Friedlander, Pittsburgh, PA (US); Abhishek Jauhari, Pittsburgh, PA (US); Sergei Victorovich Baranov, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 762 days.

(21) Appl. No.: 17/800,348

(22) PCT Filed: Feb. 22, 2021

(86) PCT No.: PCT/US2021/019047
§ 371 (c)(1),
(2) Date: Aug. 17, 2022

(87) PCT Pub. No.: WO2021/168412
PCT Pub. Date: Aug. 26, 2021

(65) Prior Publication Data
US 2023/0210096 A1 Jul. 6, 2023

Related U.S. Application Data

(60) Provisional application No. 62/980,047, filed on Feb. 21, 2020.

(51) Int. Cl.
*A01K 67/027* (2024.01)
*A01K 67/0276* (2024.01)
*A61K 49/00* (2006.01)

(52) U.S. Cl.
CPC ...... *A01K 67/0276* (2013.01); *A61K 49/0008* (2013.01); *A01K 2217/075* (2013.01); *A01K 2227/105* (2013.01); *A01K 2267/035* (2013.01)

(58) Field of Classification Search
None
See application file for complete search history.

(56) References Cited

FOREIGN PATENT DOCUMENTS

| WO | WO 2011/011767 | 1/2011 |
|----|----------------|--------|
| WO | WO 2015/195621 | 12/2015 |

OTHER PUBLICATIONS

Roseboom (Mol. Brain Res., 1998, vol. 63, p. 189-197).*
Bouabe (Methods Mol. Biol., 2013, vol. 1064, p. 315-336).*
Uz (J. Pineal Res., 2001, vol. 30, No. 3, p. 166-170).*
Jauhari (J. Clin. Investigation, 2020, vol. 130, No. 6, p. 3124-3136).*
Kennaway (Melatonin research in mice: a review. Chronobiology International, 2019, vol. 36, No. 9, p. 1167-1183).*
Acevedo-Torres et al., "Mitochondrial DNA damage is a hallmark of chemically induced and the R6/2 transgenic model of Huntington's disease," DNA Repair (Amst), Jan. 2009, 8(1):126-136.
Acuña-Castroviejo et al., "Melatonin, mitochondria, and cellular bioenergetics," J. Pineal. Res., Mar. 2001, 30(2):65-74.
Baranov et al., "Mitochondria modulate programmed neuritic retraction," Proc. Natl. Acad. Sci. USA, Jan. 2019, 116(2):650-659.
Cai et al., "The cGAS-cGAMP-STING pathway of cytosolic DNA sensing and signaling," Mol. Cell, Apr. 2014, 54(2):289-296.
Campbell et al., "New and TALENted genome engineering toolbox," Circ. Res., Aug. 2013, 113(5):571-587.
Channabasavaiah et al., "Generating mouse models for biomedical research: technological advances," Dis. Model Mech., Jan. 2019, 12(1):dmm029462, 10 pages.
Chen et al., "Regulation and function of the cGAS-STING pathway of cytosolic DNA sensing," Nat. Immunol., Sep. 2016, 17(10):1142-1149.
Dalle-Donne et al., "Protein carbonyl groups as biomarkers of oxidative stress," Clin. Chim. Acta., Mar. 2003, 329(1-2):23-38.
Esposito et al., "Antiinflammatory activity of melatonin in central nervous system," Curr. Neuropharmacol., Sep. 2010, 8(3):228-242.
Fink et al., "Reduction of post-traumatic brain injury and free radical production by inhibition of the caspase-1 cascade," Neuroscience, Nov. 1999, 94(4):1213-1218.
Folgueras et al., "Mouse Models to Disentangle the Hallmarks of Human Aging," Circ. Res., Sep. 2018, 123(7):905-924.
Friedlander et al., "Expression of a dominant negative mutant of interleukin-1β converting enzyme in transgenic mice prevents neuronal cell death induced by trophic factor withdrawal and ischemic brain injury," J. Exp. Med., Mar. 1997, 185(5):933-940.
Friedlander et al., "Inhibition of ICE slows ALS in mice," Nature, Jul. 1997, 388(6637):31.
Gao et al., "Cyclic GMP-AMP synthase is an innate immune sensor of HIV and other retroviruses," Science, Aug. 2013, 341(6148):903-906.
Goto et al., "Melatonin content of the pineal gland in different mouse strains," J. Pineal. Res., Apr. 1989, 7(2):195-204.
Halliwell et al., "Lipid peroxidation: its mechanism, measurement, and significance," Am. J. Clin. Nutr., May 1993, 57(5 Suppl):715S-725S.
Hashiguchi et al., "Establishment of human cell lines lacking mitochondrial DNA," Methods Mol. Biol., Jan. 2009, 554:383-391.
International Preliminary Report on Patentability in International Appln. No. PCT/US2021/019047, mailed on Sep. 1, 2022, 7 pages.
International Search Report and Written Opinion in International Appln. No. PCT/US2021/019047, mailed on May 19, 2021, 10 pages.

(Continued)

*Primary Examiner* — Michael C Wilson
(74) *Attorney, Agent, or Firm* — Fish & Richardson P.C.

(57) ABSTRACT

This document relates to non-human animal models (e.g., non-human mammalian models such as mouse models) for aging (e.g., neural aging). For example, non-human animal models having reduced or eliminated levels of aralkylamine N-acetyltransferase (AANAT) polypeptide expression are provided.

3 Claims, 49 Drawing Sheets
Specification includes a Sequence Listing.

(56) References Cited

OTHER PUBLICATIONS

Jauhari et al., "Melatonin inhibits cytosolic mitochondrial DNA-induced neuroinflammatory signaling in accelerated aging and neurodegeneration," J. Clin. Invest., Jun. 2020, 130(6):3124-3136.
Jauhari et al., "Regulation of miR-34 family in neuronal development," Mol. Neurobiol., Feb. 2018, 55(2):936-945.
Kalliolia et al., "Plasma melatonin is reduced in Huntington's disease," Mov. Disord., Oct. 2014, 29(12):1511-1515.
Kasahara et al., "Genetic variation of melatonin productivity in laboratory mice under domestication," Proc. Natl. Acad. Sci. USA, Apr. 2010, 107(14):6412-6417.
Kaye et al., "The significance of age-related enlargement of the cerebral ventricles in healthy men and women measured by quantitative computed X-ray tomography," J. Am. Geriatr. Soc., Mar. 1992, 40(3):225-231.
Khairova et al., "A potential role for pro-inflammatory cytokines in regulating synaptic plasticity in major depressive disorder," Int. J. Neuropsychopharmacol., May 2009, 12(4):561-578.
Klein, "Arylalkylamine N-acetyltransferase: 'the Timezyme'," J. Biol. Chem., Feb. 2007, 282(7):4233-4237.
Lee et al., "Melatonin attenuates gray and white matter damage in a mouse model of transient focal cerebral ischemia," J. Pineal. Res., Jan. 2005, 38(1):42-52.
Li et al., "Functional role and therapeutic implications of neuronal caspase-1 and -3 in a mouse model of traumatic spinal cord injury," Neuroscience, Sep. 2000, 99(2):333-342.
Li et al., "Functional role of caspase-1 and caspase-3 in an ALS transgenic mouse model," Science, Apr. 2000, 288(5646):335-339.
Li et al., "The cGAS-cGAMP-STING pathway connects DNA damage to inflammation, senescence, and cancer," J. Exp. Med., May 2018, 215(5):1287-1299.
Lin et al., "Mitochondrial dysfunction and oxidative stress in neurodegenerative diseases," Nature, Oct. 2006, 443(7113):787-795.
Liu et al., "Decreased melatonin levels in postmortem cerebrospinal fluid in relation to aging, Alzheimer's disease, and apolipoprotein E-ε4/4 genotype," J. Clin. Endocrinol. Metab., Jan. 1999, 84(1):323-327.
MacDonald et al., "A novel gene containing a trinucleotide repeat that is expanded and unstable on Huntington's disease chromosomes," Cell, Mar. 1993, 72(6):971-983.
Madabhushi et al., "DNA Damage and Its Links to Neurodegeneration," Neuron, Jul. 2014, 83(2):266-282.
Mani et al., "Design, engineering, and characterization of zinc finger nucleases," Biochem. Biophys. Res. Commun., Sep. 2005, 335(2):447-457.
Mecocci et al., "Oxidative damage to mitochondrial DNA is increased in Alzheimer's disease," Ann. Neurol., Nov. 1994, 36(5):747-751.
Nakahira et al., "Autophagy proteins regulate innate immune responses by inhibiting the release of mitochondrial DNA mediated by the NALP3 inflammasome," Nat. Immunol., Mar. 2011, 12(3):222-230.
Navabpour et al., "A neuroscientist's guide to transgenic mice and other genetic tools," Neurosci. Biobehav. Rev., Jan. 2020, 108:732-748.
O'Brien et al., "Differentiation of human neural stem cells into motor neurons stimulates mitochondrial biogenesis and decreases glycolytic flux," Stem Cells Dev., Sep. 2015, 24(17):1984-1994.
Ona et al., "Inhibition of caspase-1 slows disease progression in a mouse model of Huntington's disease," Nature, May 1999, 399(6733):263-267.
Pelletier et al., "Mouse Genome Engineering via CRISPR-Cas9 for Study of Immune Function," Immunity, Jan. 2015, 42(1):18-27.
Perry et al., "Microglia in neurodegenerative disease," Nat. Rev. Neurol., Apr. 2010, 6(4):193-201.
Raupach et al., "Caspase-1-mediated activation of interleukin-1β (IL-1β) and IL-18 contributes to innate immune defenses against *Salmonella enterica* serovar Typhimurium infection," Infect. Immun., Aug. 2006, 74(8):4922-4926.
Reiter et al., "Melatonin ameliorates neurologic damage and neurophysiologic deficits in experimental models of stroke," Ann. NY Acad. Sci., Jan. 2006, 993(1):35-47.
Reiter et al., "Melatonin reduces oxidant damage and promotes mitochondrial respiration: implications for aging," Ann. NY Acad. Sci., Aug. 2016, 61(3):238-250.
Rolig et al., "Linking DNA damage and neurodegeneration," Trends Neurosci., Sep. 2000, 23(9):417-424.
Roseboom et al. "Natural melatonin 'knockdown' in C57BU6J mice: rare mechanism truncates serotonin N-acetyltransferase," Mol. Brain Res., Dec. 1998, 63(1):189-197.
Shimomura et al. "Genetic suppression of the circadian Clock mutation by the melatonin biosynthesis pathway," Proc. Natl. Acad. Sci. USA, May 2010, 107(18):8399-8403.
Stack et al., "Chronology of behavioral symptoms and neuropathological sequela in R6/2 Huntington's disease transgenic mice," J. Comp. Neurol., Oct. 2005, 490(4):354-370.
Sun et al., "Cyclic GMP-AMP synthase is a cytosolic DNA sensor that activates the type I interferon pathway," Science, Feb. 2013, 339(6121):786-791, 10 pages.
Suofu et al., "Dual role of mitochondria in producing melatonin and driving GPCR signaling to block cytochrome c release," Proc. Natl. Acad. Sci. USA, Sep. 2017, 114(38):E7997-E8006.
Trettel et al., "Dominant phenotypes produced by the HD mutation in ST HDH Q111 striatal cells," Hum. Mol. Genet., Nov. 2000, 9(19):2799-2809.
Tyagi et al., "Effect of melatonin on neuroinflammation and acetylcholinesterase activity induced by LPS in rat brain," Eur. J. Pharmacol., Aug. 2010, 640(1-3):206-210.
Van de Veerdonk et al., "Inflammasome activation and IL-1β and IL-18 processing during infection," Trends Immunol., Mar. 2011, 32(3):110-116.
Vonsattel et al., "Twenty-first century brain banking. Processing brains for research: the Columbia University methods," Acta Neuropathol., May 2008 115(5):509-532.
Wakatsuki e al., "Melatonin protects against ischemia and reperfusion-induced oxidative lipid and DNA damage in fetal rat brain," J. Pineal. Res., Apr. 1999, 26(3):147-152.
Wang et al., "An ultra-high sensitive bioanalytical method for plasma melatonin by liquid chromatography-tandem mass spectrometry using water as calibration matrix," J. Chromatogr. B. Analyt. Technol. Biomed. Life Sci., Aug. 2011, 879(23):2259-2264.
Wang et al., "Inhibitors of cytochrome c release with therapeutic potential for Huntington's disease," J. Neurosci., Sep. 2008, 28(38):9473-9485.
Wang et al., "Methazolamide and melatonin inhibit mitochondrial cytochrome C release and are neuroprotective in experimental models of ischemic injury," Stroke, May 2009, 40(5):1877-1885.
Wang et al., "The melatonin MT1 receptor axis modulates mutant Huntingtin-mediated toxicity," J. Neurosci., Oct. 2011, 31(41):14496-14507.
Wassef et al., "Versatile and precise gene-targeting strategies for functional studies in mammalian cell lines," Methods, May 2017, 121-122:45-54 (Abstract Only).
West et al., "Mitochondrial DNA in innate immune responses and inflammatory pathology," Nat. Rev. Immunol., Jun. 2017, 17(6):363-375.
Wishart et al., "Synaptic vulnerability in neurodegenerative disease," J. Neuropathol. Exp. Neurol., Aug. 2006, 65(8):733-739.
Xiao et al., "The cGAS-STING pathway for DNA sensing," Mol. Cell, Jul. 2013, 51(2):135-139.
Yablonska et al., "Mutant huntingtin disrupts mitochondrial proteostasis by interacting with TIM23," Proc. Natl. Acad. Sci. USA, Aug. 2019, 116(33):16593-16602.
Yakes et al., "Mitochondrial DNA damage is more extensive and persists longer than nuclear DNA damage in human cells following oxidative stress," Proc. Natl. Acad. Sci. USA, Jan. 1997, 94(2):514-519.
Yamanaka et al. "Cryptochrome deficiency enhances transcription but reduces protein levels of pineal Aanat," J. Mol. Endocrinol., Oct. 2018, 61(4):219-229.
Yang et al., "Mitochondrial DNA damage and repair in neurodegenerative disorders," DNA Repair, Jul. 2008, 7(7):1110-1120.

(56) References Cited

OTHER PUBLICATIONS

Yano et al., "Inhibition of mitochondrial protein import by mutant huntingtin," Nat. Neurosci., Jun. 2014, 17(6):822-831.

Zhang et al., "Fundamental role of the Rip2/caspase-1 pathway in hypoxia and ischemia-induced neuronal cell death," Proc. Natl. Acad. Sci. USA, Dec. 2003, 100(26):16012-16017.

Zhang et al., "Melatonin inhibits the caspase-1/cytochrome c/caspase-3 cell death pathway, inhibits MTI receptor loss and delays disease progression in a mouse model of amyotrophic lateral sclerosis," Neurobiol. Dis., Jul. 2013, 55:26-35.

Zhang et al., "Melatonin: a well-documented antioxidant with conditional pro-oxidant actions," J. Pineal. Res., Sep. 2014, 57(2):131-146.

* cited by examiner

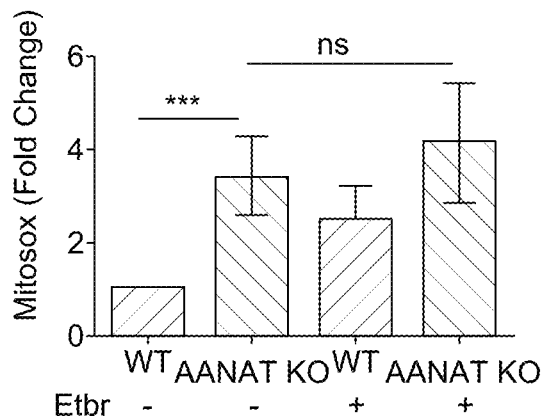 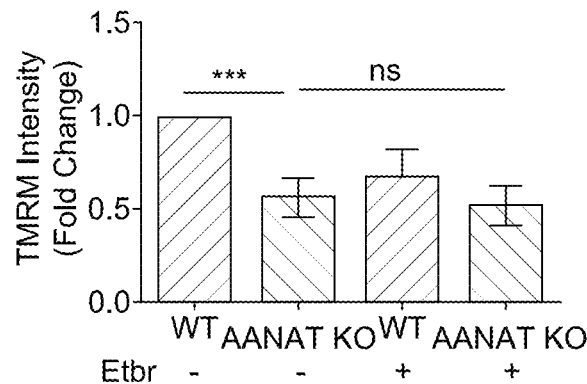
FIG. 8D    FIG. 8E
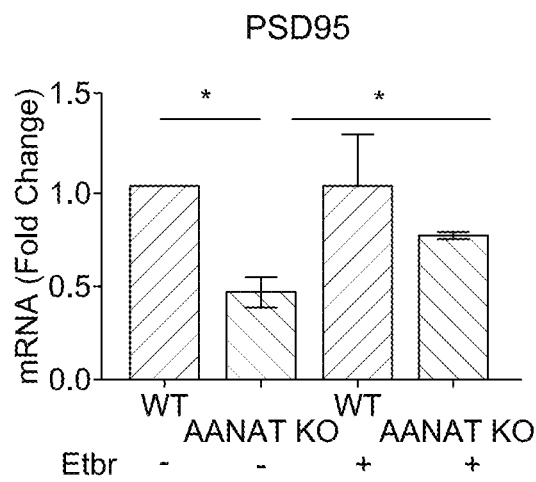 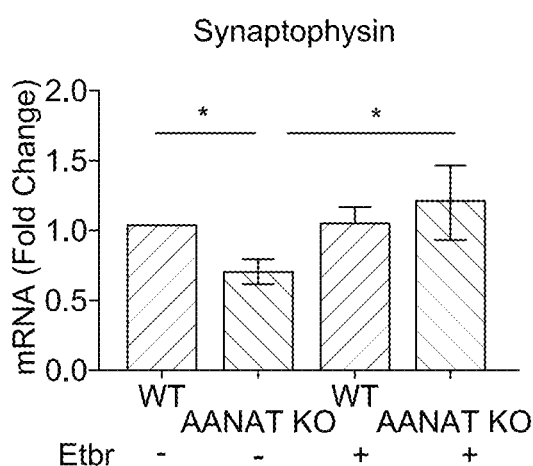
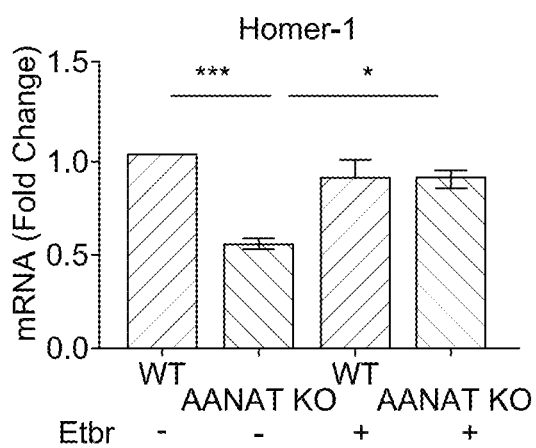 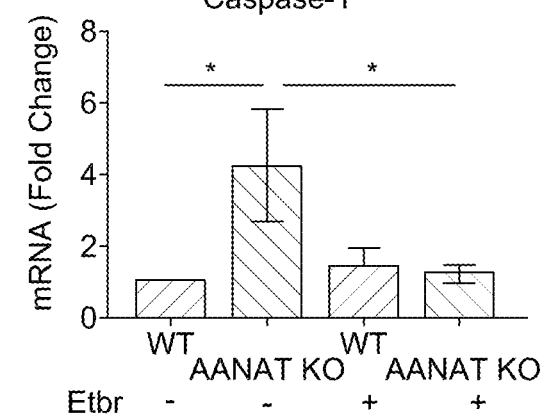
FIG. 8F

SEQUENCE LISTING

<160> NUMBER OF SEQ ID NOS: 34

<210> SEQ ID NO 1
<211> LENGTH: 60
<212> TYPE: DNA
<213> ORGANISM: Artificial
<220> FEATURE:
<223> OTHER INFORMATION: Aanat guide sequence

<400> SEQUENCE: 1
taatacgact cactataggt gatgttcaac atgggcgtcg ttttagagct agaaatagca    60

<210> SEQ ID NO 2
<211> LENGTH: 60
<212> TYPE: DNA
<213> ORGANISM: Artificial
<220> FEATURE:
<223> OTHER INFORMATION: Aanat guide sequence

<400> SEQUENCE: 2
taatacgact cactataggg ggagacagcg gttcccaacg ttttagagct agaaatagca    60

<210> SEQ ID NO 3
<211> LENGTH: 20
<212> TYPE: DNA
<213> ORGANISM: Artificial
<220> FEATURE:
<223> OTHER INFORMATION: Oligonucleotide primer

<400> SEQUENCE: 3
gccccagata tagcattccc    20

<210> SEQ ID NO 4
<211> LENGTH: 20
<212> TYPE: DNA
<213> ORGANISM: Artificial
<220> FEATURE:
<223> OTHER INFORMATION: Oligonucleotide primer

<400> SEQUENCE: 4
gttcatcctg ttcctgctcc                                                    20

<210> SEQ ID NO 5
<211> LENGTH: 23
<212> TYPE: DNA
<213> ORGANISM: Artificial
<220> FEATURE:
<223> OTHER INFORMATION: Oligonucleotide primer

<400> SEQUENCE: 5
aatctaccat cctccgtgaa acc                                                23

<210> SEQ ID NO 6
<211> LENGTH: 25
<212> TYPE: DNA
<213> ORGANISM: Artificial
<220> FEATURE:
<223> OTHER INFORMATION: Oligonucleotide primer

<400> SEQUENCE: 6
tcagtttagc taccccaag tttaa                                               25

<210> SEQ ID NO 7
<211> LENGTH: 19
<212> TYPE: DNA
<213> ORGANISM: Artificial
<220> FEATURE:
<223> OTHER INFORMATION: Oligonucleotide primer

<400> SEQUENCE: 7
tcctccgtga aaccaacaa                                                     19

<210> SEQ ID NO 8
<211> LENGTH: 18
<212> TYPE: DNA
<213> ORGANISM: Artificial
<220> FEATURE:
<223> OTHER INFORMATION: Oligonucleotide primer

<400> SEQUENCE: 8
agcgagaaga ggggcatt                                                      18

<210> SEQ ID NO 9
<211> LENGTH: 24
<212> TYPE: DNA
<213> ORGANISM: Artificial
<220> FEATURE:
<223> OTHER INFORMATION: Oligonucleotide primer

<400> SEQUENCE: 9
accggacaag ctaaagaagg tgct                                               24

<210> SEQ ID NO 10
<211> LENGTH: 24
<212> TYPE: DNA
<213> ORGANISM: Artificial
<220> FEATURE:

<223> OTHER INFORMATION: Oligonucleotide primer

<400> SEQUENCE: 10
gcagcaggcg ttccacaact ttat                                    24

<210> SEQ ID NO 11
<211> LENGTH: 24
<212> TYPE: DNA
<213> ORGANISM: Artificial
<220> FEATURE:
<223> OTHER INFORMATION: Oligonucleotide primer

<400> SEQUENCE: 11
gtcctctata agtccctaag catg                                    24

<210> SEQ ID NO 12
<211> LENGTH: 20
<212> TYPE: DNA
<213> ORGANISM: Artificial
<220> FEATURE:
<223> OTHER INFORMATION: Oligonucleotide primer

<400> SEQUENCE: 12
aagatcaacc gcaagtaccc                                         20

<210> SEQ ID NO 13
<211> LENGTH: 19
<212> TYPE: DNA
<213> ORGANISM: Artificial
<220> FEATURE:
<223> OTHER INFORMATION: Oligonucleotide primer

<400> SEQUENCE: 13
cacaaggaca aggacggag                                          19

<210> SEQ ID NO 14
<211> LENGTH: 21
<212> TYPE: DNA
<213> ORGANISM: Artificial
<220> FEATURE:
<223> OTHER INFORMATION: Oligonucleotide primer

<400> SEQUENCE: 14
atgcagaacc acagagtgta g                                       21

<210> SEQ ID NO 15
<211> LENGTH: 20
<212> TYPE: DNA
<213> ORGANISM: Artificial
<220> FEATURE:
<223> OTHER INFORMATION: Oligonucleotide primer

<400> SEQUENCE: 15
tctgtattca cgccctgttg                                         20

<210> SEQ ID NO 16
<211> LENGTH: 23
<212> TYPE: DNA
<213> ORGANISM: Artificial
<220> FEATURE:
<223> OTHER INFORMATION: Oligonucleotide primer

<400> SEQUENCE: 16
gataaattgc ttcctctttg ccc                                     23

```
<210> SEQ ID NO 17
<211> LENGTH: 20
<212> TYPE: DNA
<213> ORGANISM: Artificial
<220> FEATURE:
<223> OTHER INFORMATION: Oligonucleotide primer

<400> SEQUENCE: 17
ccactcacct cttcagaacg                                              20

<210> SEQ ID NO 18
<211> LENGTH: 22
<212> TYPE: DNA
<213> ORGANISM: Artificial
<220> FEATURE:
<223> OTHER INFORMATION: Oligonucleotide primer

<400> SEQUENCE: 18
catctttgga aggttcaggt tg                                           22

<210> SEQ ID NO 19
<211> LENGTH: 20
<212> TYPE: DNA
<213> ORGANISM: Artificial
<220> FEATURE:
<223> OTHER INFORMATION: Oligonucleotide primer

<400> SEQUENCE: 19
acggacccca aaagatgaag                                              20

<210> SEQ ID NO 20
<211> LENGTH: 20
<212> TYPE: DNA
<213> ORGANISM: Artificial
<220> FEATURE:
<223> OTHER INFORMATION: Oligonucleotide primer

<400> SEQUENCE: 20
ttctccacag ccacaatgag                                              20

<210> SEQ ID NO 21
<211> LENGTH: 21
<212> TYPE: DNA
<213> ORGANISM: Artificial
<220> FEATURE:
<223> OTHER INFORMATION: Oligonucleotide primer

<400> SEQUENCE: 21
gcctcaaacc ttccaaatca c                                            21

<210> SEQ ID NO 22
<211> LENGTH: 21
<212> TYPE: DNA
<213> ORGANISM: Artificial
<220> FEATURE:
<223> OTHER INFORMATION: Oligonucleotide primer

<400> SEQUENCE: 22
gttgtctgat tccaggtctc c                                            21

<210> SEQ ID NO 23
<211> LENGTH: 20
<212> TYPE: DNA
<213> ORGANISM: Artificial
<220> FEATURE:
<223> OTHER INFORMATION: Oligonucleotide primer
```

```
<400> SEQUENCE: 23
tctgtgcttt cctgatggtc                                              20

<210> SEQ ID NO 24
<211> LENGTH: 22
<212> TYPE: DNA
<213> ORGANISM: Artificial
<220> FEATURE:
<223> OTHER INFORMATION: Oligonucleotide primer

<400> SEQUENCE: 24
ggttatgagt ctgaggaagg tc                                           22

<210> SEQ ID NO 25
<211> LENGTH: 23
<212> TYPE: DNA
<213> ORGANISM: Artificial
<220> FEATURE:
<223> OTHER INFORMATION: Oligonucleotide primer

<400> SEQUENCE: 25
cagccctctc catcaactat aag                                          23

<210> SEQ ID NO 26
<211> LENGTH: 20
<212> TYPE: DNA
<213> ORGANISM: Artificial
<220> FEATURE:
<223> OTHER INFORMATION: Oligonucleotide primer

<400> SEQUENCE: 26
tctccgtcat ctccataggg                                              20

<210> SEQ ID NO 27
<211> LENGTH: 21
<212> TYPE: DNA
<213> ORGANISM: Artificial
<220> FEATURE:
<223> OTHER INFORMATION: Oligonucleotide primer

<400> SEQUENCE: 27
gtgacaacca agaaataccg c                                            21

<210> SEQ ID NO 28
<211> LENGTH: 22
<212> TYPE: DNA
<213> ORGANISM: Artificial
<220> FEATURE:
<223> OTHER INFORMATION: Oligonucleotide primer

<400> SEQUENCE: 28
ttcacctgca actcatatcc tg                                           22

<210> SEQ ID NO 29
<211> LENGTH: 19
<212> TYPE: DNA
<213> ORGANISM: Artificial
<220> FEATURE:
<223> OTHER INFORMATION: Oligonucleotide primer

<400> SEQUENCE: 29
agtgccctca acatcgaag                                               19

<210> SEQ ID NO 30
<211> LENGTH: 20
```

```
<212> TYPE: DNA
<213> ORGANISM: Artificial
<220> FEATURE:
<223> OTHER INFORMATION: Oligonucleotide primer

<400> SEQUENCE: 30
gccacggtga caaagaattc                                                   20

<210> SEQ ID NO 31
<211> LENGTH: 21
<212> TYPE: DNA
<213> ORGANISM: Artificial
<220> FEATURE:
<223> OTHER INFORMATION: Oligonucleotide primer

<400> SEQUENCE: 31
cagagcaagt tttcattggg c                                                 21

<210> SEQ ID NO 32
<211> LENGTH: 19
<212> TYPE: DNA
<213> ORGANISM: Artificial
<220> FEATURE:
<223> OTHER INFORMATION: Oligonucleotide primer

<400> SEQUENCE: 32
tgtgttcggg tcaatctgg                                                    19

<210> SEQ ID NO 33
<211> LENGTH: 20
<212> TYPE: DNA
<213> ORGANISM: Artificial
<220> FEATURE:
<223> OTHER INFORMATION: Oligonucleotide primer

<400> SEQUENCE: 33
accttctaca atgagctgcg                                                   20

<210> SEQ ID NO 34
<211> LENGTH: 20
<212> TYPE: DNA
<213> ORGANISM: Artificial
<220> FEATURE:
<223> OTHER INFORMATION: Oligonucleotide primer

<400> SEQUENCE: 34
ctggatggct acgtacatgg                                                   20
```

GENETICALLY MODIFIED MOUSE WITH A DISRUPTION IN AN AANAT GENE

CROSS-REFERENCE TO RELATED APPLICATIONS

This application is a National Stage application under 35 U.S.C. § 371 of International Application No. PCT/US2021/019047, having an International Filing Date of Feb. 22, 2021, which claims benefit of priority from U.S. Patent Application Ser. No. 62/980,047, filed on Feb. 21, 2020. The disclosure of the prior application is considered part of (and is incorporated by reference in) the disclosure of this application.

STATEMENT REGARDING FEDERAL FUNDING

This invention was made with government support under NS100743 awarded by the National Institutes of Health. The government has certain rights in the invention.

SEQUENCE LISTING

This document contains a sequence listing that has been submitted electronically as an ASCII text file. The ASCII text file, created on Apr. 8, 2021, is 7000 bytes in size. The material in the ASCII text file is hereby incorporated by reference in its entirety.

TECHNICAL FIELD

This document relates to non-human animal models (e.g., non-human mammalian models such as mouse models) for aging (e.g., neural aging). For example, non-human animal models for aging can be non-human animals having reduced or eliminated levels of aralkylamine N-acetyltransferase (AANAT) polypeptide expression. In some cases, non-human animal models for aging can be non-human animals whose genomes have one or more disruptions in an endogenous nucleic acid sequence encoding an AANAT polypeptide. Also provided herein are methods and materials for making and using non-human animals described herein.

BACKGROUND

There are currently no non-human animal models of accelerated healthy aging. Existing animal models for accelerated aging are based on aging diseases (e.g., progeria), and exhibit disease phenotypes that are unrelated to healthy aging.

SUMMARY

This document provides non-human animal models (e.g., non-human mammalian models such as mouse models) for aging (e.g., neural aging). For example, non-human animal models for aging can be non-human animals having (e.g., engineered to have) reduced or eliminated levels of AANAT polypeptide expression. In some cases, non-human animal models for aging can be non-human animals whose genomes have (e.g., are genetically engineered to have) one or more disruptions in an endogenous nucleic acid sequence encoding an AANAT polypeptide. Also provided herein are methods and materials for making and using non-human animals described herein (e.g., non-human animals having reduced or eliminated levels of AANAT polypeptide expression).

As demonstrated herein, melatonin can modulate cytosolic mtDNA release. For example, melatonin deficiency in normal cells and in a mouse model of Huntington's disease can increase mtDNA release, ROS damage, activation of the cGAS pathway, and pathologic inflammatory response, leading to synaptic loss and neurodegeneration. As also demonstrated herein, mice having the AANAT gene knocked out by designing CRISPR/Cas9 vectors against the AANAT gene can exhibit reduced melatonin synthesis and can recapitulate features of accelerated ageing and neurodegeneration. For example, the brain and primary cerebrocortical neurons of AANAT knock out (AANAT-KO) mice can exhibit increased cytosolic mtDNA release resulting in activation of the cGAS/STING/IRF3 pathway and stimulation of cytokine and interferon generation. As such, the AANAT-KO mouse can be used as a model for aging.

Having the ability to generate a non-human animal (e.g., a mouse) having reduced or eliminated levels of AANAT polypeptide expression provides a non-human animal model for aging (e.g., neural aging) where the aging is accelerated via a physiologically relevant aging mechanism. The physiological relevance of the aging mechanism, in the absence of a disease model, can increase the value of using such non-human animal models for screening, identifying, and/or validating therapeutic interventions. For example, using a non-human animal model having a physiologically relevant aging mechanism can increase the translation potential of identified therapeutic interventions.

In general, one aspect of this document features a non-human animal, wherein the non-human animal comprises a reduced or an undetectable level of aralkylamine N-acetyltransferase (AANAT) polypeptide expression, and wherein the genome of the somatic cells of the non-human animal comprises an heterologous or an homozygous disruption of a nucleic acid sequence encoding the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the nucleic acid sequence encoding the AANAT polypeptide. The reduced level of the AANAT polypeptide expression can be reduced in comparison to a control animal of the same species as the non-human animal, wherein the control animal lacks the disruption of the nucleic acid sequence encoding the AANAT polypeptide. The non-human animal can comprise the undetectable level of the AANAT polypeptide expression. The genome of the somatic cells can comprise the homozygous disruption of the nucleic acid sequence encoding the AANAT polypeptide.

In another aspect, this document features a non-human animal, wherein the non-human animal comprises a reduced or an undetectable level of aralkylamine N-acetyltransferase (AANAT) polypeptide expression, and wherein the genome of the somatic cells of the non-human animal comprises an heterologous or an homozygous disruption of a regulatory nucleic acid sequence that regulates expression of the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide.

The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the regulatory nucleic acid sequence. The reduced level of the AANAT polypeptide expression can be reduced in comparison to a control animal of the same species as the non-human animal, wherein the control animal lacks the disruption of the regulatory nucleic acid sequence. The non-human animal can comprise the undetectable level of the AANAT polypeptide expression. The genome of the somatic cells can comprise the homozygous disruption of the regulatory nucleic acid sequence. The non-human animal can exhibit accelerated aging as compared to a control animal of the same species as the non-human animal, wherein the control animal lacks the disruption.

In another aspect, this document features a method for making a non-human animal. The method comprises (a) introducing the disruption into the genome of a germ cell of a non-human animal lacking the disruption to generate a germ cell comprising the disruption, and generating a non-human animal from the germ cell.

In some cases, the non-human animal can comprise a reduced or an undetectable level of aralkylamine N-acetyltransferase (AANAT) polypeptide expression, and wherein the genome of the somatic cells of the non-human animal comprises an heterologous or an homozygous disruption of a nucleic acid sequence encoding the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the nucleic acid sequence encoding the AANAT polypeptide. The reduced level of the AANAT polypeptide expression can be reduced in comparison to a control animal of the same species as the non-human animal, wherein the control animal lacks the disruption of the nucleic acid sequence encoding the AANAT polypeptide. The non-human animal can comprise the undetectable level of the AANAT polypeptide expression. The genome of the somatic cells can comprise the homozygous disruption of the nucleic acid sequence encoding the AANAT polypeptide.

In some cases, the non-human animal can comprise a reduced or an undetectable level of aralkylamine N-acetyltransferase (AANAT) polypeptide expression, and wherein the genome of the somatic cells of the non-human animal comprises an heterologous or an homozygous disruption of a regulatory nucleic acid sequence that regulates expression of the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the regulatory nucleic acid sequence. The reduced level of the AANAT polypeptide expression can be reduced in comparison to a control animal of the same species as the non-human animal, wherein the control animal lacks the disruption of the regulatory nucleic acid sequence. The non-human animal can comprise the undetectable level of the AANAT polypeptide expression. The genome of the somatic cells can comprise the homozygous disruption of the regulatory nucleic acid sequence. The non-human animal can exhibit accelerated aging as compared to a control animal of the same species as the non-human animal, wherein the control animal lacks the disruption.

In another aspect, this document features a method for making a non-human animal. The method comprises mating a first mating partner with a second mating partner of the opposite sex as compared to the first mating partner and of the same species as the first mating partner, wherein the first mating partner is a selected non-human animal, and wherein the mating results in at least one offspring comprising the heterologous disruption or the homozygous disruption.

In some cases, the selected non-human animal can comprise a reduced or an undetectable level of aralkylamine N-acetyltransferase (AANAT) polypeptide expression, and wherein the genome of the somatic cells of the selected non-human animal comprises an heterologous or an homozygous disruption of a nucleic acid sequence encoding the AANAT polypeptide. The selected non-human animal can be a mouse. The selected non-human animal can comprise a reduced level of melatonin. The reduced level of melatonin can comprise from about 1 picogram to about 200 picograms of melatonin per pineal gland of the selected non-human animal. The selected non-human animal can comprise an increased level of cytosolic mitochondrial reactive oxygen species (ROS). The selected non-human animal can comprise an increased level of cytosolic mtDNA. The cytosolic mtDNA can be selected from the group consisting of mt-CO1, mt-Dloop1, mt-Dloop3, and combinations thereof. The selected non-human animal can comprise an increased level of activation of a cyclic guanosine monophosphate-adenosine monophosphate synthase (cGAS) pathway. The selected non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The selected non-human animal can comprise the reduced level of the AANAT polypeptide expression. The genome of the somatic cells can comprise the heterologous disruption of the nucleic acid sequence encoding the AANAT polypeptide. The reduced level of the AANAT polypeptide expression can be reduced in comparison to a control animal of the same species as the selected non-human animal, wherein the control animal lacks the disruption of the nucleic acid sequence encoding the AANAT polypeptide. The selected non-human animal can comprise the undetectable level of the AANAT polypeptide expression. The genome of the somatic cells can comprise the homozygous disruption of the nucleic acid sequence encoding the AANAT polypeptide.

In some cases, the selected non-human animal can comprise a reduced or an undetectable level of aralkylamine N-acetyltransferase (AANAT) polypeptide expression, and wherein the genome of the somatic cells of the selected non-human animal comprises an heterologous or an homozygous disruption of a regulatory nucleic acid sequence that regulates expression of the AANAT polypeptide. The selected non-human animal can be a mouse. The selected non-human animal can comprise a reduced level of melatonin. The reduced level of melatonin can comprise from about 1 picogram to about 200 picograms of melatonin per pineal gland of the selected non-human animal. The selected non-human animal can comprise an increased level of cytosolic mitochondrial reactive oxygen species (ROS). The selected non-human animal can comprise an increased level of cytosolic mtDNA. The cytosolic mtDNA can be selected from the group consisting of mt-CO1, mt-Dloop1, mt-Dloop3, and combinations thereof. The selected non-human animal can comprise an increased level of activation of a cyclic guanosine monophosphate-adenosine monophosphate synthase (cGAS) pathway. The selected non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The selected non-human animal can comprise the reduced level of the AANAT polypeptide expression. The genome of the somatic cells can comprise the heterologous disruption of the regulatory nucleic acid sequence. The reduced level of the AANAT polypeptide expression can be reduced in comparison to a control animal of the same species as the selected non-human animal, wherein the control animal lacks the disruption of the regulatory nucleic acid sequence. The selected non-human animal can comprise the undetectable level of the AANAT polypeptide expression. The genome of the somatic cells can comprise the homozygous disruption of the regulatory nucleic acid sequence. The selected non-human animal can exhibit accelerated aging as compared to a control animal of the same species as the selected non-human animal, wherein the control animal lacks the disruption.

The second mating partner can be a second selected non-human animal. In some cases, the second selected non-human animal can comprise a reduced or an undetectable level of aralkylamine N-acetyltransferase (AANAT) polypeptide expression, and wherein the genome of the somatic cells of the second selected non-human animal comprises an heterologous or an homozygous disruption of a nucleic acid sequence encoding the AANAT polypeptide. The second selected non-human animal can be a mouse. The second selected non-human animal can comprise a reduced level of melatonin. The reduced level of melatonin can comprise from about 1 picogram to about 200 picograms of melatonin per pineal gland of the second selected non-human animal. The second selected non-human animal can comprise an increased level of cytosolic mitochondrial reactive oxygen species (ROS). The second selected non-human animal can comprise an increased level of cytosolic mtDNA. The cytosolic mtDNA can be second selected from the group consisting of mt-CO1, mt-Dloop1, mt-Dloop3, and combinations thereof. The second selected non-human animal can comprise an increased level of activation of a cyclic guanosine monophosphate-adenosine monophosphate synthase (cGAS) pathway. The second selected non-human animal can comprise an increased level of a pro-inflammatory cell signaling polypeptide. The pro-inflammatory cell signaling polypeptide can be second selected from the group consisting of interleukin (IL)-6, IL-18, IL-1β, interferon (IFN)-α, IFN-β, and combinations thereof. The second selected non-human animal can comprise the reduced level of the AANAT polypeptide expression. The genome of the somatic cells can comprise the heterologous disruption of the nucleic acid sequence encoding the AANAT polypeptide. The reduced level of the AANAT polypeptide expression can be reduced in comparison to a control animal of the same species as the second selected non-human animal, wherein the control animal lacks the disruption of the nucleic acid sequence encoding the AANAT polypeptide. The second selected non-human animal can comprise the undetectable level of the AANAT polypeptide expression. The genome of the somatic cells can comprise the homozygous disruption of the nucleic acid sequence encoding the AANAT polypeptide.

In some cases, the second selected non-human animal can comprise a reduced or an undetectable level of aralkylamine N-acetyltransferase (AANAT) polypeptide expression, and wherein the genome of the somatic cells of the second selected non-human animal comprises an heterologous or an homozygous disruption of a regulatory nucleic acid sequence that regulates expression of the AANAT polypeptide. The second selected non-human animal can be a mouse. The second selected non-human animal can comprise a reduced level of melatonin. The reduced level of melatonin can comprise from about 1 picogram to about 200 picograms of melatonin per pineal gland of the second selected non-human animal. The second selected non-human animal can comprise an increased level of cytosolic mitochondrial reactive oxygen species (ROS). The second selected non-human animal can comprise an increased level of cytosolic mtDNA. The cytosolic mtDNA can be second selected from the group consisting of mt-CO1, mt-Dloop1, mt-Dloop3, and combinations thereof. The second selected non-human animal can comprise an increased level of activation of a cyclic guanosine monophosphate-adenosine monophosphate synthase (cGAS) pathway. The second selected non-human animal can comprise an increased level of a pro-inflammatory cell signaling polypeptide. The pro-inflammatory cell signaling polypeptide can be second selected from the group consisting of interleukin (IL)-6, IL-18, IL-1β, interferon (IFN)-α, IFN-β, and combinations thereof. The second selected non-human animal can comprise the reduced level of the AANAT polypeptide expression. The genome of the somatic cells can comprise the heterologous disruption of the regulatory nucleic acid sequence. The reduced level of the AANAT polypeptide expression can be reduced in comparison to a control animal of the same species as the second selected non-human animal, wherein the control animal lacks the disruption of the regulatory nucleic acid sequence. The second selected non-human animal can comprise the undetectable level of the AANAT polypeptide expression. The genome of the somatic cells can comprise the homozygous disruption of the regulatory nucleic acid sequence. The second selected non-human animal can exhibit accelerated aging as compared to a control animal of the same species as the second selected non-human animal, wherein the control animal lacks the disruption.

The at least one offspring can comprise the homozygous disruption.

In another aspect, this document features a method for identifying a molecule as having the ability to slow the progression of aging within a non-human animal. The method comprises (a) administering a test molecule to the non-human animal, and (b) determining that the administering slows the progression of aging of the non-human animal.

In some cases, the non-human animal can comprise a reduced or an undetectable level of aralkylamine N-acetyltransferase (AANAT) polypeptide expression, and wherein the genome of the somatic cells of the non-human animal comprises an heterologous or an homozygous disruption of a nucleic acid sequence encoding the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the nucleic acid sequence encoding the AANAT polypeptide. The reduced level of the AANAT polypeptide expression can be reduced in comparison to a control animal of the same species as the non-human animal, wherein the control animal lacks the disruption of the nucleic acid sequence encoding the AANAT polypeptide. The non-human animal can comprise the undetectable level of the AANAT polypeptide expression. The genome of the somatic cells can comprise the homozygous disruption of the nucleic acid sequence encoding the AANAT polypeptide.

In some cases, the non-human animal can comprise a reduced or an undetectable level of aralkylamine N-acetyltransferase (AANAT) polypeptide expression, and wherein the genome of the somatic cells of the non-human animal comprises an heterologous or an homozygous disruption of a regulatory nucleic acid sequence that regulates expression of the AANAT polypeptide. The non-human animal can be a mouse. The non-human animal can comprise a reduced level of melatonin. The reduced level of melatonin can comprise from about 1 picogram to about 200 picograms of melatonin per pineal gland of the non-human animal. The non-human animal can comprise an increased level of cytosolic mitochondrial reactive oxygen species (ROS). The non-human animal can comprise an increased level of cytosolic mtDNA. The cytosolic mtDNA can be selected from the group consisting of mt-CO1, mt-Dloop1, mt-Dloop3, and combinations thereof. The non-human animal can comprise an increased level of activation of a cyclic guanosine monophosphate-adenosine monophosphate synthase (cGAS) pathway. The non-human animal can comprise an increased level of a pro-inflammatory cell signaling polypeptide. The pro-inflammatory cell signaling polypeptide can be selected from the group consisting of interleukin (IL)-6, IL-18, IL-1β, interferon (IFN)-α, IFN-β, and combinations thereof. The non-human animal can comprise the reduced level of the AANAT polypeptide expression. The genome of the somatic cells can comprise the heterologous disruption of the regulatory nucleic acid sequence. The reduced level of the AANAT polypeptide expression can be reduced in comparison to a control animal of the same species as the non-human animal, wherein the control animal lacks the disruption of the regulatory nucleic acid sequence. The non-human animal can comprise the undetectable level of the AANAT polypeptide expression. The genome of the somatic cells can comprise the homozygous disruption of the regulatory nucleic acid sequence. The non-human animal can exhibit accelerated aging as compared to a control animal of the same species as the non-human animal, wherein the control animal lacks the disruption.

The method can comprise determining that the administering slows the progression of aging of the non-human animal as compared to the progression of aging of a comparable control non-human animal not administered the test molecule. The method can comprise administering a positive control molecule to a comparable control non-human animal not administered the test molecule. The positive control molecule can be a senolytic molecule. The non-human animal can comprise the homozygous disruption.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
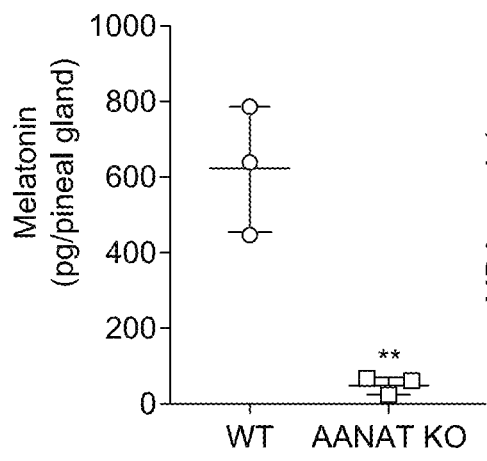
FIG. 1: Melatonin deficiency-induced mtDNA release mediated neuroinflammation. (A) LC-MS quantification of melatonin in pineal gland isolated at 4:00 am from 20-week old WT and AANAT-KO mice, N=3. (B) Quantification of malondialdehyde (MDA), an indicator of lipid peroxidation, and (C) protein carbonylation, an indicator of protein oxidation in whole brain of 8 and 20-week old WT and AANAT-KO mouse brain lysate, N=4. (D) Ventricle volume in 20-week WT and AANAT-KO brain, N=3. (E) qPCR of cytosolic mtDNA in 8 and 20-week aged WT and AANAT-KO brain using primers for mt-CO1, mt-Dloop1 and mt-Dloop3, mitochondrial genes. Cytosolic mtDNA plotted relative to amount of WT brain after normalization to (3-actin from the corresponding total DNA lysate, N=4. (F) Representative Immunoblots and (G) quantitation for cGAS, STING, IRF3, caspase-1 and β-Actin in WT and AANAT-KO brain lysates. β-Actin was a loading control; data expressed as relative to WT control, N=4. (H) Cytokine ELISA in brain lysate of 20-week old WT and AANAT-KO mice expressed as pg of cytokine per mg of protein lysate, N=3. All data expressed as mean+/−S.D, analyzed by Student's t-test (panels A, D, G, and H), or ANOVA followed by Tukey's test (panels B, C, and E). *$P<0.05$, $P<0.01$, *$P<0.001$.

This document provides non-human animal models (e.g., non-human mammalian models such as mouse models) for aging (e.g., neural aging). For example, non-human animal models for aging can be non-human animals having (e.g., engineered to have) reduced or eliminated levels of AANAT polypeptide expression. In some cases, non-human animal models for aging can be non-human animals whose genomes have (e.g., are genetically engineered to have) one or more disruptions in an endogenous nucleic acid sequence encoding an AANAT polypeptide (e.g., such that somatic cells of the non-human animals have reduced or eliminated levels of AANAT polypeptide expression). Also provided herein are methods and materials for making and using non-human animals described herein (e.g., non-human animals having reduced or eliminated levels of AANAT polypeptide expression).

The term "reduced level" as used herein with respect to a level of AANAT polypeptide expression refers to any level that is lower than a reference level of AANAT polypeptide expression. The term "reference level" as used herein with respect to AANAT polypeptide expression refers to the level of AANAT polypeptide expression typically observed in cells from one or more non-human animals not genetically modified to reduce or disrupt AANAT polypeptide expression as described herein. In some cases, a reduced level of AANAT polypeptide expression can be an undetectable level of AANAT polypeptides. In some cases, a reduced level of AANAT polypeptide expression can be a level where expression of AANAT polypeptides is eliminated. For example, non-human animals having reduced or eliminated levels of AANAT polypeptides can have at least 50 percent (e.g., at least 60 percent, at least 75 percent, at least 90 percent, or at least 97 percent) less AANAT polypeptide expression as compared to control non-human animals (e.g., non-human animals not genetically modified as described herein such as wild-type animals of the same species).

A level of AANAT polypeptide expression can be measured using any appropriate technique. In some cases, a level of AANAT polypeptide expression can be measured using immunoassays (e.g., immunohistochemistry (IHC) techniques and western blotting techniques), mass spectrometry techniques (e.g., proteomics-based mass spectrometry assays), transmission electron microscopy, and/or enzyme-linked immunosorbent assays (ELISAs). In some cases, a level of a nucleic acid (e.g., a messenger RNA (mRNA)) encoding an AANAT polypeptide can be measured using northern blotting techniques, in situ hybridization techniques (e.g., fluorescent in situ hybridization), and/or reverse transcription-polymerase chain reaction (RT-PCR) techniques. In some cases, a level of AANAT polypeptide expression can be measured as described in Example 1.

In some cases, a non-human animal model described herein (e.g., a non-human animal model having reduced or eliminated levels of AANAT polypeptide expression) can have reduced or eliminated melatonin levels. The term "reduced level" as used herein with respect to the level of melatonin refers to any level that is lower than a reference level of melatonin. The term "reference level" as used herein with respect to melatonin refers to the level of melatonin typically observed in cells from one or more non-human animals not genetically modified to reduce or disrupt AANAT polypeptide expression as described herein. In some cases, a reduced level of melatonin can be an undetectable level of melatonin. In some cases, non-human animals having reduced levels of melatonin can have at least 50 percent (e.g., at least 60 percent, at least 75 percent, at least 90 percent, at least 95 percent, at least 97 percent, or at least 99 percent) less melatonin as compared to control non-human animals (e.g., non-human animals not genetically modified as described herein). In some cases, non-human animals having reduced levels of melatonin can have less than about 200 picograms (pg) melatonin per pineal gland of the non-human animal. For example, non-human animals having reduced levels of melatonin can have from about 1 pg to about 200 pg melatonin per pineal gland of the non-human animal.

Melatonin can be measured using any appropriate technique. In some cases, melatonin can be measured using mass spectrometry techniques (e.g., ultra performance liquid chromatography (UPLC) tandem mass spectrometry (MS/MS)). In some cases, melatonin can be measured as described in Example 1.

In some cases, a non-human animal model described herein (e.g., a non-human animal model having reduced or eliminated levels of AANAT polypeptide expression) can have an increased level of cytosolic mitochondrial reactive oxygen species (ROS). The term "increased level" as used herein with respect to the level of mitochondrial ROS refers to any level that is higher than a reference level of the mitochondrial ROS. The term "reference level" as used herein with respect to mitochondrial ROS refers to the level of the mitochondrial ROS typically observed in cells from one or more non-human animals not genetically modified to reduce or disrupt AANAT polypeptide expression as described herein. For example, non-human animals having an increased level of mitochondrial ROS can have at least 1.2 fold (e.g., at least about 1.5 fold, at least about 2 fold, at least about 3 fold, at least about 4 fold, at least about 5 fold, or at least about 6 fold) more mitochondrial ROS as compared to control non-human animals (e.g., non-human animals not genetically modified as described herein).

ROS can be measured using any appropriate technique. In some cases, ROS can be measured using DCFDA assays, MitoSOX™ assays, or both DCFDA assays and MitoSOX™ assays. In some cases, ROS can be measured as described in Example 1.

In some cases, a non-human animal model described herein (e.g., a non-human animal model having reduced or eliminated levels of AANAT polypeptide expression) can have an increased level of cytosolic mtDNA. The term "increased level" as used herein with respect to the level of cytosolic mtDNA refers to any level that is higher than a reference level of cytosolic mtDNA. The term "reference level" as used herein with respect to cytosolic mtDNA refers to the level of cytosolic mtDNA typically observed in cells from one or more non-human animals not genetically modified to reduce or disrupt AANAT polypeptide expression as described herein. For example, non-human animals having an increased level of cytosolic mtDNA can have at least 2.5 fold (e.g., at least about 2.7 fold, at least about 3 fold, at least about 3.2 fold, at least about 3.5 fold, at least about 3.8 fold, at least about 4 fold, at least about 4.3 fold, or at least about 4.5 fold) more mitochondrial ROS as compared to control non-human animals (e.g., non-human animals not genetically modified as described herein). A mtDNA that can have an increased cytosolic level in a non-human animal model described herein can be measured by measuring the cytosolic level of any appropriate gene encoded by mtDNA. Examples of mtDNA encoded genes that can have an increased cytosolic level and used as a proxy for mtDNA in the cytosol in a non-human animal model described herein include, without limitation, mt-CO1, mt-Dloop1, mt-Dloop3, and any of the additional 34 genes encoded by mtDNA. mtDNA can be measured using any appropriate technique. In some cases, mtDNA can be measured using quantitative real-time PCR. In some cases, mtDNA can be measured as described in Example 1.

In some cases, a non-human animal model described herein (e.g., a non-human animal model having reduced or eliminated levels of AANAT polypeptide expression) can have increased activation of the cyclic guanosine monophosphate-adenosine monophosphate synthase (cGAS) pathway. Activation of the cGAS pathway can be measured using any appropriate technique. In some cases, activation of the cGAS pathway can be measured by detecting expression and/or activation of a molecule downstream from cGAS in the cGAS pathway. For example, activation of the cGAS pathway can be measured by detecting expression and/or activation of stimulator of interferon genes (STING) polypeptides. In some cases, activation of the cGAS pathway can be measured by detecting expression and/or activation (e.g., phosphorylation) of interferon regulatory factor 3 (IRF3) polypeptides. In some cases, activation of the cGAS pathway can be measured by detecting expression and/or activation (e.g., phosphorylation) of nuclear factor kappa-light-chain-enhancer of activated B cells (NF-κB). In some cases, activation of the cGAS pathway can be measured as described in Example 1.

In some cases, a non-human animal model described herein (e.g., a non-human animal model having reduced or eliminated levels of AANAT polypeptide expression) can have an increased level of one or more pro-inflammatory cell signaling polypeptides (e.g., cytokines and interferons). The term "increased level" as used herein with respect to the level of one or more pro-inflammatory cell signaling polypeptides refers to any level that is higher than a reference level of the pro-inflammatory cell signaling polypeptide(s). The term "reference level" as used herein with respect to one or more pro-inflammatory cell signaling polypeptides refers to the level of the pro-inflammatory cell signaling polypeptide(s) typically observed in cells from one or more non-human animals not genetically modified to reduce or disrupt AANAT polypeptide expression as described herein. For example, non-human animals having an increased level of one or more pro-inflammatory cell signaling polypeptides can have at least 2 fold (e.g., at least about 3 fold, at least about 4 fold, at least about 5 fold, at least about 6 fold, at least about 7 fold, at least about 8 fold, at least about 9 fold, or at least about 10 fold) more pro-inflammatory cell signaling polypeptide(s) as compared to control non-human animals (e.g., non-human animals not genetically modified as described herein). A pro-inflammatory cell signaling polypeptide that can have an increased level in a non-human animal model described herein can be any appropriate pro-inflammatory cell signaling polypeptide. Examples of pro-inflammatory cell signaling polypeptides that can have an increased level in a non-human animal model described herein include, without limitation, interleukin (IL)-6, IL-18, IL-1β, interferon (IFN)-α, and IFN-β.

A level of a pro-inflammatory cell signaling polypeptide can be measured using any appropriate technique. In some cases, a level of a pro-inflammatory cell signaling polypeptide can be measured using immunoassays (e.g., immunohistochemistry (IHC) techniques and western blotting techniques), mass spectrometry techniques (e.g., proteomics-based mass spectrometry assays), transmission electron microscopy, and/or enzyme-linked immunosorbent assays (ELISAs). In some cases, a level of a nucleic acid (e.g., mRNA) encoding a pro-inflammatory cell signaling polypeptide can be measured using northern blotting techniques, in situ hybridization techniques (e.g., fluorescent in situ hybridization), and/or reverse transcription-polymerase chain reaction (RT-PCR) techniques. In some cases, a level of a pro-inflammatory cell signaling polypeptide can be measured as described in Example 1.

A non-human animal model provided herein can be a model for any type of aging. In some cases, a non-human animal model for aging can be a model for healthy (e.g., non-diseased) aging. In some cases, a non-human animal model provided herein can be a model that exhibits symptoms and/or phenotypes of healthy aging. Examples of symptoms and phenotypes of healthy aging include, without limitation, hair loss (e.g., alopecia such as full-body alopecia), graying of the hair, wrinkled skin, cognitive decline, memory deficits, and decreased muscle strength. In some cases, a non-human animal model for healthy aging can be a model that does not exhibit all the symptoms and/or phenotypes of a disease associated with aging (e.g., a progeria such as Hutchinson-Gilford syndrome and Werner syndrome)). Examples of symptoms and phenotypes of a disease associated with aging can include, without limitation, atherosclerosis, kidney failure, loss of eyesight, cardiovascular problems (e.g., atherosclerosis), scleroderma, cataracts (e.g., bilateral cataracts), atrophied skin, tight skin, soft tissue calcification, brain atrophy, skin ulcers, osteoporosis, diabetes mellitus (Type 2 diabetes), and cancers (e.g., skin cancers such as malignant melanomas, soft-tissue sarcomas, thyroid cancers, liver cancers, myelodysplastic syndrome, malignant fibrous histiocytoma, or non-Hodgkin lymphomas). In some cases, a non-human animal model provided herein can be a model for neural aging. For example, a non-human animal model for neural aging can be used as a model for a disease associated with neural aging (e.g., a neurodegenerative disease). Examples of neurodegenerative diseases include, without limitation, Huntington's disease, Parkinson's disease, Alzheimer's disease, and amyotrophic lateral sclerosis.

A non-human animal model described herein (e.g., a non-human animal model having reduced or eliminated levels of AANAT polypeptide expression) can be any appropriate type of non-human animal. In some cases, a non-human animal model provided herein can be a non-human mammal. Examples of non-human animals that can be used as a non-human animal to generate a model described herein can include, without limitation, zebrafish, *Drosophila melanogaster*, mice, rats, rabbits, guinea pigs, dogs, cats, pigs, sheep, horses, bovine species, and non-human primates (e.g., monkeys). In some cases, a non-human animal having reduced or eliminated levels of AANAT polypeptide expression can be a mouse model (e.g., a mouse model for aging such as neural aging).

In cases where a non-human animal described herein (e.g., a non-human mammal having reduced or eliminated levels AANAT polypeptide expression) is a mouse, the mouse can be any appropriate type (e.g., strain) of mouse. Examples of strains of mice that can be used to make a non-human animal model described herein include, without limitation, CBA, DBA, B6CBA, C57BL/6, BALB/c, FVB/N, C3/He, and MSM/Ms. In some cases, a mouse that can be used as (or can be used to generate) a non-human animal model described herein can be an inbred strain of mouse. In some cases, a mouse that can be used as (or can be used to generate) a non-human animal model described herein can be a hybrid strain of mouse. For example, a hybrid strain of mouse that can be a progeny (e.g., an F1 progeny) from a cross between two different inbred strains of mice.

A non-human animal (e.g., a mouse) described herein (e.g., a non-human animal having reduced or eliminated levels of AANAT polypeptide expression) can have (e.g., can be engineered to have) a disruption in an endogenous nucleic acid sequence encoding an AANAT polypeptide (e.g., one or more exons (or portions thereof) that encode an amino acid sequence of an AANAT polypeptide) and/or a disruption in an endogenous nucleic acid sequence that regulates or drives the expression of an AANAT polypeptide (e.g., a promotor or enhancer sequence that regulates or drives expression of an AANAT polypeptide). The term "endogenous" as used herein with reference to nucleic acid sequences and a particular organism refers to a nucleic acid sequence that is normally present in the genome of members of the same species that includes that particular organism. An endogenous nucleic acid sequence can include exons, introns, one or more gene sequences, intergenic sequences, portions of gene sequences or intergenic sequences, regulatory sequences, or combinations thereof.

The term "disruption" as used herein with reference to a nucleic acid sequence encoding a AANAT polypeptide refers to any genetic modification (e.g., nucleotide deletions, additions, insertions and deletions (indels), inversions, and/or substitutions) of a nucleic acid sequence encoding a AANAT polypeptide (e.g., one or more exons (or portion thereof) of a nucleic acid sequence encoding an AANAT polypeptide) that results in a reduced or eliminated level of expression of a functional AANAT polypeptide. The term "disruption" as used herein with reference to a regulatory sequence that regulates or drives expression of a nucleic acid sequence encoding an AANAT polypeptide refers to any genetic modification (e.g., nucleotide deletions, additions, indels, inversions, and/or substitutions) of such a regulatory sequence (e.g., a promotor or enhancer) that results in a reduced or eliminated level of expression of a functional AANAT polypeptide.

In some cases, a disruption can be an homozygous disruption (e.g., present in both copies of a nucleic acid sequence encoding an AANAT polypeptide (or of a regulatory sequence) in a diploid non-human animal). In some cases, a disruption can be an heterozygous disruption (e.g., present in one copy of a nucleic acid sequence encoding an AANAT polypeptide (or of a regulatory sequence) in a diploid non-human animal).

In some cases, a non-human animal (e.g., mouse) described herein (e.g., non-human animal having reduced or eliminated levels of AANAT polypeptide expression) can be a knockout animal (e.g., a knockout mouse). The terms "knockout," "knock-out," and "KO" as used herein with reference to a non-human animal having undetectable levels of AANAT polypeptide expression refers to a particular non-human animal (e.g., a mouse) that contains a genetic modification that disrupts a nucleic acid sequence encoding the AANAT polypeptide (e.g., one or more exons of a nucleic acid sequence encoding an AANAT polypeptide) and/or that contains a genetic modification that disrupts one or more regulatory sequences of nucleic acid encoding an AANAT polypeptide) normally endogenous to members of the same species as that particular non-human animal (e.g., via deletion or replacement of a nucleic acid sequence or via insertion of a nucleic acid sequence that disrupts AANAT polypeptide expression), thereby inactivating that nucleic acid sequence (e.g., such that a functional AANAT polypeptide is not expressed). For example, a non-human animal having a genetic modification that disrupts a nucleic acid sequence encoding an AANAT polypeptide, thereby inactivating that nucleic acid sequence (e.g., such that cells containing the inactivated nucleic acid have an undetectable level of expression of a functional AANAT polypeptide) can be referred to as an AANAT knockout mouse.

Any suitable method can be used to generate a non-human animal (e.g., mouse) described herein (e.g., non-human animal having reduced or eliminated levels of AANAT polypeptide expression). For example, any suitable method can be used to generate a disruption in (a) the endogenous nucleic acid sequence encoding an AANAT polypeptide (e.g., one or more exons of a nucleic acid sequence encoding an AANAT polypeptide) and/or (b) one or more endogenous regulatory sequences of nucleic acid encoding an AANAT polypeptide, in a genetically modified non-human animal described herein. Examples of methods that can be used to generate a disruption in the endogenous nucleic acid sequence encoding an AANAT polypeptide (and/or an endogenous regulatory sequence) can include, without limitation, gene editing technologies, site-specific recombinase technologies, and homologous recombination technologies. Methods used to generate a disruption in the endogenous nucleic acid sequence encoding an AANAT polypeptide (and/or an endogenous regulatory sequence) can be designed based on any appropriate nucleic acid sequence encoding an AANAT polypeptide (and/or any appropriate regulatory sequence of the AANAT polypeptide-encoding sequences). Examples of nucleic acid sequences encoding an AANAT polypeptide include, without limitation, those set forth in National Center for Biotechnology Information (NCBI) accession no. EDL34585, version EDL34585.1; accession no. AAI19140, version AAI19140.1; accession no.

AAI16968, version AAI16968.1; accession no. BC116967, version BC116967.1; accession no. NC_000077, version NC_000077.6; accession no. NM_009591, version NM_009591.3; accession no. U83462, version U83462.1; accession no. AF004108, version AF004108.1; accession no. BC119139, version BC119139.1; accession no. AB013358, version AB013358.1; accession no. CH466558, version CH466558.1; and accession no. CM000219, version CM000219.2. Examples of regulatory sequences having the ability to regulate expression of an AANAT polypeptide include, without limitation, promotors and enhancers such as those set forth in GeneHancer (GH) identifiers GH17J076452, GH17J076465, GH17J076480, GH17J076352, GH17J076489, GH17J076527, or GH17J076238.

In some cases, a non-human animal (e.g., mouse) described herein (e.g., non-human animal having reduced or eliminated levels of AANAT polypeptide expression) can be generated using a gene editing technology. For example, a non-human animal described herein can be generated using a gene editing technology that includes one or more engineered nucleases. Examples of gene editing technologies that can be used to generate a non-human animal described herein include, without limitation, clustered regularly interspaced short palindromic repeats (CRISPR)/CRISPR-associated nucleases (Cas) systems, transcription activator-like effector nucleases (TALENs) systems, zinc finger nucleases, and meganucleases. In some cases, a non-human animal having reduced or eliminated levels of AANAT polypeptide expression can be generated as described in Example 1.

In some cases, a non-human animal having reduced or eliminated levels of AANAT polypeptide expression can be generated using a gene editing technique as described elsewhere (see, e.g., Pelletier et al., *Immunity*, 42(1):18-27 (2015); Mani et al., *Biochemical and Biophysical Research Communications*, 335:447-457 (2005); Campbell et al., *Circulation Research*, 113:571-587 (2013); Navabpour et al., *Neurosci Biobehav Rev.*, 108:732-748 (2020); Wassef et al., *Methods*, 121-122:45-54 (2017); and Channabasavaiah et al., *Disease Models & Mechanisms*, 12:dmm029462 (2019)).

This document also provides methods and materials for using a non-human animal (e.g., a mouse) described herein (e.g., a non-human animal having reduced or eliminated levels of AANAT polypeptide expression). In some cases, a non-human animal (e.g., a mouse) described herein (e.g., a non-human mammal having reduced or eliminated levels of AANAT polypeptide expression) can be used to identify, evaluate, and/or validate a therapeutic intervention for aging (e.g., neural aging). For example, a candidate therapeutic intervention (e.g., a test molecule) can be administered to a non-human animal described herein, and the non-human animal can be monitored for the severity or rate of aging and/or the severity of one or more symptoms of aging. Examples of test molecules that can be assessed for the ability to reduce the severity or rate of aging and/or the severity of one or more symptoms of aging as described herein include, without limitation, polypeptides, nucleic acid molecules encoding a polypeptide, and small molecules. In some cases, the members of a library of different test molecules (e.g., a library of different small molecules) can be assessed for the ability to reduce the severity or rate of aging and/or the severity of one or more symptoms of aging as described herein. In some cases, one or more positive control molecules can be used to confirm the ability of a test molecule to reduce the severity or rate of aging and/or the severity of one or more symptoms of aging using a non-human animal model described herein. Examples of positive control molecules that can be used to confirm the ability of a test molecule to reduce the severity or rate of aging and/or the severity of one or more symptoms of aging include, without limitation, polypeptides (e.g., FOXO4 peptides), nucleic acid molecules encoding a polypeptide (e.g., FOXO4 peptides), and senolytic molecules (e.g., dasatinib and/or quercetin, or fisetin).

A candidate therapeutic intervention (e.g., a test molecule) can be administered to a non-human animal described herein using in any appropriate technique. In some cases, a therapeutic intervention can be administered orally (e.g., by direct oral administration or by providing a therapeutic intervention in the non-human animal's feed and/or water). In some cases, a therapeutic intervention can be administered parenterally (e.g., by subcutaneous injection, intramuscular injection, intravenous injection, intradermal injection, intrathecal injection, intra-arterial injection, and intracranial injection or pump infusion). Any appropriate method can be used to monitor the severity or rate of aging and/or the severity of one or more symptoms of aging. For example, assessment of cognitive function, assessment of strength, and/or assessment of motor function can be used to monitor the severity or rate of aging. In some cases, lifespan can be used to assess the ability of a test molecule to slow the progression of aging within a non-human animal described herein.

The invention will be further described in the following examples, which do not limit the scope of the invention described in the claims.

EXAMPLES

Example 1: Melatonin Inhibits Cytosolic Mitochondrial DNA Induced Neuroinflammation in Accelerated Ageing and Neurodegeneration This Example demonstrates that neurodegeneration and ageing exhibit increased cytosolic mitochondrial DNA release, a process modulated by melatonin, which activates the inflammatory response, and demonstrates that AANAT-KO knockout mice lacking melatonin also exhibit increased cytosolic mitochondrial DNA release and an activated inflammatory response. As such, AANAT-KO knockout mice can be used as a model of accelerated ageing.

Results

AANAT Deletion Results in mtDNA Mediated Inflammation

Figure 1B:
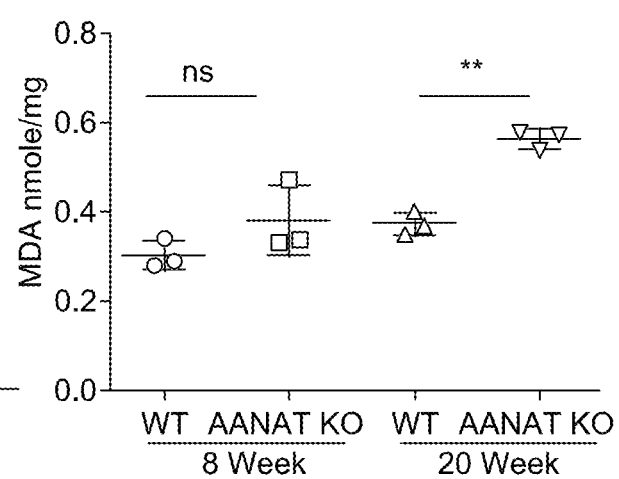
Figure 1C:
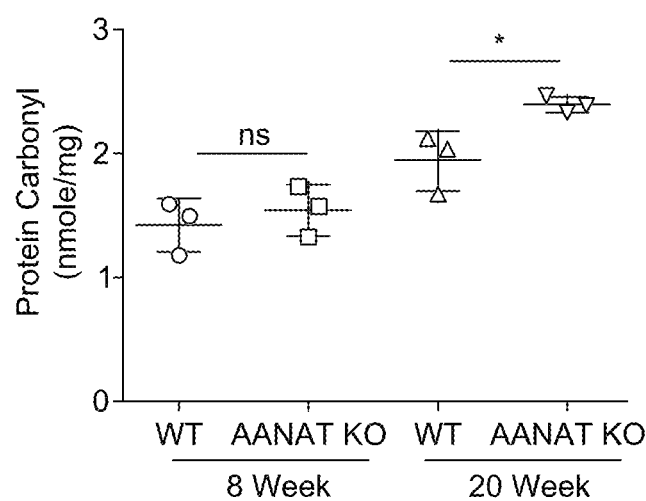
Figure 1D:
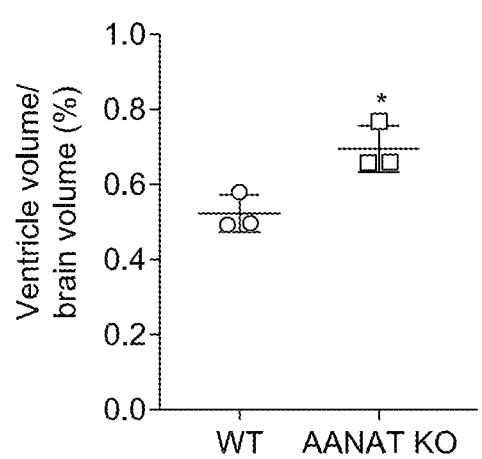
Figure 2A:
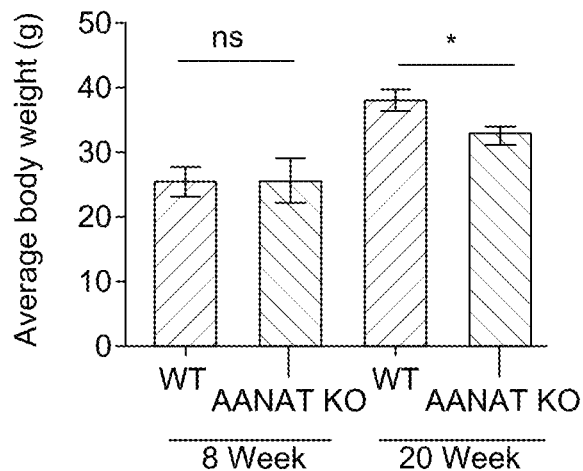
FIG. 2: AANAT-KO induces mtDNA mediates inflammation. (A) Average body weight in WT and AANAT-KO mice (age 8 and 20-week), N=4. (B) ventricle and (C) brain volume in 20-week WT and AANAT KO brain, N=3. (D) qPCR analysis of mRNA of cGAS, STING, IRF3 and caspase-1 in WT and AANAT-KO brain (age 8 and 20-week). MRNA expression is plotted relative to amount in WT brain, after normalization to β-Actin, N=4. (E) qPCR analysis of mRNA of proinflammatory cytokines and interferons in WT and AANAT-KO brain (age 8 and 20-week). mRNA expression plotted relative to amount in age matched WT brain, after normalization to β-actin, N=4. Data are shown as mean±SD and analyzed by Student's T test (panels Band C) and ANOVA followed by Tukey's test (panels A, D, and E). *$P<0.05$, **$P<0.01$, ns; non-significant.
Figure 2B:
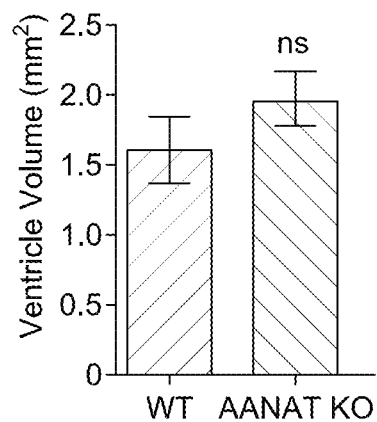
Figure 2C:
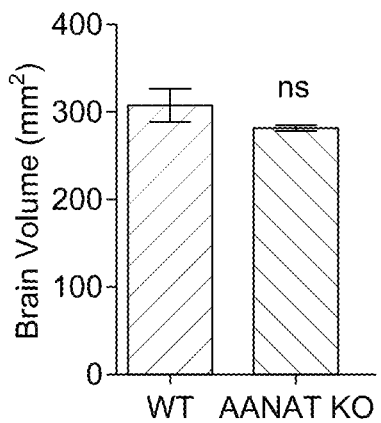

To explore the role of melatonin in brain, AANAT$^{-/-}$ (AANAT-KO) mice were created in a CBA/J genetic background, a strain that produces melatonin. AANAT is the penultimate enzyme in melatonin synthesis and is located in the mitochondrial matrix. Melatonin concentration measured in pineal during peak production (4 am) is reduced to background in AANAT-KO mice as compared to wild type (WT) mice (FIG. 1A), demonstrating effective knockout of melatonin synthesis. At 20-weeks of age, AANAT-KO mice gained less weight than WT mice; a difference not found in 8-week old mice (FIG. 2A). Melatonin is an antioxidant, therefore protein carbonylation and lipid peroxidation, markers of oxidative damage associated with ageing and neurodegeneration, were studied in brains of AANAT-KO mice. AANAT-KO brain had higher levels of protein carbonylation and lipid peroxidation (FIGS. 1B and C), suggesting that melatonin absence results in increased cerebral oxidative stress. Increased ventricle size is associated with ageing. A 25% increased corrected ventricle size (p<0.05) in the context of a smaller brain (10% not significant) was found in 20-week AANAT-KO mice, representing atrophy and not hydrocephalus (FIG. 1D and FIGS. 2B and C). The combination of premature neurodegeneration, weight loss, increased ROS damage and neuroinflammation supports the use of AANAT-KO mice as a model of accelerated ageing.

Figure 1E:
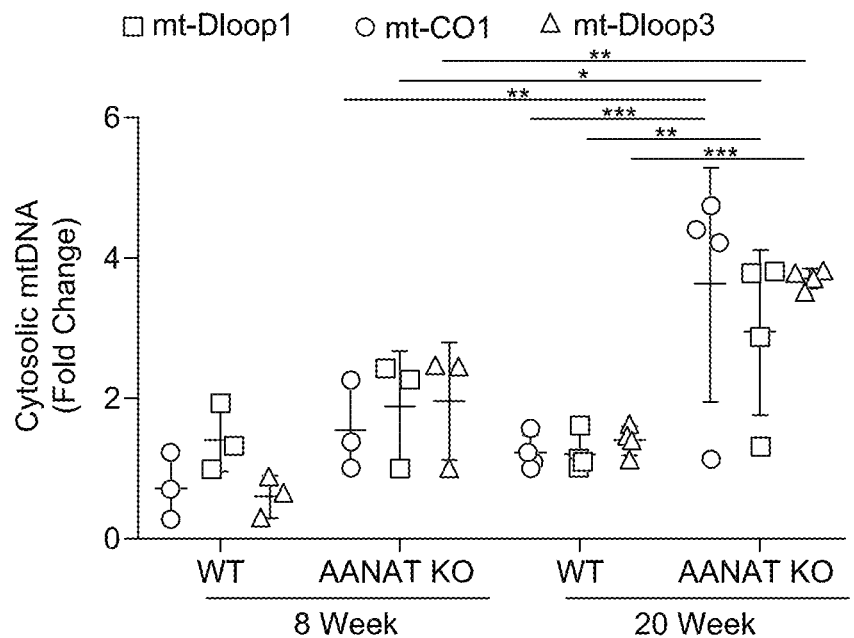
Figure 1F:
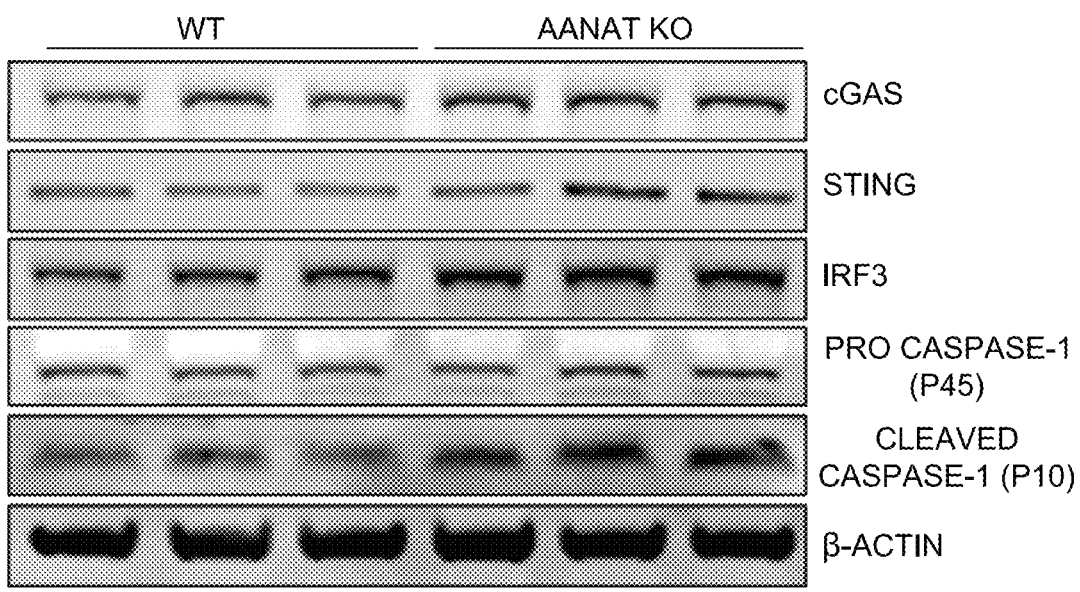
Figure 1G:
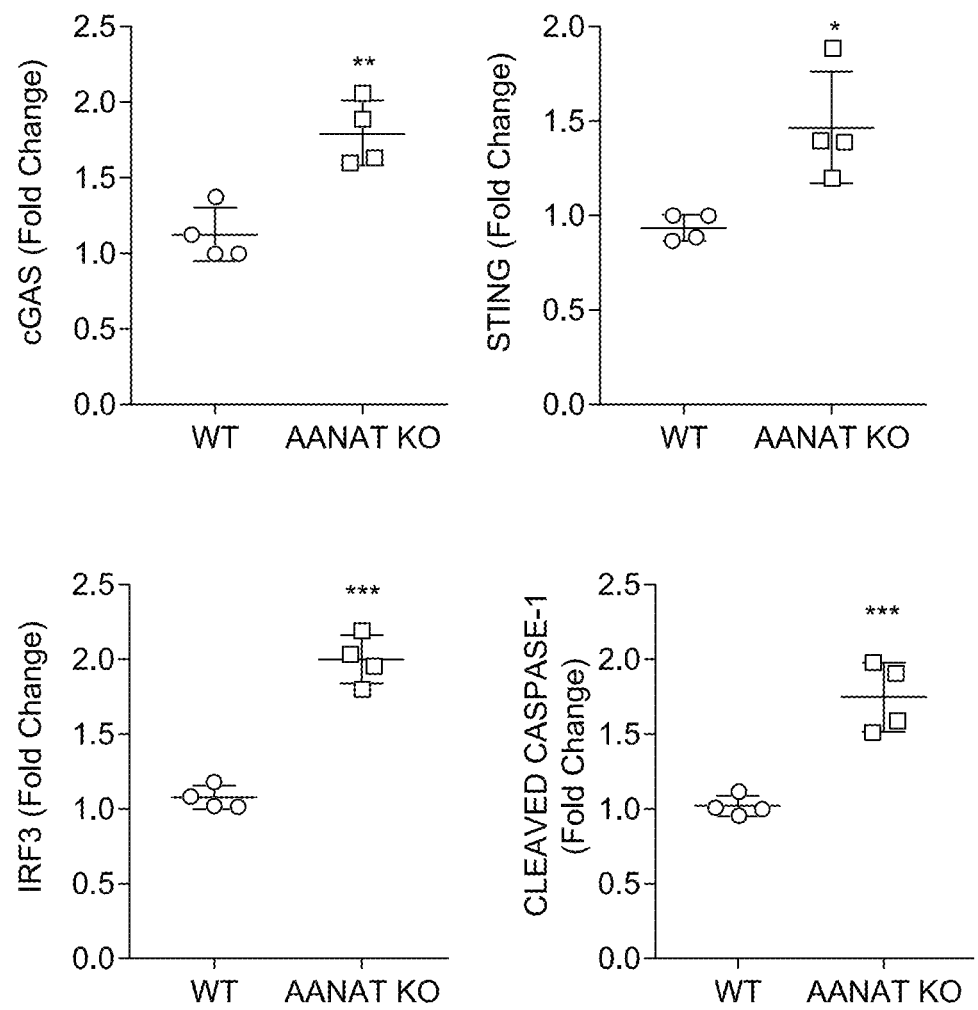
Figure 1H:
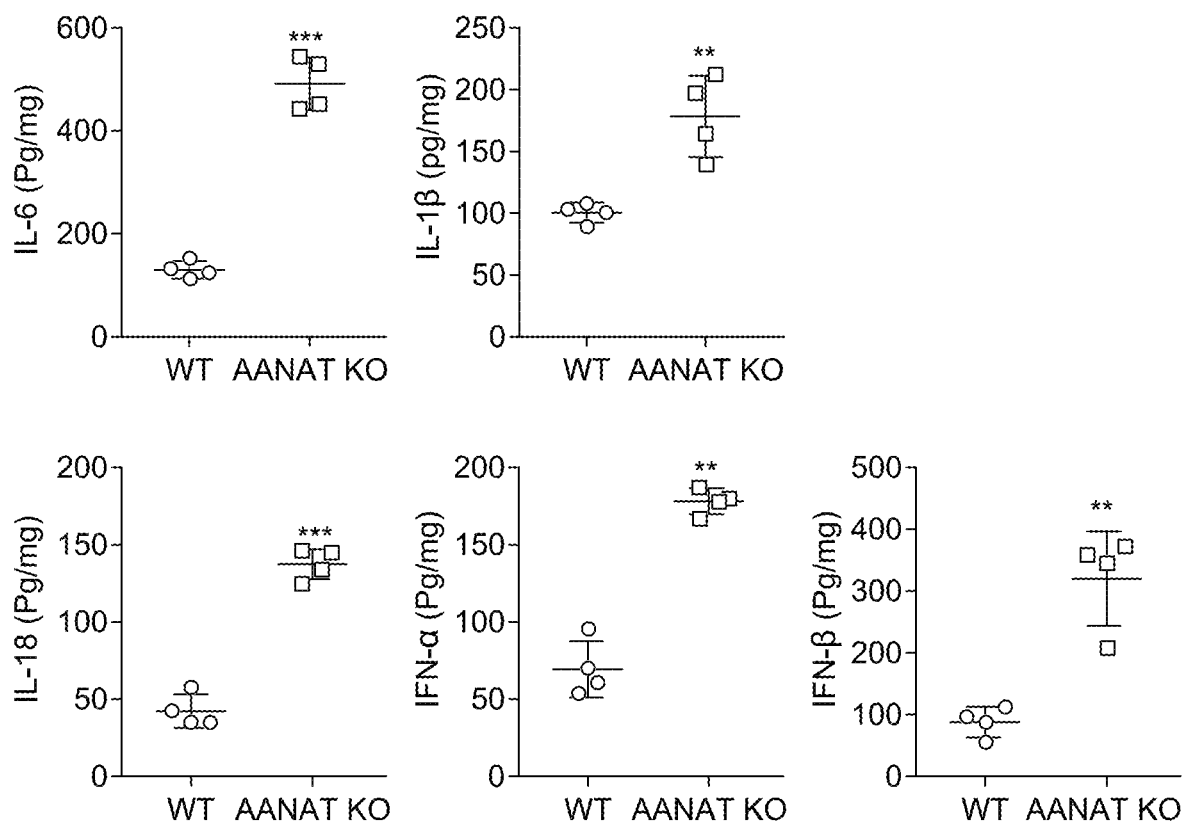
Figure 2D:
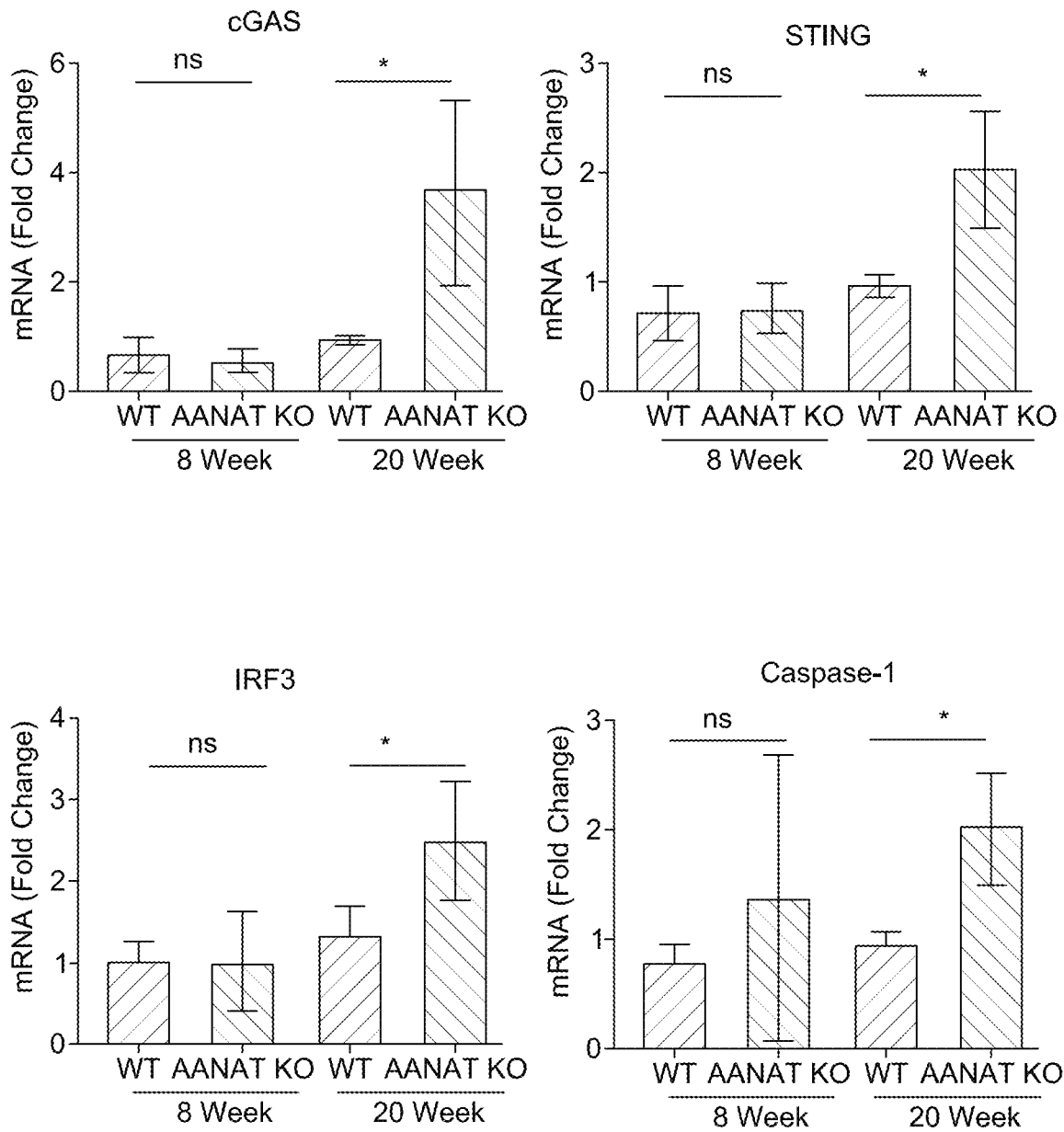
Figure 2E:
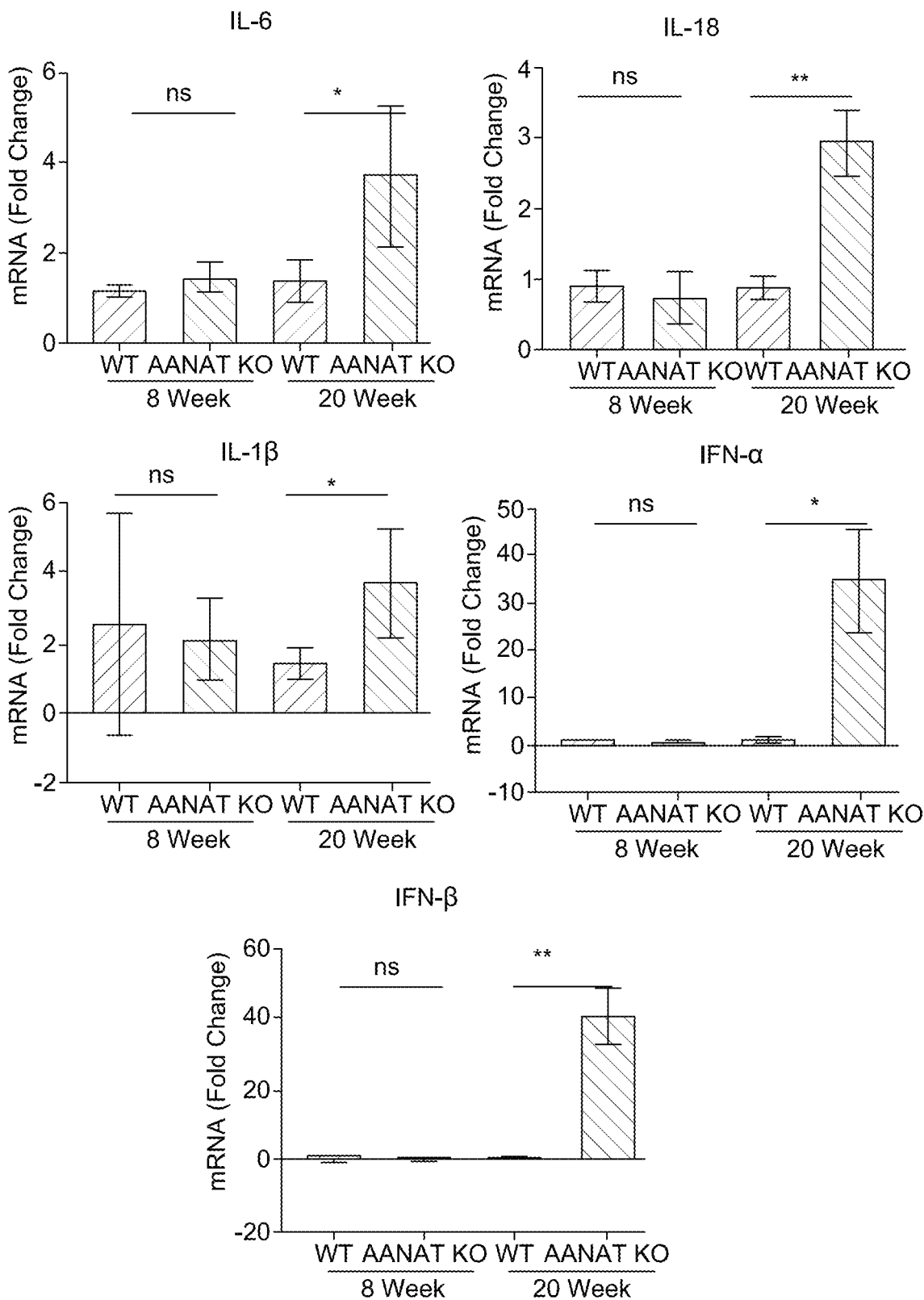

Given the role of melatonin in mitochondrial homeostasis, it was evaluated whether AANAT-KO mice have elevated levels of cytosolic mtDNA. By 20-weeks but not at 8-weeks of age, a 3.6+0.8-fold increase of cytosolic mtDNA was identified in AANAT-KO as compared to WT mice (FIG. 1E). Release of mtDNA into the cytosol activates an inflammatory response via the cGAS/STING/IRF3 signaling axis. Elevated levels of cGAS/STING/IRF3 proteins were found in 20-week old AANAT-KO brains compared to controls (FIGS. 1F and G). These results were complimented by qRT-PCR (FIG. 2D), which demonstrated increased mRNA expression at 20-weeks but not at 8-weeks of age. Moreover, AANAT-KO brains had increased caspase-1 activation (FIGS. 1F and G). Caspase-1 activation along with increased cGAS, STING and IRF3 expression in AANAT-KO mouse brain indicates activation of a neuroinflammatory response; and neuronal caspase-1 is a driver of neurodegeneration in vivo. Furthermore, AANAT-KO brain has elevated levels of pro-inflammatory cytokines and their respective mRNA (IL-6, IL-18, IL-1β, IFN-α, and IFN-β) compared to controls (FIG. 1H and FIG. 2E). These data demonstrate that melatonin deficit results in accelerated age-related elevated ROS damage, release of mtDNA activating the cGAS pathway and a pro-inflammatory response. In light of these results, progressive melatonin reduction associated with human ageing and neurodegenerative disease likely plays a role in increasing physiologic and pathologic degeneration.

Melatonin Mitigates mtDNA-Mediated Inflammatory Response in AANAT-KO Primary Cerebrocortical Neurons (PCNs)

Figure 3A:
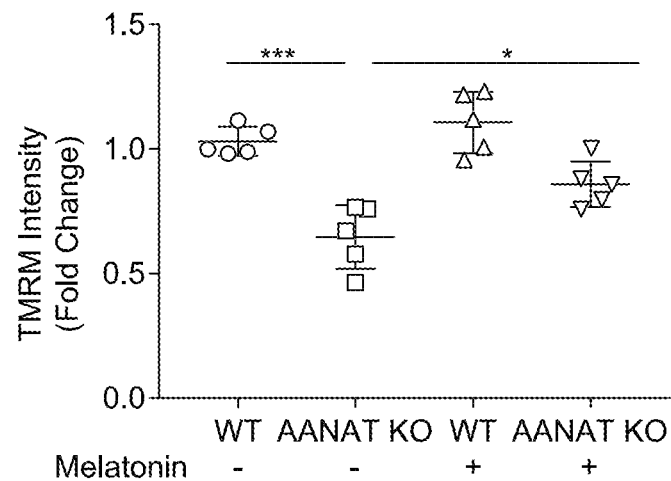
FIG. 3: AANAT-KO induces mtDNA release and subsequent inflammation in PCNs. (A) Analysis of MMP by TMRM in WT and AANAT-KO PCNs at DIV21 with or without melatonin (5 μM) in culture medium. TMRM fluorescence plotted relative to WT PCN after normalization to nuclear stain, N=5. (B) qPCR analysis of cytosolic mtDNA in WT and AANAT-KO PCNs using primers for mt-CO1, mt-Dloop1 and mt-Dloop3. Cytosolic mtDNA plotted relative to amount of WT PCN after normalization to β-actin from the corresponding total DNA lysate, N=3. (C) Representative immunoblot and (D) quantitation for cGAS, STING, IRF3, caspase-1 and β-Actin in WT and AANAT-KO. β-Actin was a loading control and data are expressed relative to untreated WT, N=3. (E) Cytokine ELISA in culture medium of WT and AANAT-KO PCNs expressed as pg cytokine per mL of culture medium. PCNs grown with or without melatonin (5 μM). All experiments were performed at DIV 21 (days in vitro), expressed as the mean±SD, analyzed by ANOVA followed by Tuckey's test, ns; non-significant *$P<0.05$, $P<0.01$, *$P<0.001$.
Figure 3B:
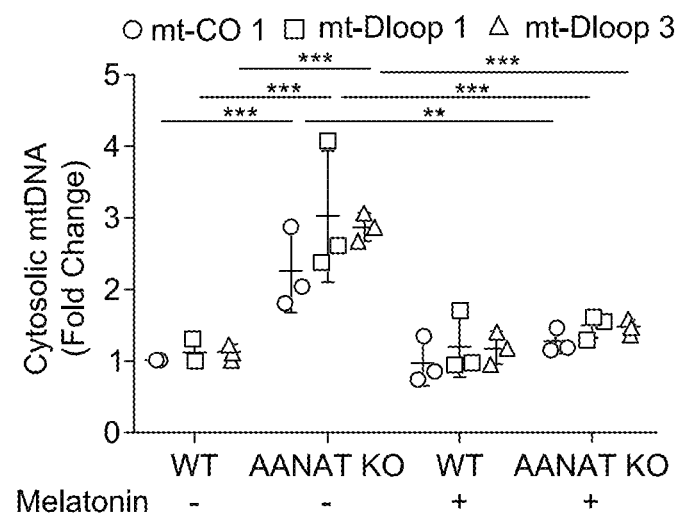
Figure 3C:
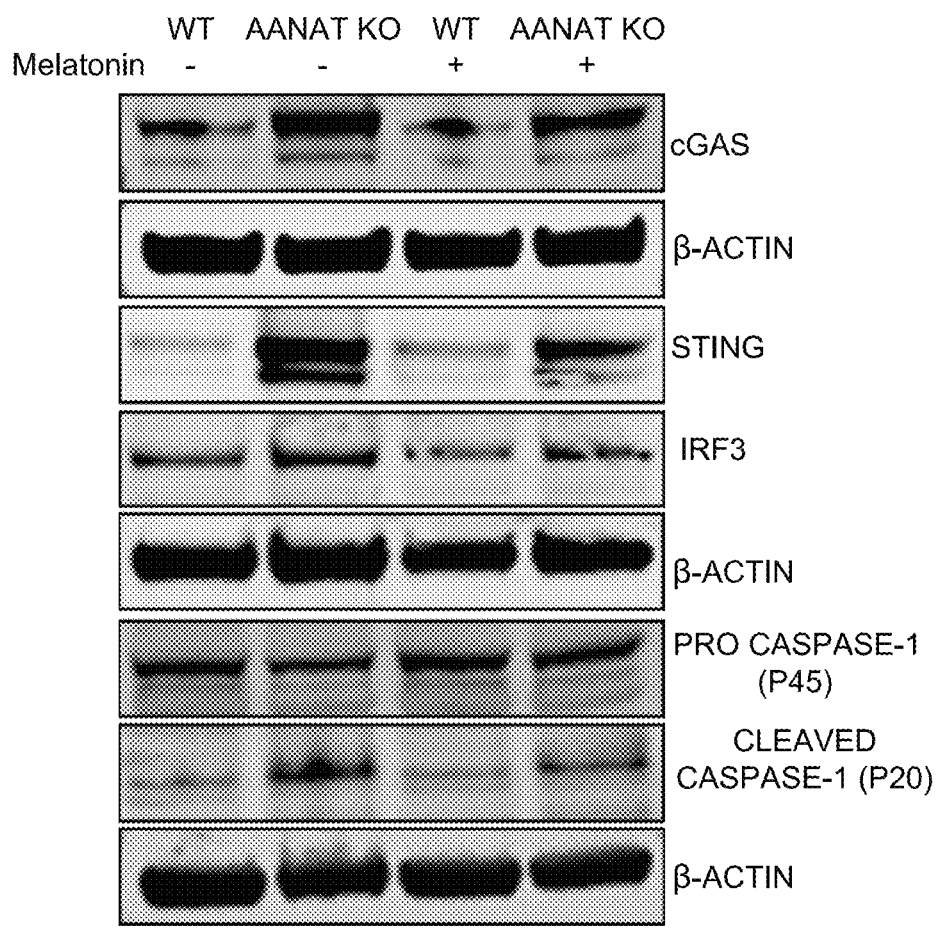
Figure 3D:
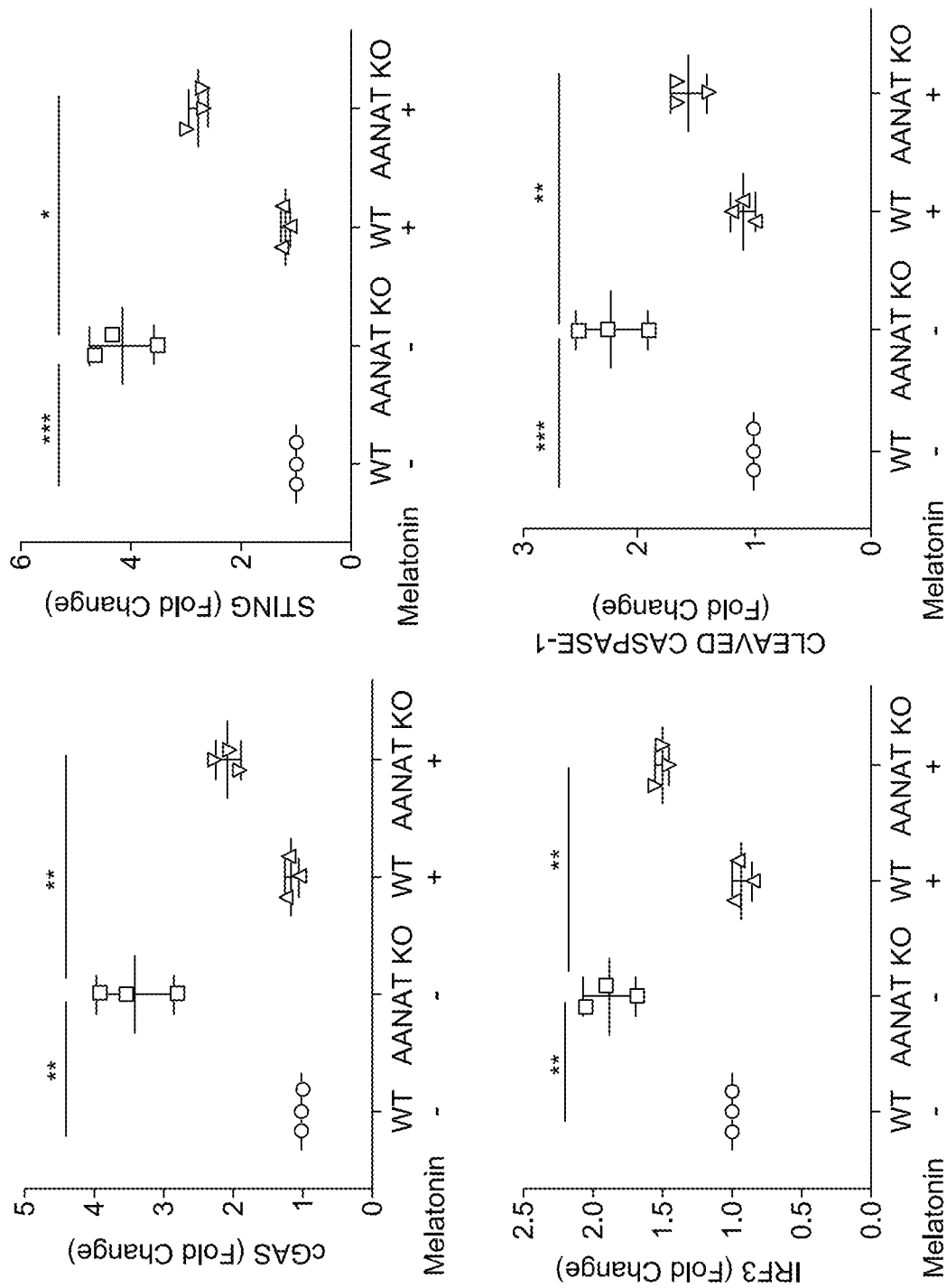
Figure 3E:
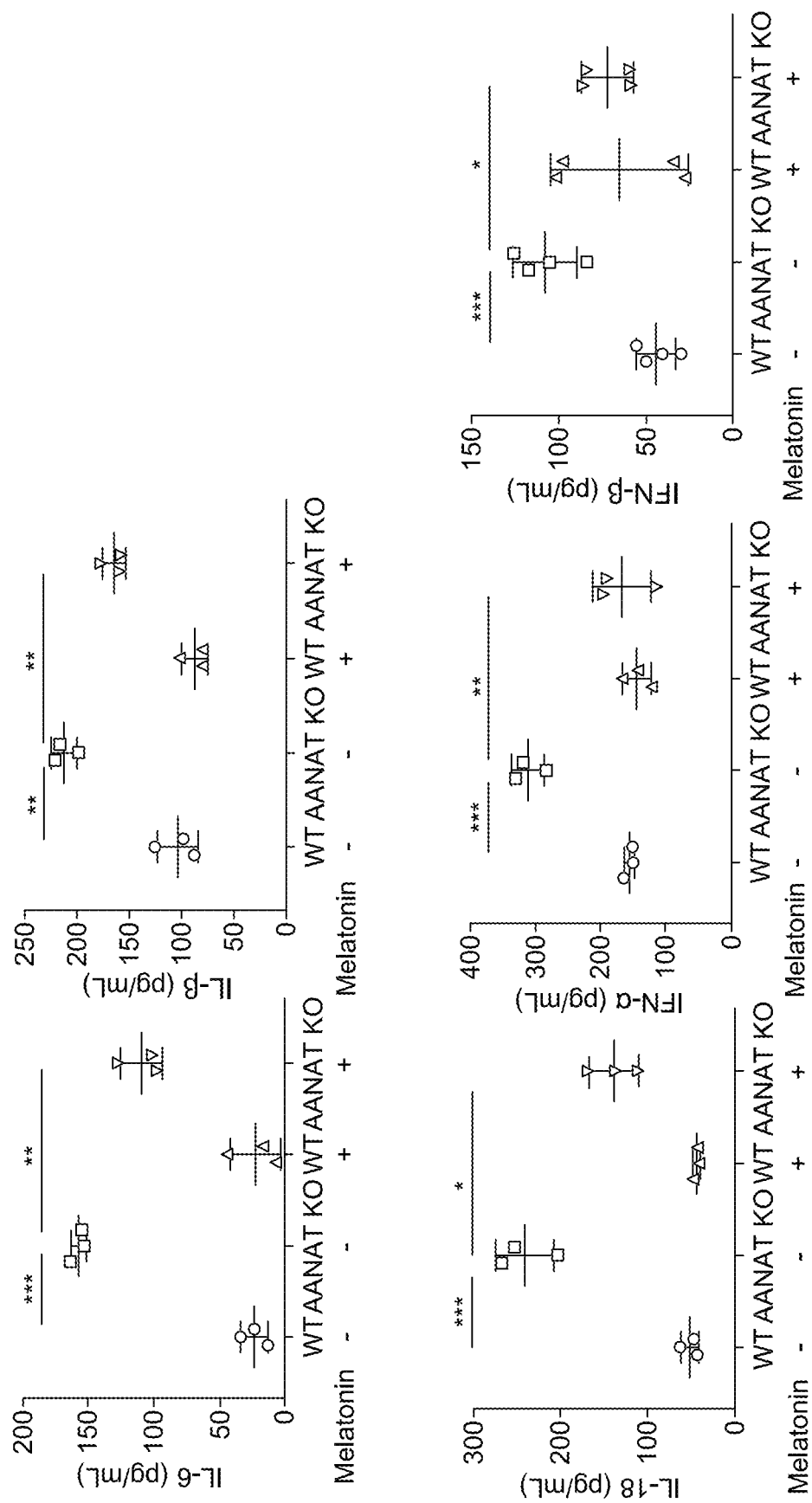
Figure 4A:
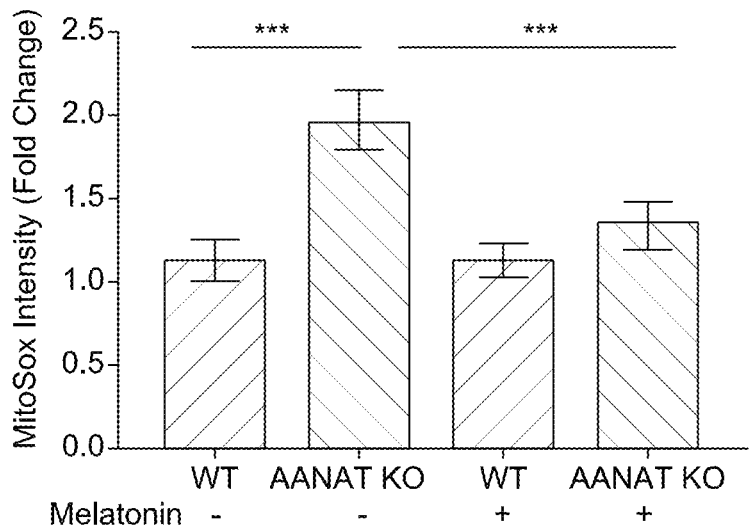
FIG. 4: Melatonin regulates mitochondrial dysfunction in PCNs. (A) Analysis of mitochondrial ROS by Mitosox in WT and AANAT-KO PCN at DIV21 with or without melatonin (5 μM) in culture medium. Mitosox fluorescence plotted relative to WT PCN after normalization to nuclear stain, N=5. (B) TMRM fluorescence intensity (MMP) dependence on distance between mitochondria and nuclei for WT and AANAT PCN. Data normalized to mtGFP fluorescence intensity expressed as relative units, N=21 PCN. Data are shown as mean±SD analyzed by ANOVA followed by Tuckey's test, *$P<0.05$, ***$P<0.001$.
Figure 4B:
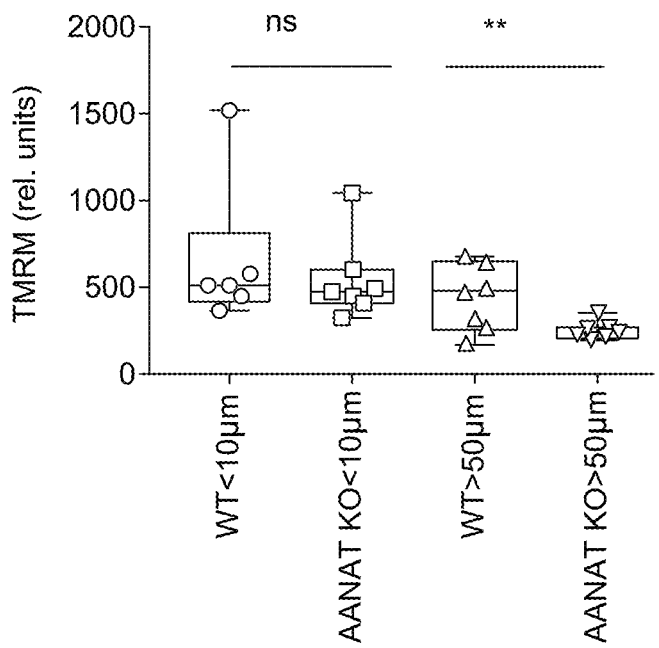

To complement in vivo studies with neuron-specific data, AANAT-KO and WT PCNs were cultured for 21 days and MMP and mitochondrial ROS accumulation were measured. MMP decreased and ROS increased in AANAT-KO PCN; both parameters were restored by exogenous melatonin (FIG. 3A and FIG. 4A). MMP exists as a gradient in neurons, whereby synaptic mitochondria have lower MMP than somal mitochondria, resulting in synaptic vulnerability. MMP is similar in somal mitochondria (<10 μm from nucleus) but decreased in synaptic AANAT-KO mitochondria (>50 μm from nucleus) (FIG. 4B). Thus, the MMP gradient is exacerbated in AANAT-KO PCN, indicating greater synaptic vulnerability. Like AANAT-KO brain, AANAT-KO PCNs demonstrate increased cytosolic mtDNA, cGAS/STING/IRF3, caspase-1 and proinflammatory cytokines, secretion, all of which were inhibited by melatonin (FIG. 3B-E). Consistent with in vivo data neuronal melatonin depletion results in mitochondrial ROS damage, mtDNA release and elevation of inflammatory cytokines, all inhibited by melatonin.

Figure 5A:
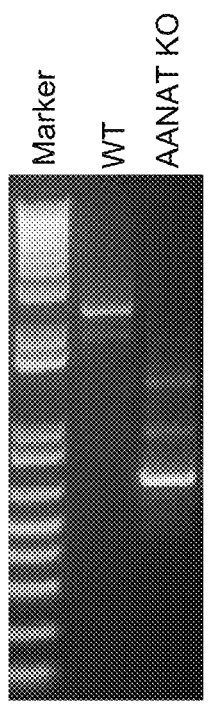
FIG. 5: Inhibition of melatonin synthesis alters mitochondrial homeostasis. (A) Agarose gel electrophoreses of PCR product of AANAT gene in WT and AANAT-KO N2a cells. AANAT-KO N2a cells were created using CRISPR/Cas-9 system. (B) LC-MS quantification of melatonin in cell lysate and (C) mitochondria of WT and AANAT-KO N2a cells, N=3. (D) Representative immunofluorescence image of 8-OHDG, marker of DNA oxidation and TOM20, mitochondrial marker, in differentiated WT and AANAT-KO N2a cells with or without melatonin (5 μM) in culture medium, N=5. (E) Representative image and quantified pre and mature-orthithine transcarbamilase (pOTC and mOTC) protein import assay in mitochondria of differentiated WT and AANAT-KO N2a cells, N=3. Cleavage of pOTC into mOTC occurs in the mitochondrial matrix following import. (F) Flow cytometry analysis of Mitosox fluorescence in WT and AANAT-KO differentiated N2a cells with or without melatonin (5 μM) in culture medium, N=3. (G) Flow cytometry analysis of JC-1 fluorescence in WT and AANAT-KO differentiated N2a cells with or without melatonin (5 μM) in culture medium, N=3. (H) Representative image of mitochondrial permeability transition pore opening assay in WT and AANAT-KO differentiated N2a cells with or without melatonin (5 μM) in culture medium, N=3. Data are shown as mean±SD analyzed by one sample t test (panels B and C) and by ANOVA followed by Tuckey's test (panels E-G). *$P<0.05$, $P<0.01$, *$P<0.001$.
Figure 5B:
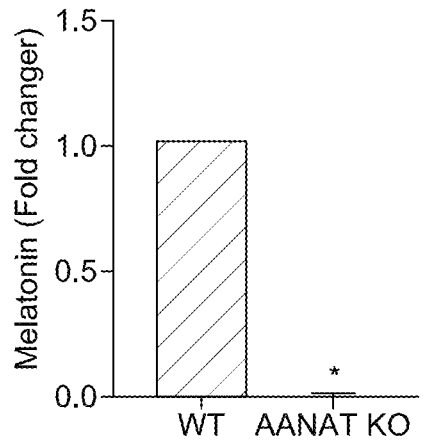
Figure 5C:
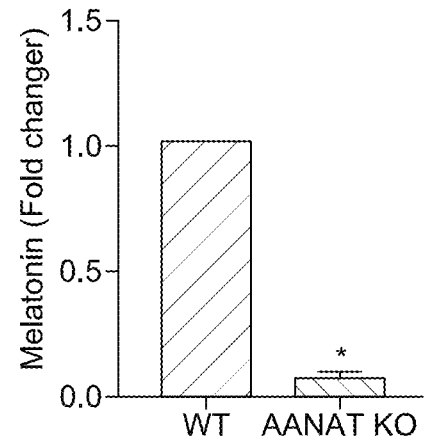
Figure 5D:
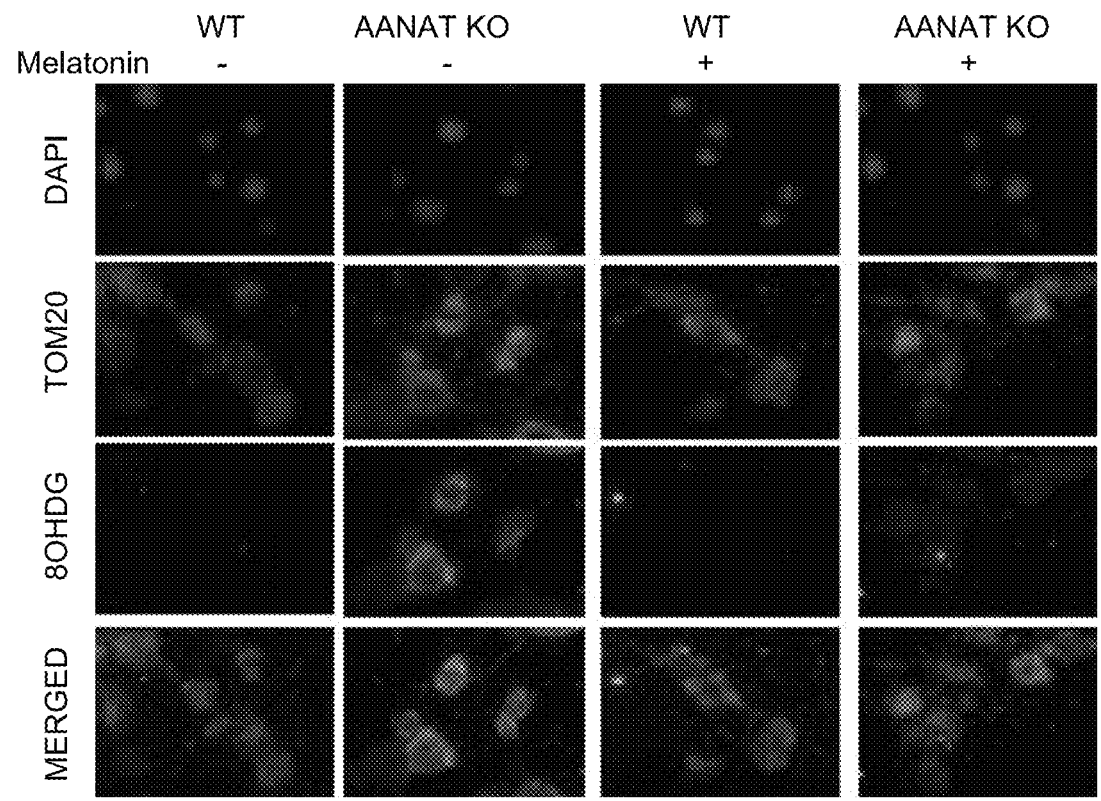
Figure 5E:
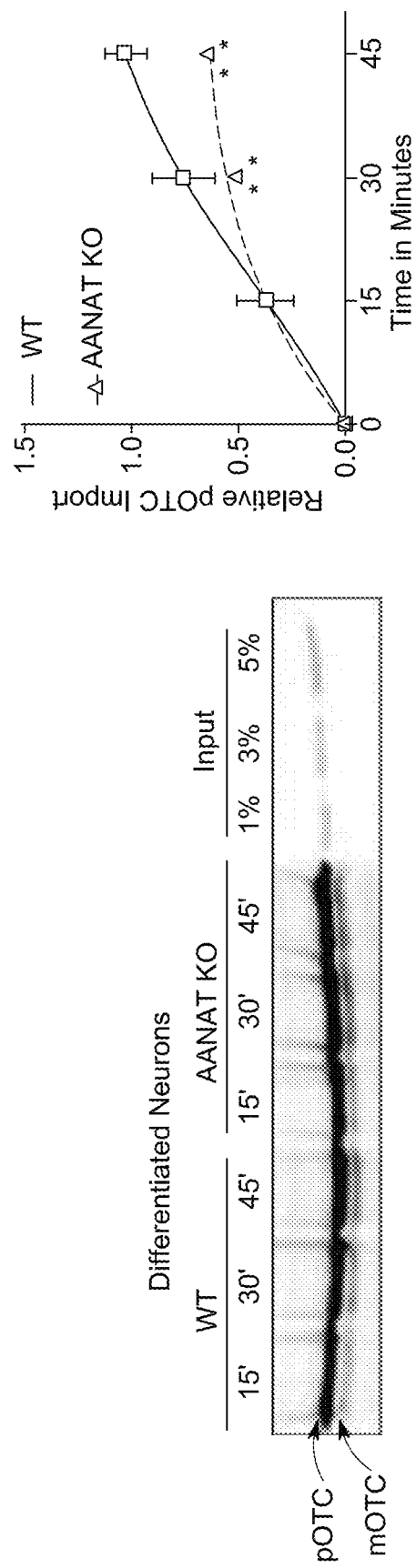
Figure 5F:
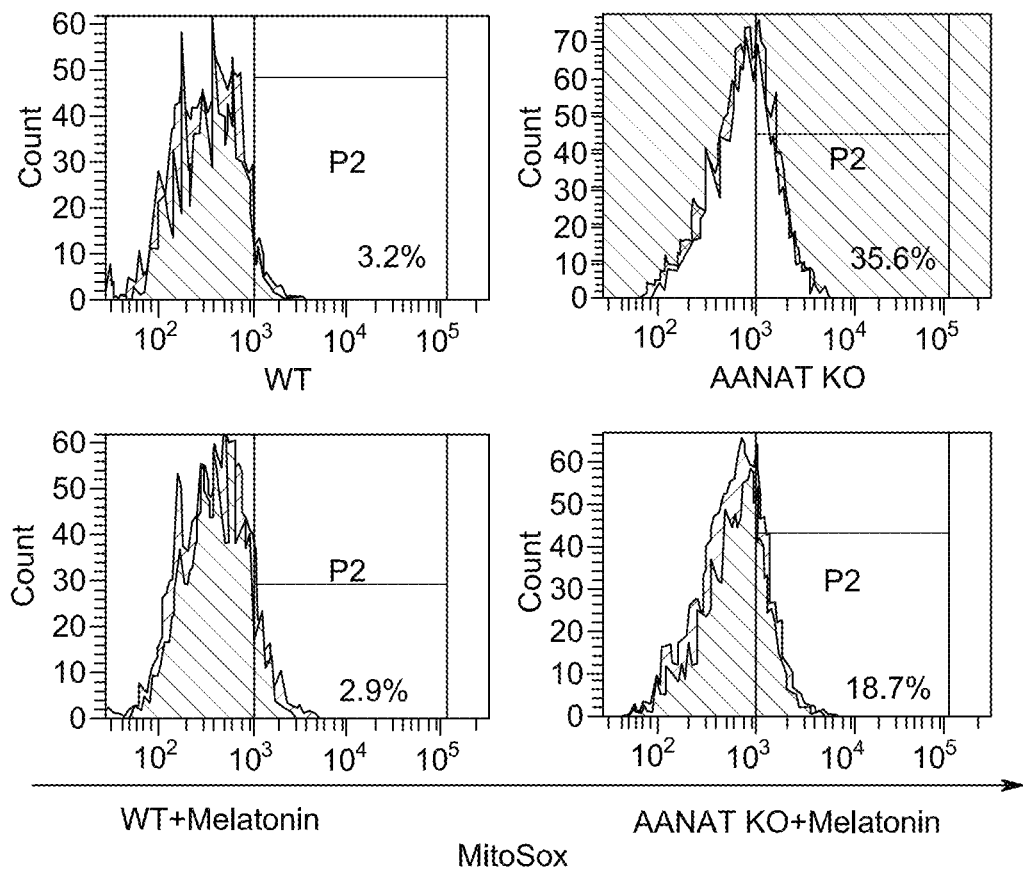
Figure 5F:
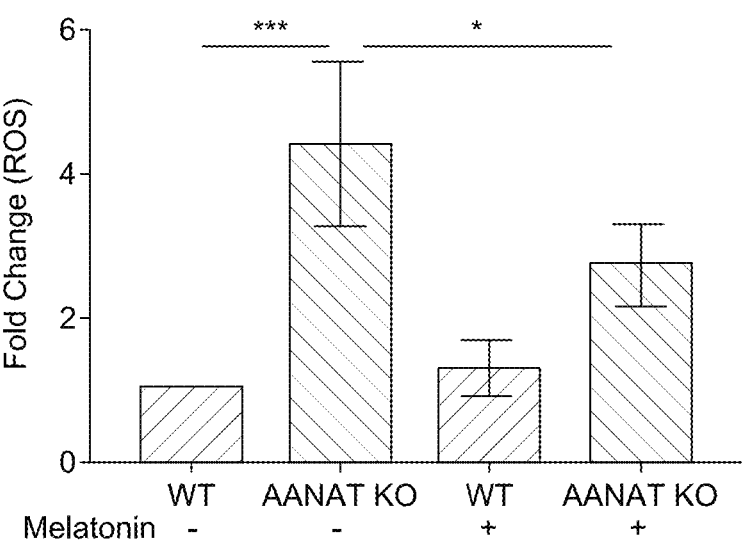
Figure 5G:
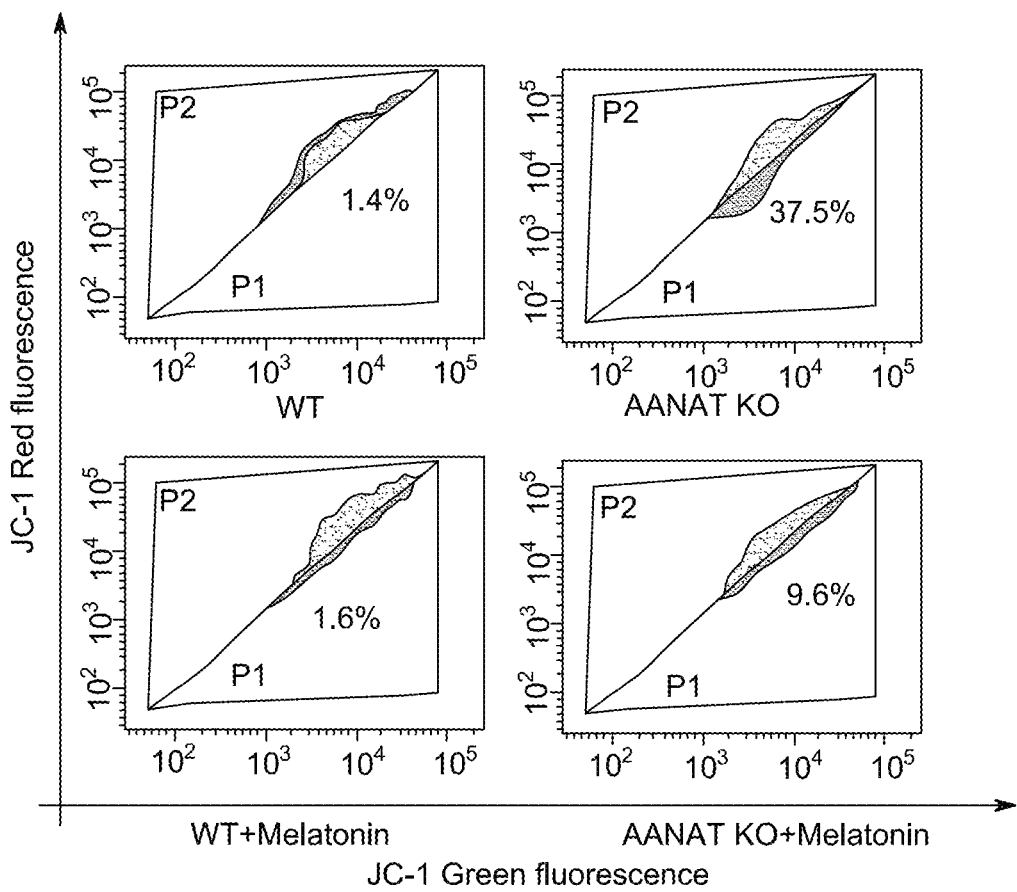
Figure 5G:
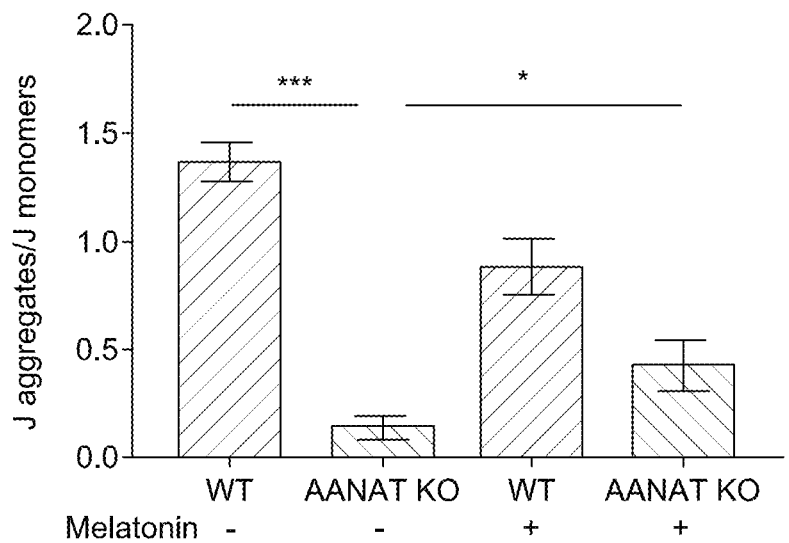
Figure 5H:
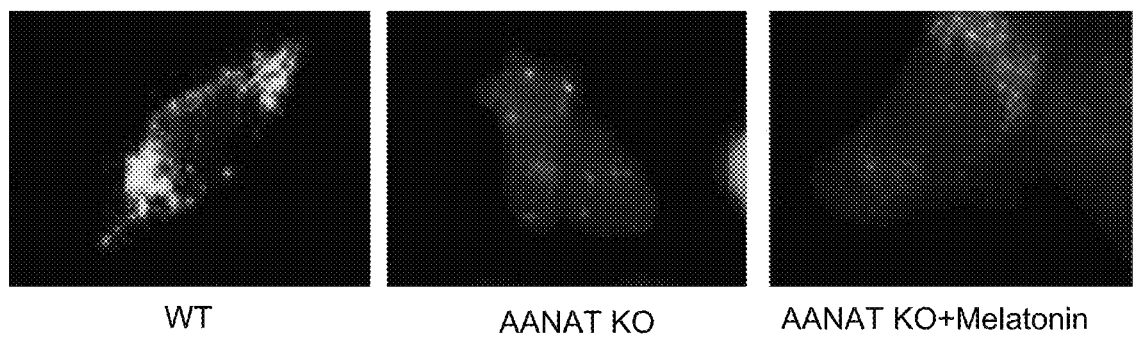

Neuroinflammation and Neurodegeneration are Increased in Differentiated N2a AANAT-KO Cells; Effects Attenuated by Melatonin To further investigate AANAT-KO effects on neurons, AANAT KO N2a neuroblastoma cells were generated (FIG. 5a). It was confirmed that N2a cells produce melatonin, and it was confirmed that melatonin was absent in AANAT-KO N2a cells (FIGS. 5B and C). WT and AANAT-KO N2a cells were differentiated into mature neurons. mtDNA oxidative damage was assayed by immunofluorescence using an antibody against 8-hydroxyguanasine (8-OHDG). AANAT-KO differentiated neurons have increased mtDNA damage, slower mitochondrial protein import, lower MMP and higher ROS as compared to WT differentiated neurons; abnormalities mitigated by melatonin (FIG. 5D-G). Further, mitochondrial permeability transition was higher in mitochondria of AANAT-KO differentiated neurons and melatonin partially inhibited it (FIG. 5H). Mitochondrial damage and dysfunction in AANAT-KO cells which is rescued by melatonin suggest a critical role for melatonin in mitochondrial health. Melatonin deficiency in AANAT-KO N2a cells only resulted in mtDNA-mediated inflammatory response in differentiated and not in undifferentiated AANAT-KO N2a cells, suggesting that post-mitotic cells are dependent on melatonin but undifferentiated cells are not.

Figure 6A:
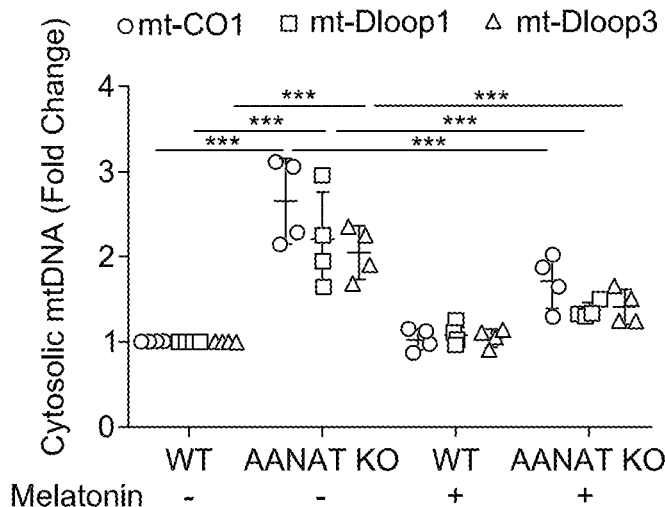
FIG. 6: Melatonin inhibits neuroinflammation and degeneration in AANAT-KO differentiated neurons. (A) qPCR analysis of cytosolic mtDNA in WT and AANAT-KO differentiated N2a cells grown with or without melatonin (5 μM) using primers for mt-CO1, mt-Dloop1 and mt-Dloop3. Cytosolic mtDNA is plotted relative to the amount of WT N2a after normalization to β-actin from the corresponding total DNA lysate, N=6. (B) Representative immunoblots and (C) quantification of cGAS, STING, IRF3, pNF-κβ, caspase-1 and β-Actin in WT and AANAT-KO differentiated N2a cells grown with or without melatonin (5 μM). β-Actin was a loading control and protein levels are expressed relative to untreated WT, N=4. (D) Cytokine ELISA in culture medium of WT and AANAT-KO differentiated N2a cells grown with or without melatonin (5 μM), N=3. For all experiments, WT and AANAT-KO N2a cells were differentiated by retinoic acid (10 μM) exposure for 8 days. (E) Representative images of immunocytochemical analysis of 111-tubulin in WT and AANAT-KO differentiated N2a cells grown with or without melatonin (5 μM). (F) Average neurite length and (G) average neurite number analysis by neuron J logarithm using image J in 111-tubulin stained WT and AANAT-KO differentiated N2a cells grown with or without melatonin (5 μM), N=10 viewfields across independent experiments, data is expressed as mean±SD and analyzed by ANOVA followed by Tuckey's test. *$P<0.05$, $P<0.01$, *$P<0.001$.
Figure 6B:
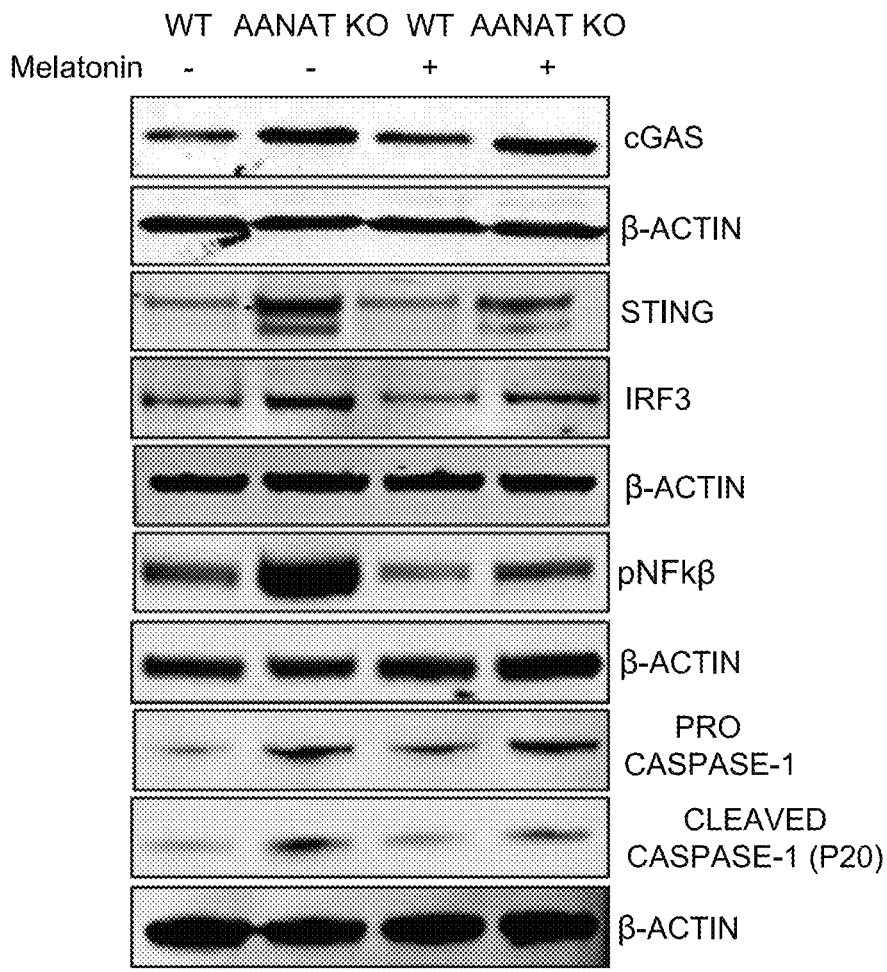
Figure 6C:
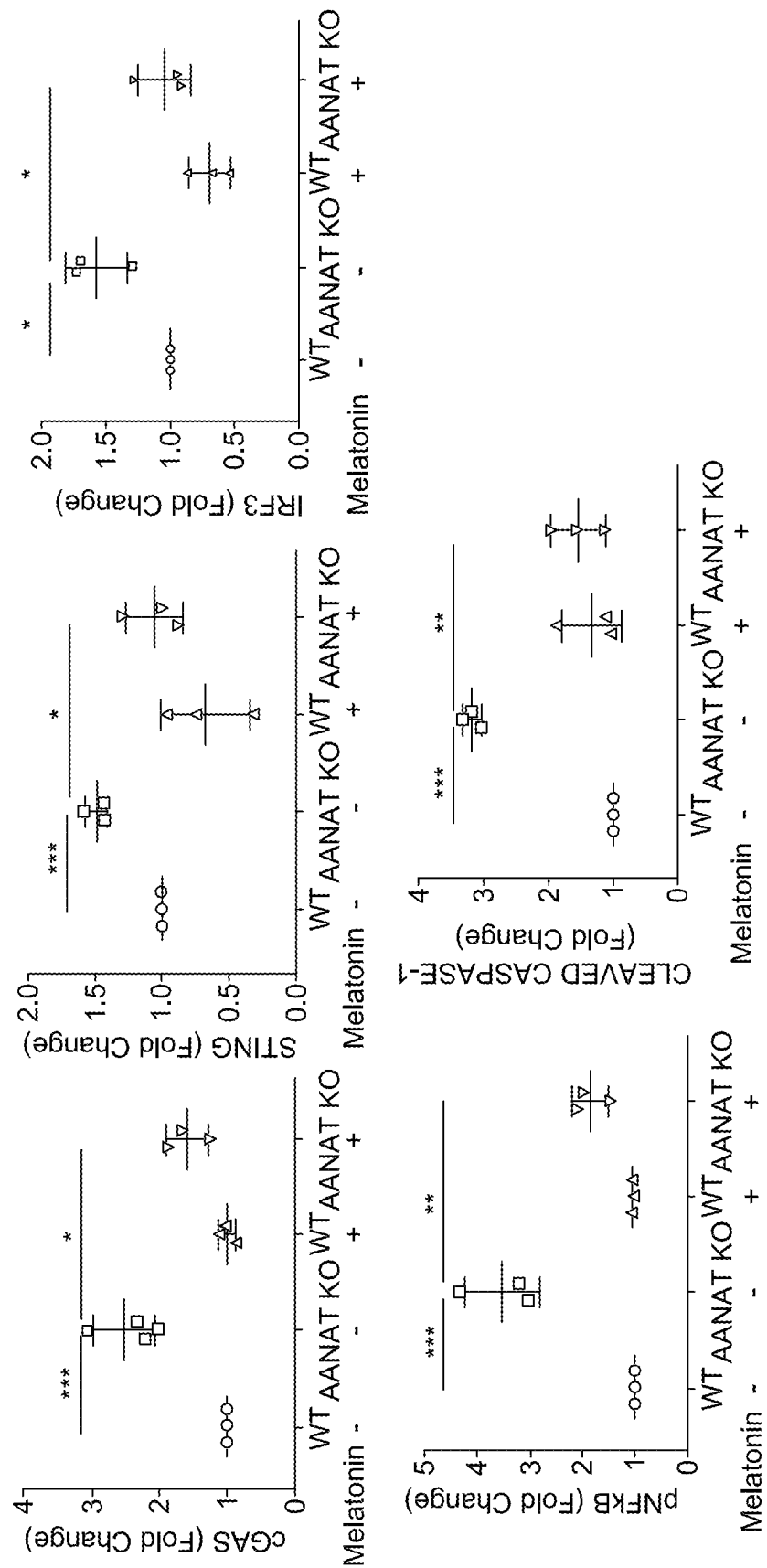
Figure 6D:
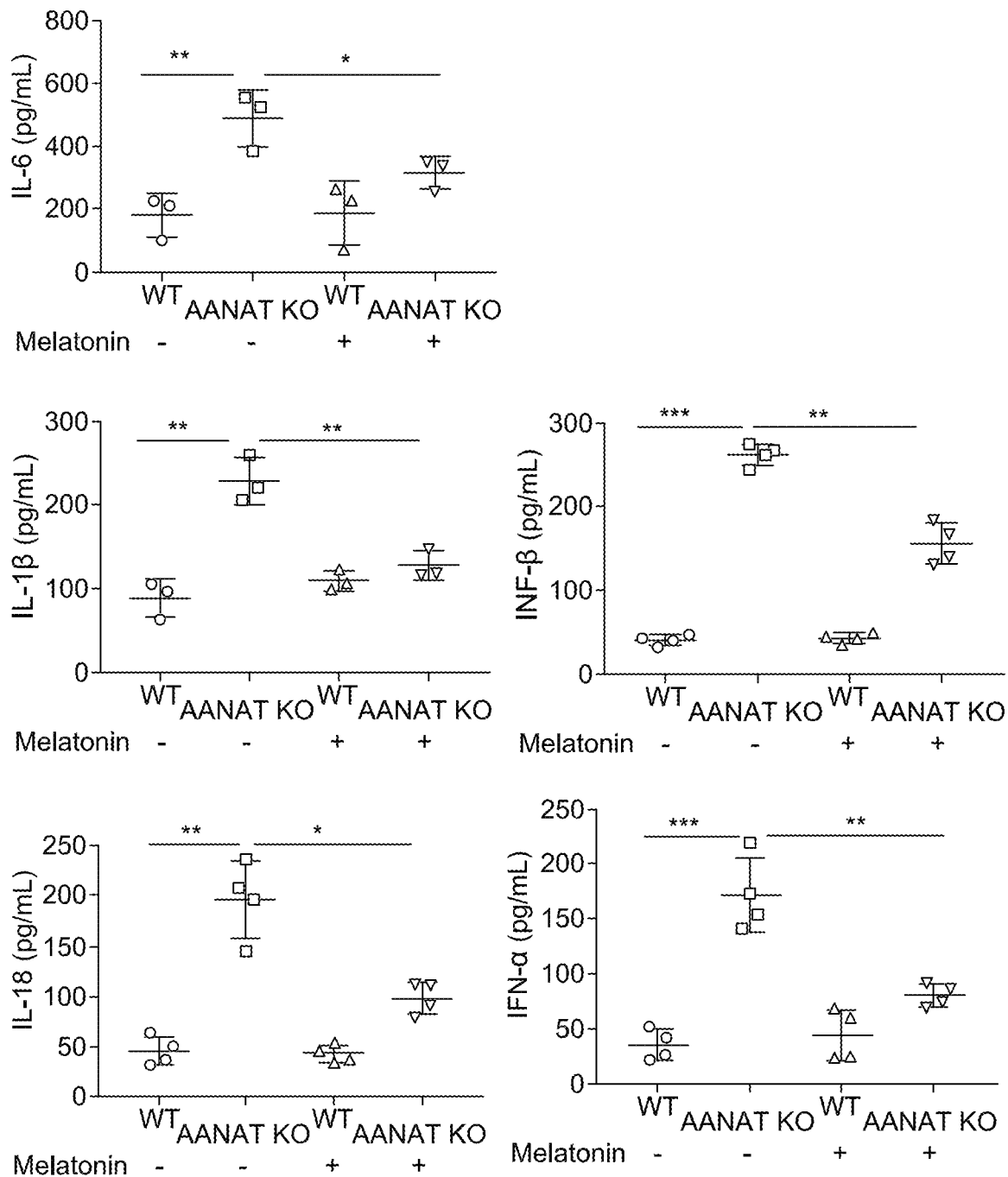
Figure 6E:
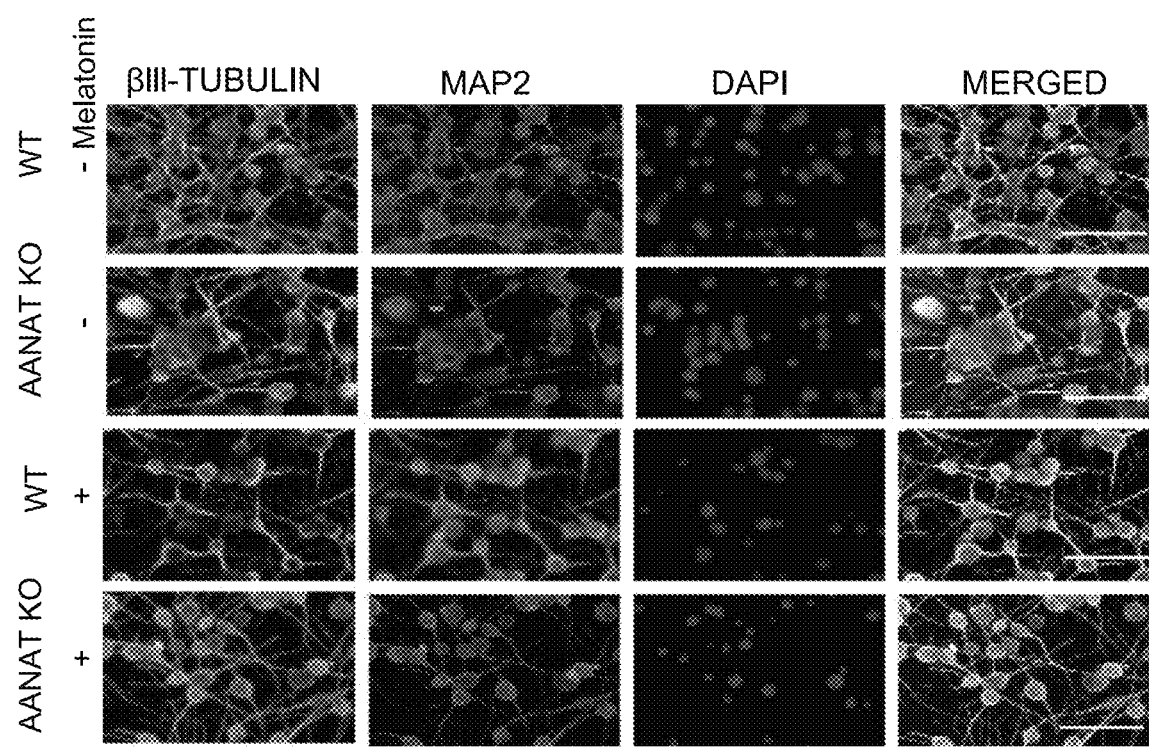
Figure 6F:
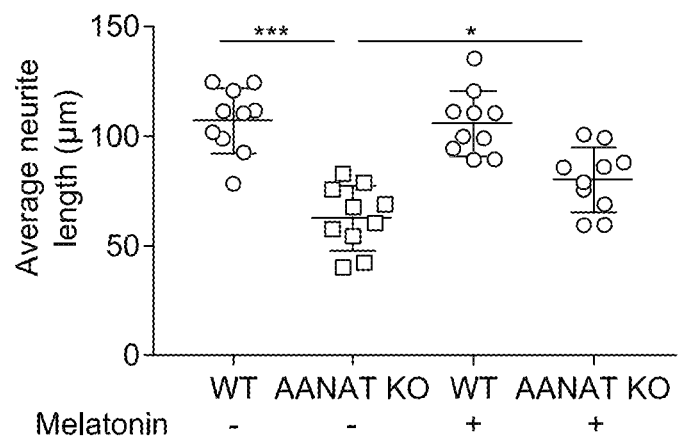
Figure 6G:
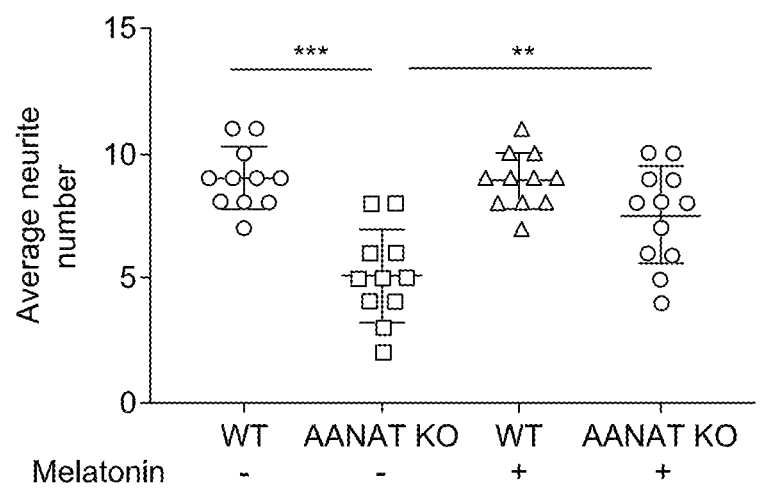
Figure 7A:
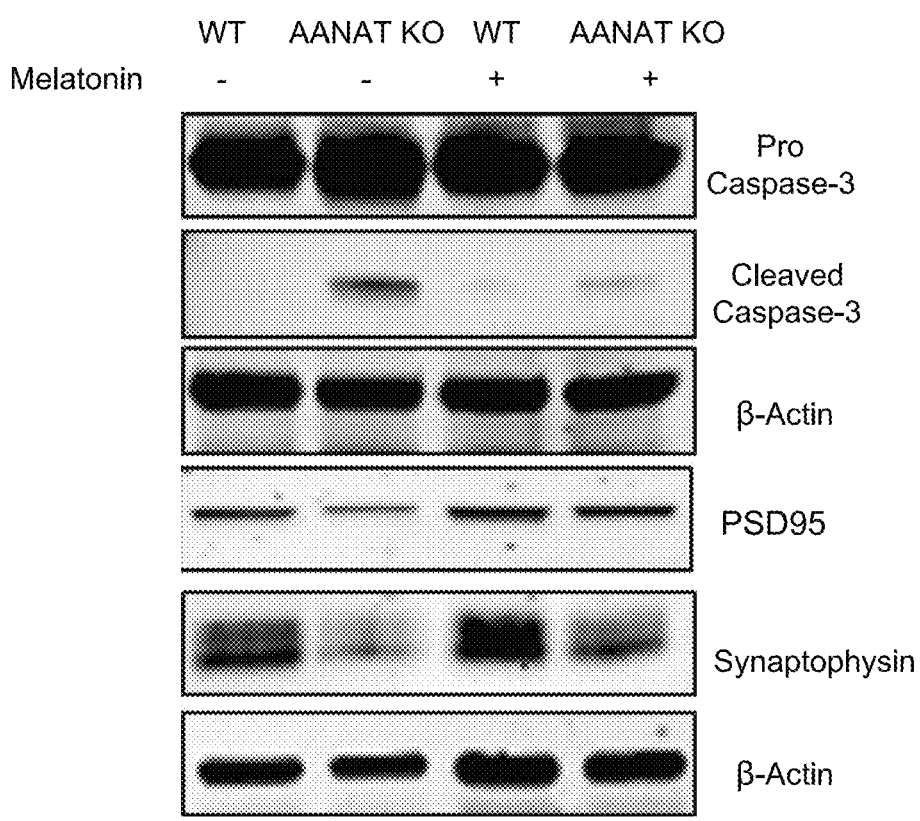
FIG. 7: Melatonin regulates mtDNA release and caspase activation in differentiated neurons. (A) Representative Immunoblots and (B) quantitation for caspase-3, PSD95, synaptophysin and β-actin in total cell lysate of WT and AANAT-KO differentiated N2a cells growing with or without melatonin (5 µM) in culture medium. β-Actin was used as a loading control and protein levels are expressed as fold change compared with untreated WT, N=3. Data are shown as mean±SD analyzed by ANOVA followed by Tuckey's test. *P<0.05, P<0.01, *P<0.001.
Figure 7B:
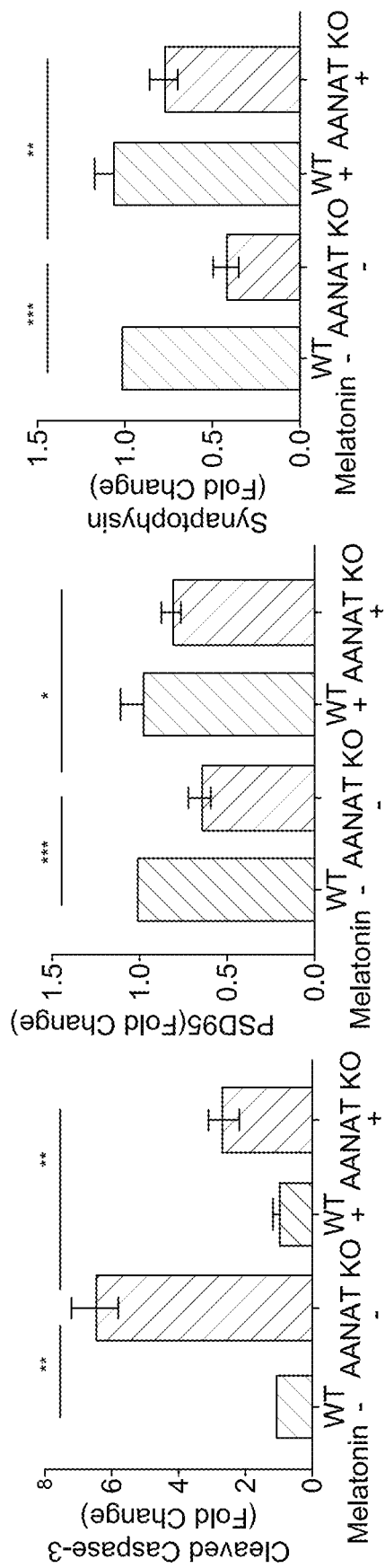

Consistent with AANAT-KO PCNs, mtDNA release was increased in differentiated AANAT-KO N2a neurons, and the increase was prevented by melatonin (FIG. 6A). Three common regulators of inflammatory responses (Nf-kβ, caspase-1, and cGAS/STING/IRF3) were then evaluated. Nf-kB was phosphorylated and caspase-1 was cleaved, suggesting activation of both pathways, while cGAS/STING/IRF3 levels were increased in AANAT-KO differentiated N2a neurons. All inflammatory signaling pathways were inhibited by melatonin in AANAT-KO differentiated neurons (FIGS. 6B and C). Consistent with this data, AANAT-KO N2a neurons secrete elevated levels of pro-inflammatory cytokines; all of which were inhibited by melatonin (FIG. 6D). As an additional indicator of cellular stress, AANAT-KO differentiated N2a neurons had greater caspase-3 activation which was inhibited by melatonin (FIGS. 7A and B). Inflammatory signaling modulates synaptic pruning. Synaptic and neuritic degeneration were prominent in AANAT-KO N2a differentiated neuron as compared to WT. Average neurite length and number were reduced in AANAT-KO differentiated neurons and were rescued by melatonin (FIG. 6E-G). Expression of PSD95, a post-synaptic marker and synaptophysin, a pre-synaptic marker, were reduced in AANAT-KO differentiated neurons suggesting synaptic degeneration. The levels of these markers were increased by melatonin (FIGS. 7A and B).

Figure 8A:
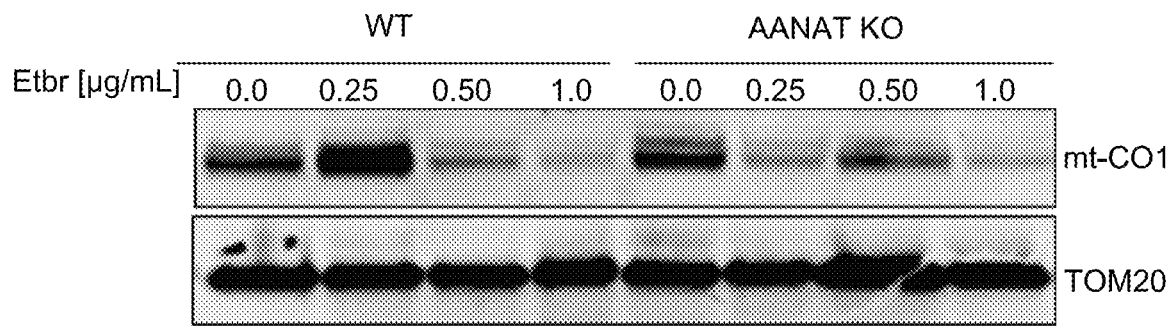
FIG. 8: EtBr treatment depletes mtDNA and its encoded proteins in WT and AANAT-KO N2a Cells. (A) Representative Immunoblots and (B) quantitation for mt-CO1 and TOM20 in total cell lysate of WT and AANAT-KO N2a cells exposed with different concentration of EtBr. TOM20 was used as a loading control and protein levels are shown as fold change as compared with untreated for each genotype, N=3. (C) qPCR analysis of mitochondrial DNA copy number in WT and AANAT-KO N2a cells exposed with EtBr. β-Actin was used as endogenous control, and mtDNA is plotted relative to amount in WT N2a cells after normalization to β-actin, N=3. (D) Analysis of mitochondrial ROS by Mitosox in WT and AANAT-KO differentiated N2a cells with or without EtBr (1 µg/mL) treatment. Mitosox fluorescence is plotted relative to amount in WT differentiated N2a cells after normalization to nuclear stain, N=3. (E) Analysis of MMP by TMRM in WT and AANAT-KO N2a cells exposed with or without EtBr (1 µg/mL). TMRM fluorescence is plotted relative to the amount in WT differentiated N2a cells after normalization to nuclear stain, N=3. (F) qPCR analysis for mRNA of PSD95, synaptophysin, homer 1 and caspase-1 in WT and AANAT-KO differentiated N2a cells with or without EtBr treatment (1 µg/mL). β-actin was used as endogenous control, and data is plotted relative to amount in WT N2a cells after normalization to β-Actin for each gene, N=3. Data are shown as mean±SD analyzed by ANOVA followed by Tuckey's test, ns; non-significant *P<0.05, ***P<0.001.
Figure 8B:
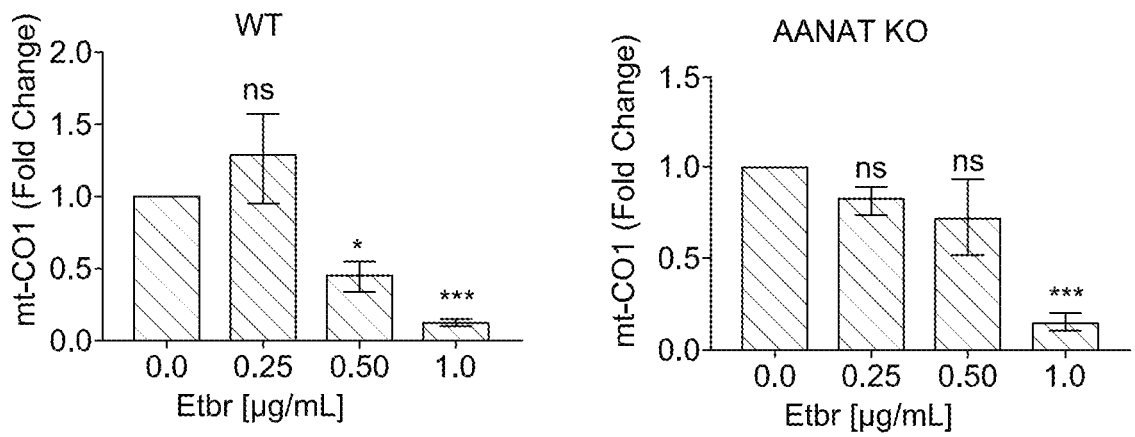
Figure 8C:
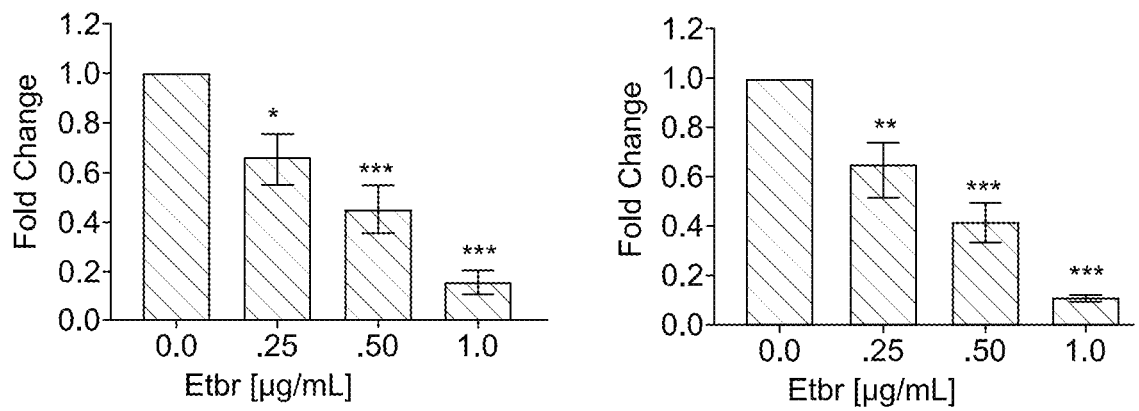
Figures 9A, 9B:
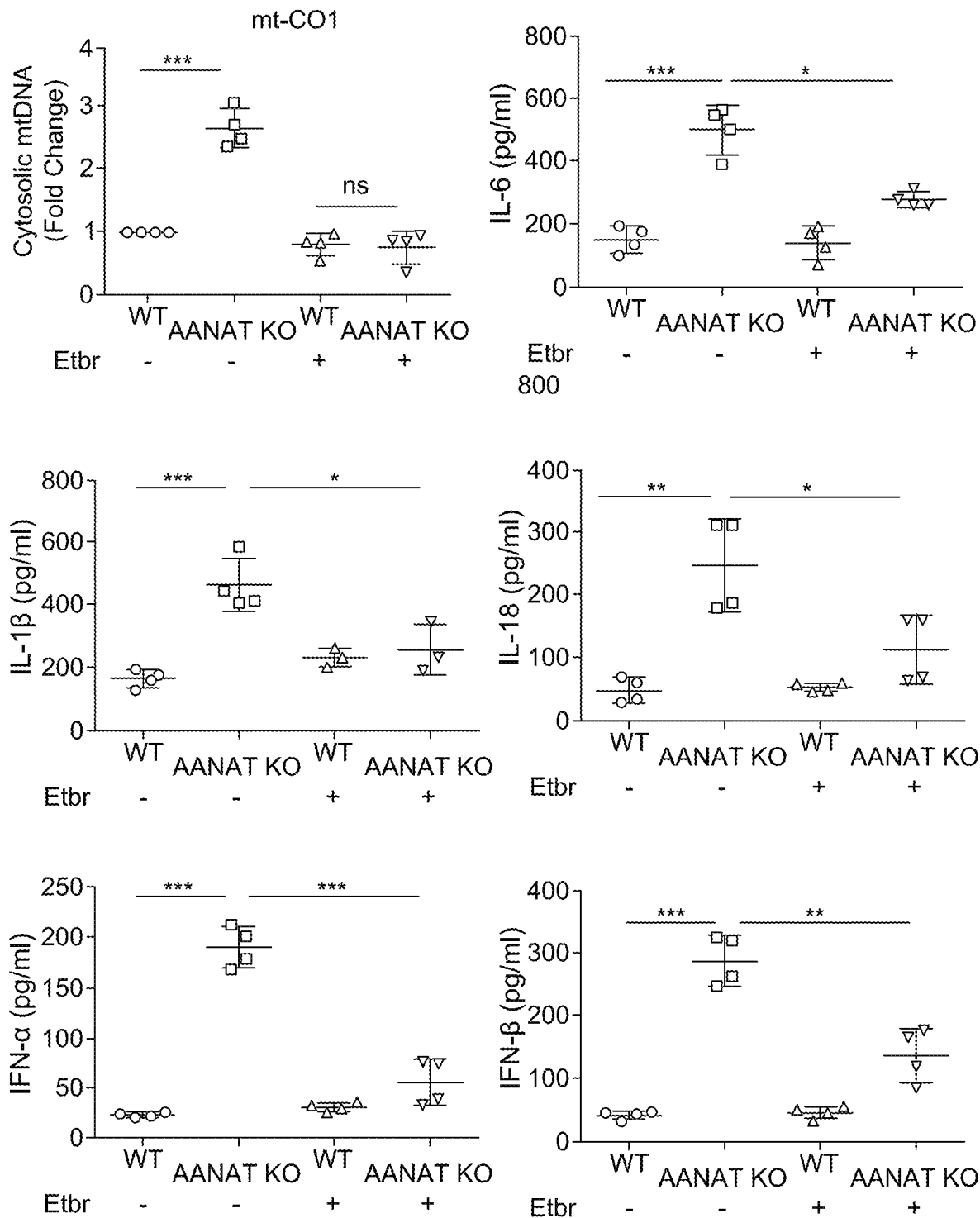
FIG. 9: mtDNA depletion rescues synaptic degeneration and caspase activation in AANAT-KO differentiated neurons. (A) qPCR of cytosolic mtDNA in WT and AANAT-KO differentiated neurons grown with or without EtBr. Naïve WT and AANAT-KO N2a cells were treated with EtBr (1 µg/mL) for 4 weeks to deplete mtDNA. Cytosolic mtDNA was measured using qPCR with primers for mt-CO1, mt-Dloop1 and mt-Dloop3. Cytosolic mtDNA plotted relative to amount of untreated WT N2a after normalization to β-actin from the corresponding total DNA lysate, N=5. (B) Cytokine ELISA in culture medium of WT and AANAT-KO differentiated neurons and mtDNA depleted cells, N=3. (C) Representative immunoblots and (D) quantification of PSD95, Synaptophysin, caspase-1, caspase-3, caspase-9, tBid and β-Actin in WT and AANAT-KO differentiated neurons and their mtDNA depleted form. β-actin was used as loading control, N=3. For all experiments, untreated and mtDNA depleted WT and AANAT-KO N2a cells were differentiated with retinoic acid (10 µM) exposure for 8 days, data is expressed as mean±SD, and analyzed by ANOVA followed by Tuckey's test, *P<0.05, P<0.01, *P<0.001.
Figure 9C:
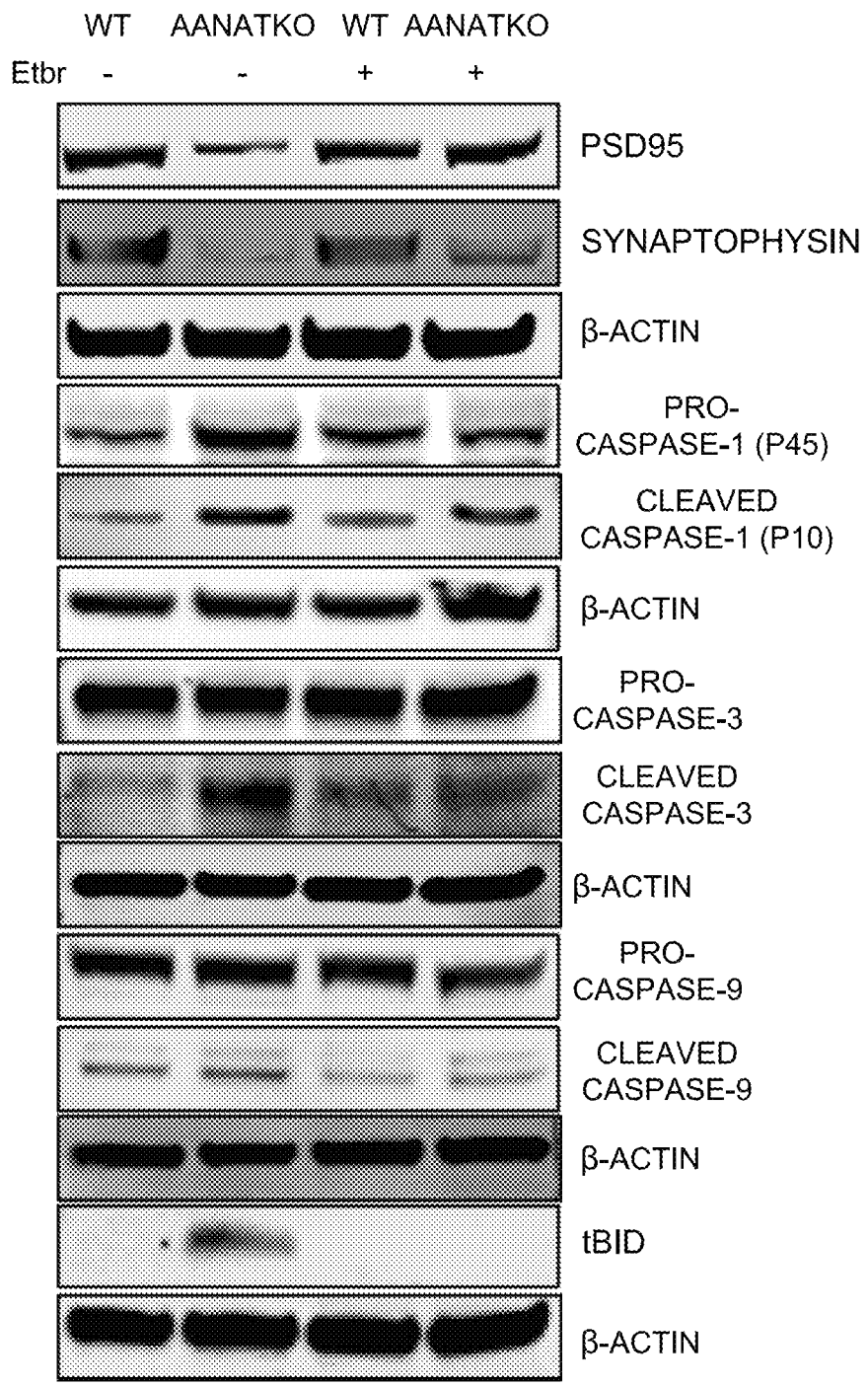
Figure 9D:
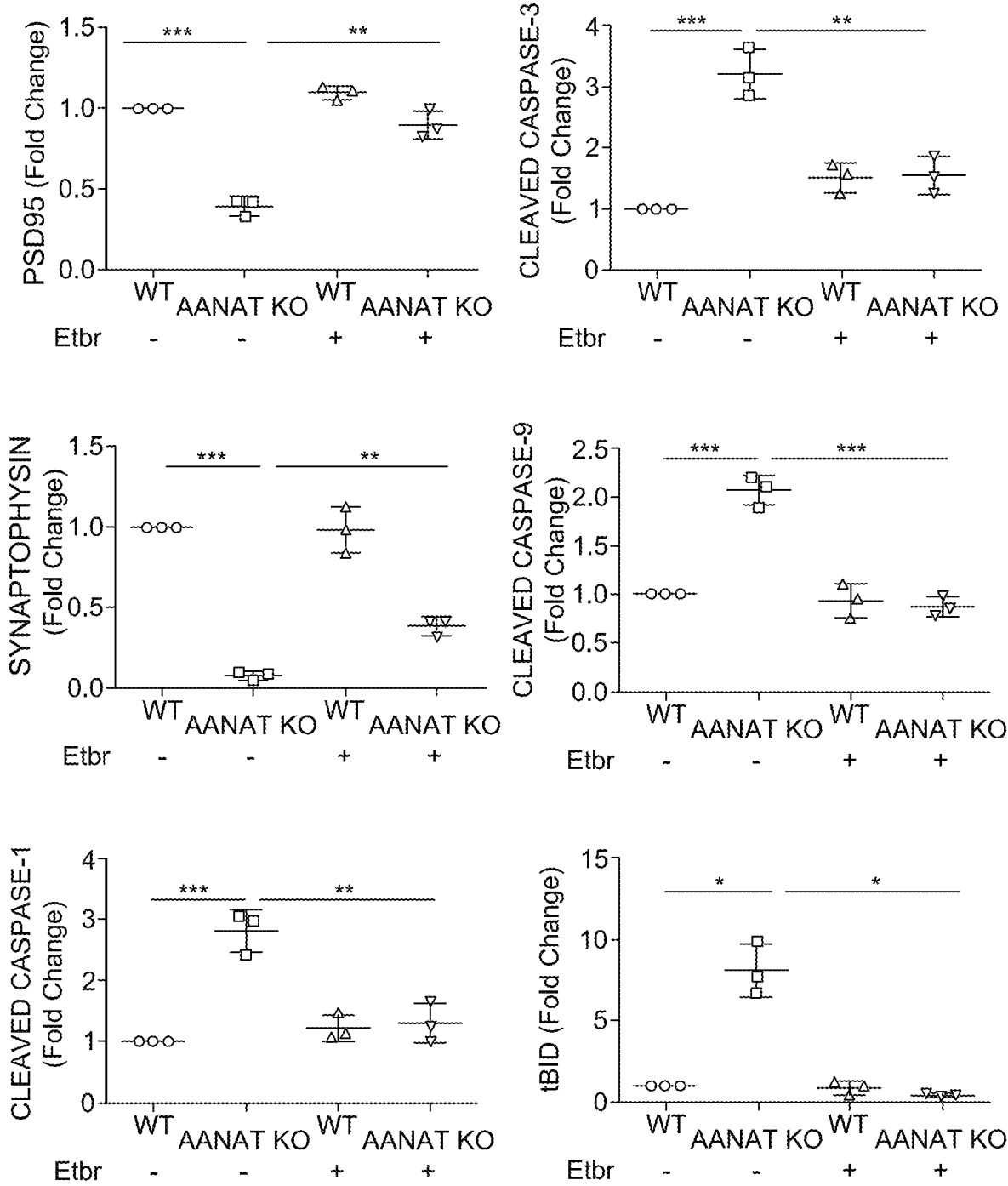

Inhibition of Hyper-Inflammatory Response in mtDNA Depleted AANAT-KO Differentiated Neurons To evaluate the role of cytosolic mtDNA in the inflammatory phenotype of N2a cells, the mtDNA was depleted. WT and AANAT-KO N2a cells were cultured with ethidium bromide (EtBr) to generate mtDNA deficient N2a cells (ρ0). Chronic EtBr exposure results in reduction of mtDNA. An EtBr dose dependent depletion of mtDNA in N2a cells was confirmed (FIG. 8A-C). MtDNA release was decreased in ρ0 AANAT-KO neurons (FIG. 9A). mtDNA depletion in AANAT-KO neurons reduced proinflammatory cytokine secretion (FIG. 9B). Moreover, caspase-1, caspase-3 and caspase-9 activation and bid cleavage were inhibited by mtDNA depletion (FIGS. 9C and D). These data point to cytosolic mtDNA in neurons as a key proinflammatory mediator. mtDNA depletion did not alter mitochondrial ROS or MMP indicating that mtDNA release is downstream to mitochondrial ROS production and decrease in MMP and upstream from inflammatory signaling (FIGS. 8D and E).

Given the impact of mtDNA reduction on activation of inflammatory pathways and the connection between inflammatory signaling and synaptic pruning, the role of mtDNA on synaptic dynamics was evaluated. mtDNA depleted AANAT-KO neurons demonstrated synaptic preservation, as measured by PSD95 and Synaptophysin (protein and mRNA), similar to what was observed with exogenous melatonin (FIGS. 9C and D, and FIG. 8F). These results link mtDNA release with inflammation and synaptic degeneration.

DNAse1 Inhibits the Inflammatory Response in HD

Figure 10A:
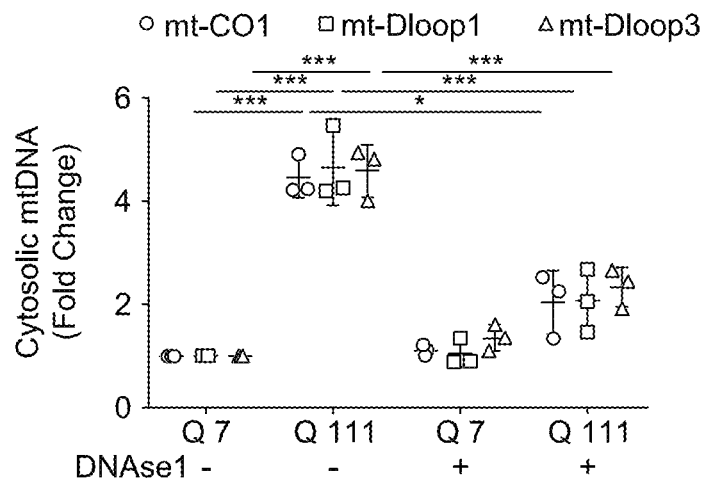
FIG. 10: DNAse1 decreases expression of pro-inflammatory cytokine secretion in HD. (A) qPCR analysis of cytosolic mtDNA in differentiated Q7 and Q111 cells transfected with DNase 1 or lactate dehydrogenase (LDH) as a control using mt-CO1, mt-Dloop1 and mt-Dloop3. Cytosolic mtDNA is plotted relative to the control transfected Q7 differentiated neurons after normalization to β-actin in the corresponding total DNA sample, N=3. (B) Analysis of mitochondrial ROS by Mitosox in Q7 and Q111 differentiated neurons transfected with control LDH or DNase 1. Mitosox fluorescence intensity is presented relative to fluorescence in Q7 differentiated neurons transfected with LDH, N=3. (C) Analysis of MMP by TMRM in Q7 and Q111 differentiated neurons transfected with LDH control or DNase 1, N=3. (D) Representative immunoblots and quantification of cGAS, IRF3, STING and β-Actin in Q7 and Q111 differentiated neurons transfected with LDH or DNase 1, N=3. β-Actin was used as endogenous normalization control. (E) Cytokine ELISA secretion in culture medium of differentiated Q7 and Q111 neurons transfected with LDH or DNAse1 shown as pg cytokine per mL culture medium, N=3. Data is expressed as mean±SD and analyzed by ANOVA followed by Tuckey's test, ns; non-significant, *P<0.05, P<0.01, *P<0.001.
Figure 10B:
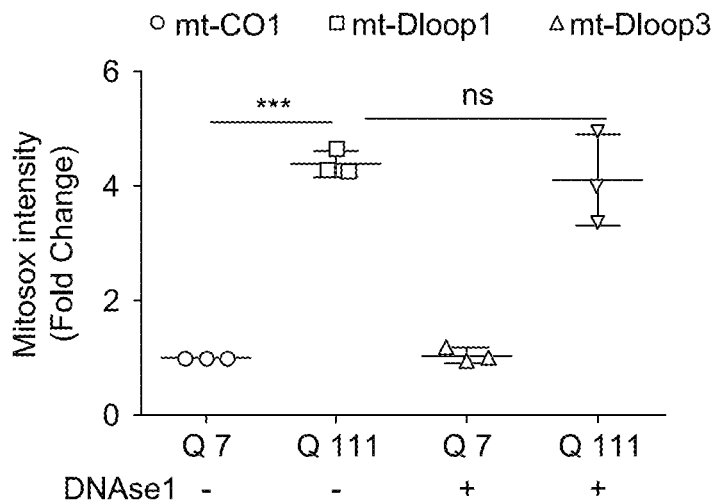
Figure 10C:
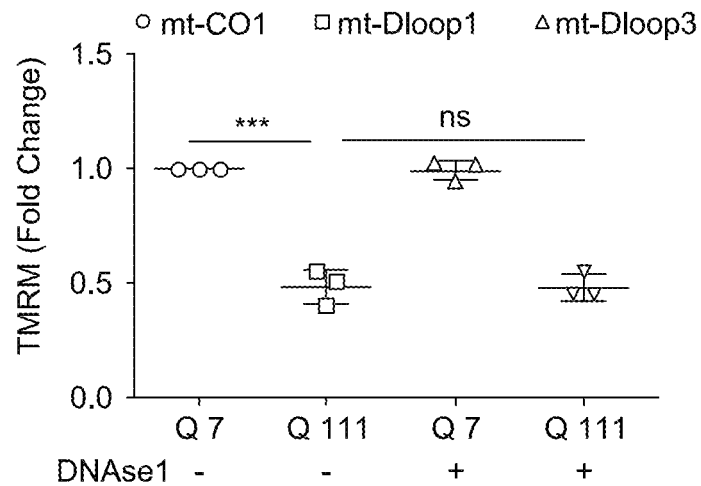
Figure 10D:
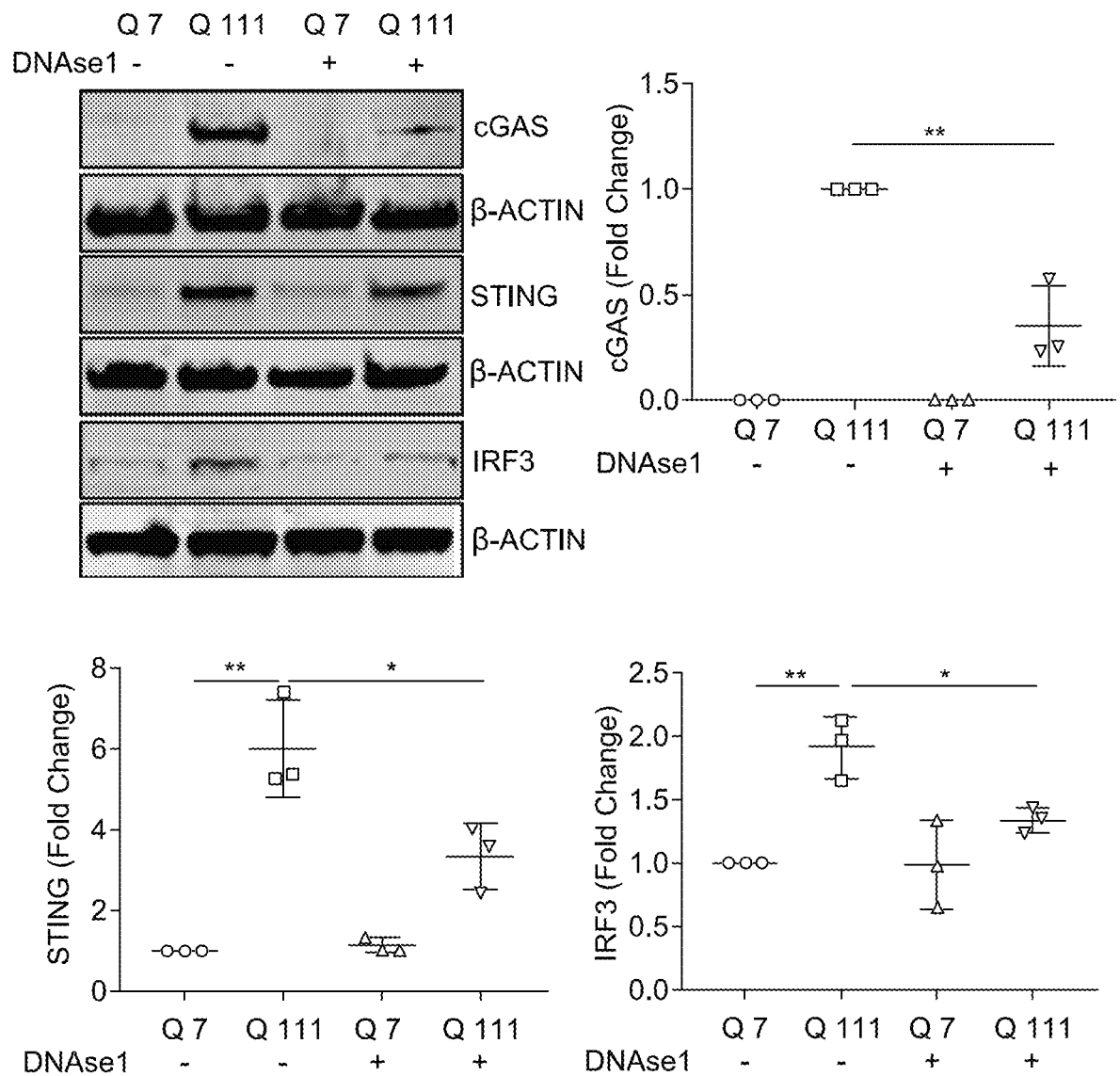
Figure 10E:
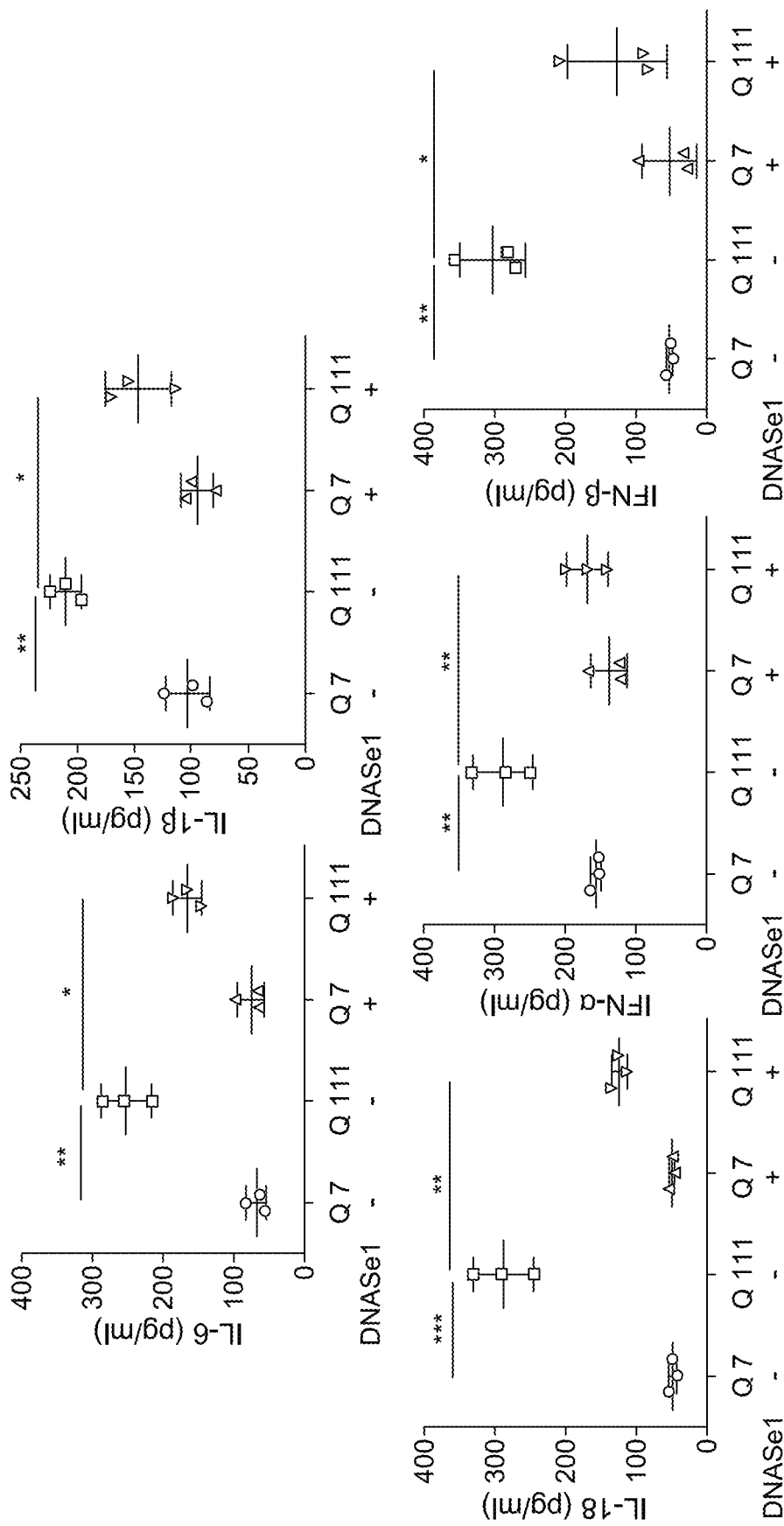
Figure 11:
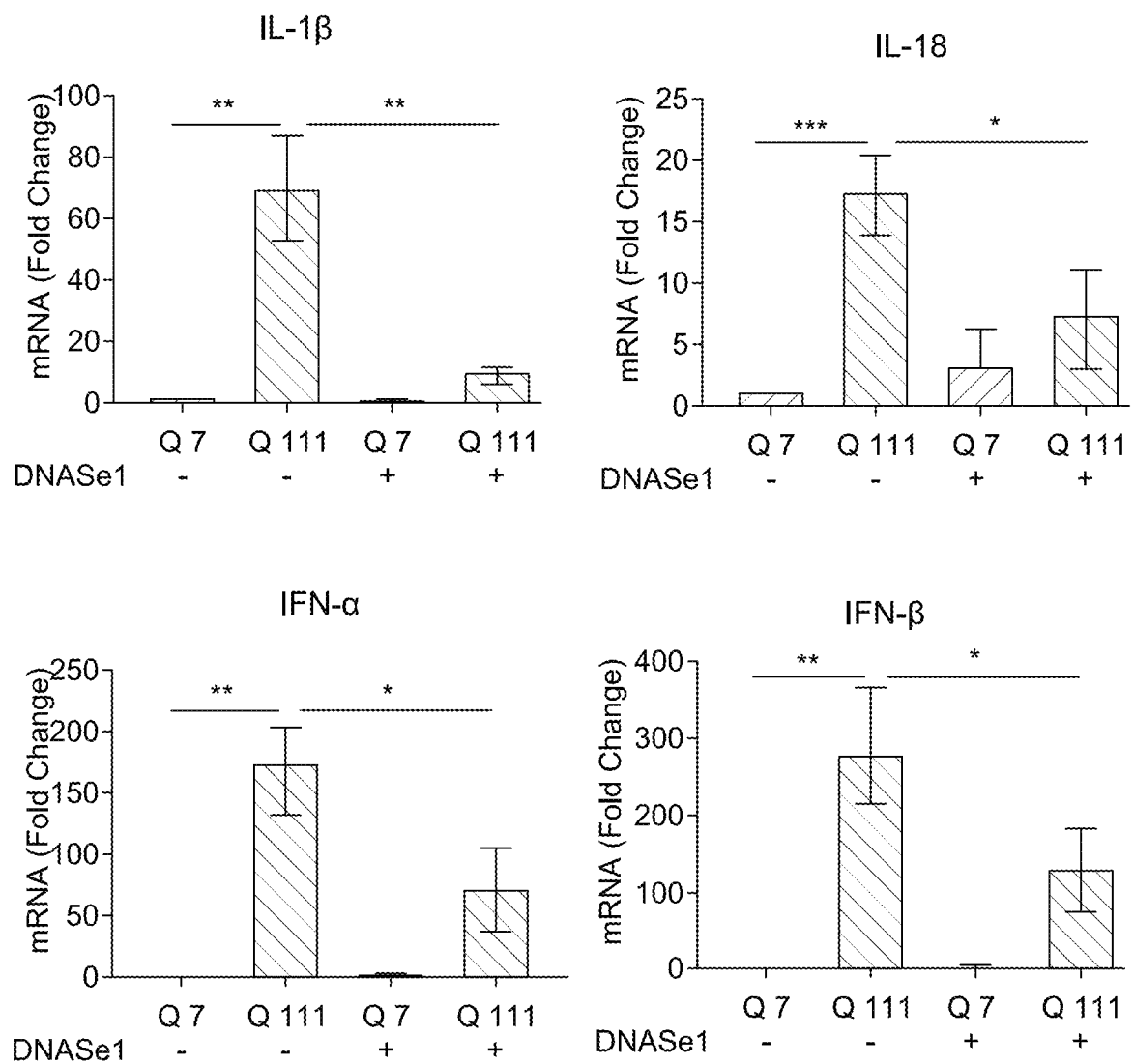
FIG. 11: DNAse1 degrades mtDNA in HD cells. qPCR analysis of mRNA of IL-1β, IL-18, IFN-α and IFN-β in Q7 and Q111 differentiated cells transfected with or without DNAse1. β-actin was used as endogenous control, and mRNA expression is plotted relative to amount in LDH-treated Q7 differentiated cells after normalization to β-actin, N=3. Data are shown as mean±SD analyzed by ANOVA followed by Tuckey's test, ns; non-significant *P<0.05, P<0.01, *P<0.001.

To identify whether cytosolic mtDNA contributes to the inflammatory response in HD, STHdh$^{Q7/Q7}$ (Q7) and STHdh$^{Q111/Q111}$ (Q111 cells) were evaluated for a mutant huntingtin (mHTT)-dependent inflammatory phenotype. Q7 and Q111 are immortalized striatal cells from mice that had an expanded CAG repeat knocked-in the huntingtin gene. These cell express mHTT with 111 glutamine repeats and are used as a cellular HD model. Q7 and Q111 cells were differentiated to mature striatal neurons and evaluated for mtDNA-mediated inflammation. Q111 cells had higher cytosolic mtDNA concentration compared to Q7 cells (FIG. 10A). Q7 and Q111 differentiated neurons were transfected with DNAse1 protein to degrade cytosolic DNA. DNAase1 transfection did not alter elevated ROS and reduced MMP detected in Q111 cells (FIGS. 10B and C), complementing the EtBr experiments demonstrating that mtDNA release is downstream of mitochondrial oxidative stress and MMP dysfunction. cGAS/STING/IRF3 levels in differentiated Q111 neurons were increased, an effect inhibited by DNAse1 (FIG. 10D). In addition, proinflammatory cytokine secretion, which was increased in Q111 differentiated neurons, was inhibited by DNAse1 (FIG. 10E and FIG. 11). Therefore, cytosolic mtDNA mediates mHTT-induced cGAS pathway upregulation/activation.

Inflammatory Response in HD is Mediated by cGAS

Figure 14A:
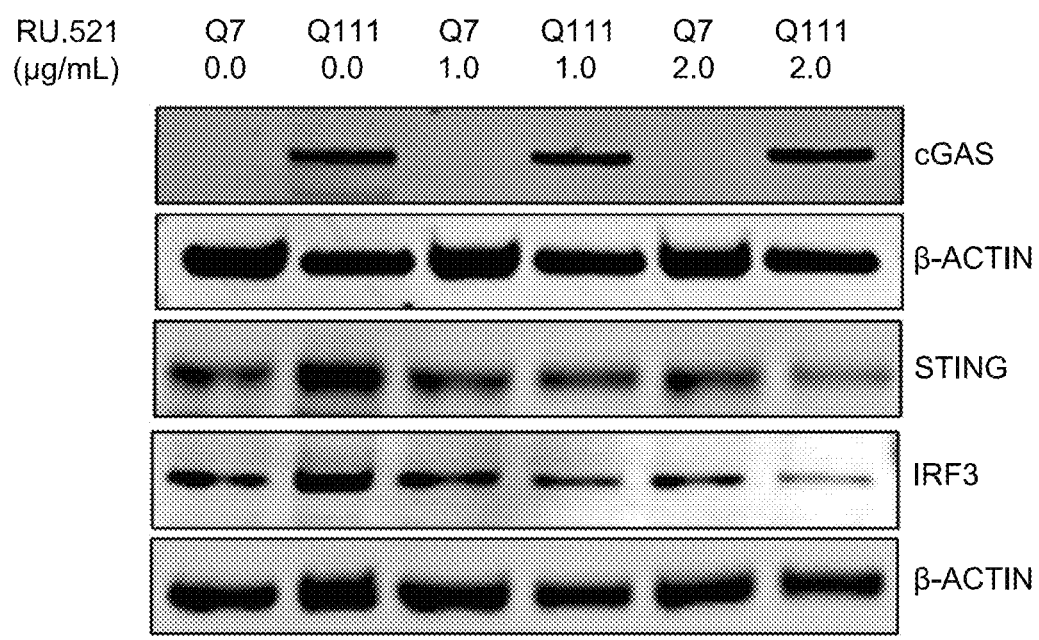
FIG. 14: cGAS mediate mtDNA induced inflammation. (A) Representative immunoblots and (B) quantification of cGAS, IRF3, STING and β-Actin in Q7 and Q111 differentiated neurons exposed with RU.521 (cGAS inhibitor). N=3, β-Actin was used as an endogenous normalization control. (C) qPCR analysis of IFN-α and IFN-β mRNA in differentiated Q7 and Q111 cells treated with RU.521. The graph is plotted relative to the Q7 differentiated neurons after normalization to β-actin N=3. Data is expressed as mean±S.D and analyzed by ANOVA, ns; non-significant, *P<0.05, P<0.01, *P<0.001.
Figure 14B:
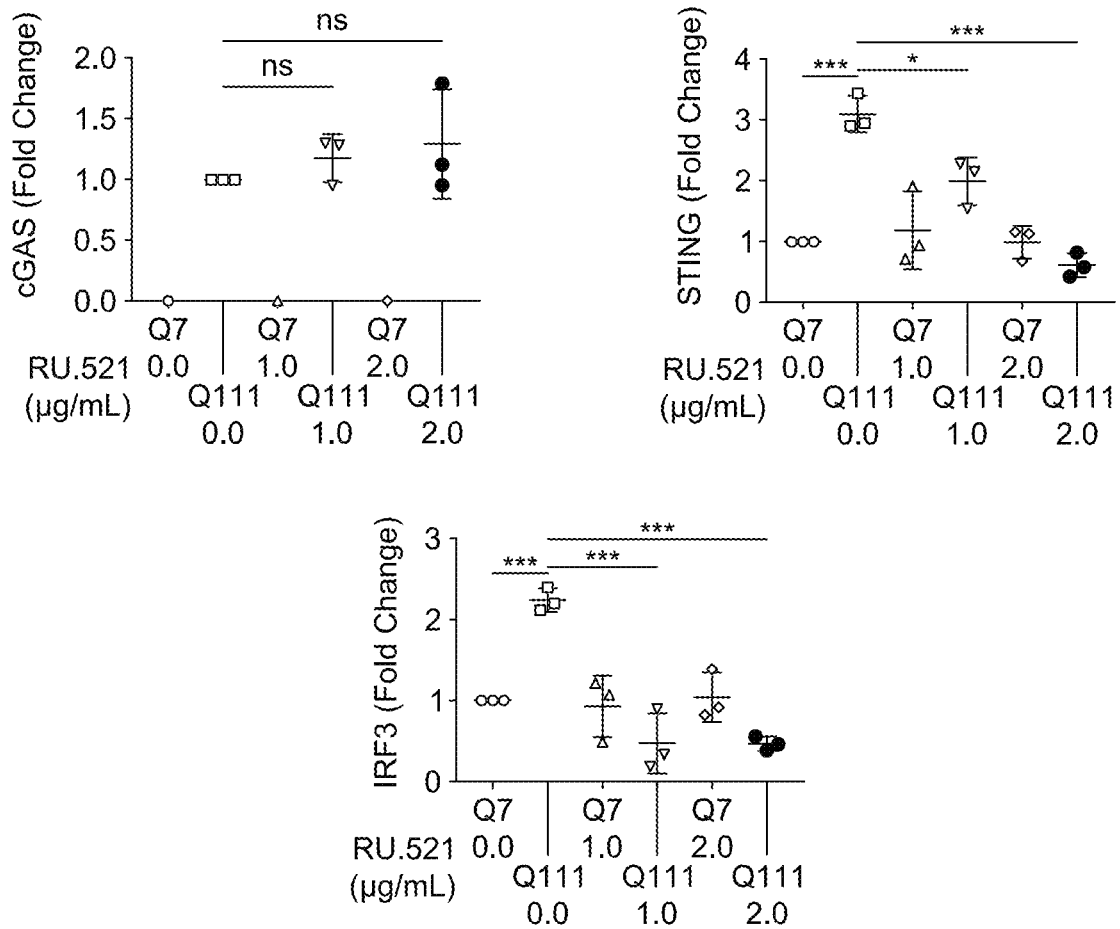
Figure 14C:
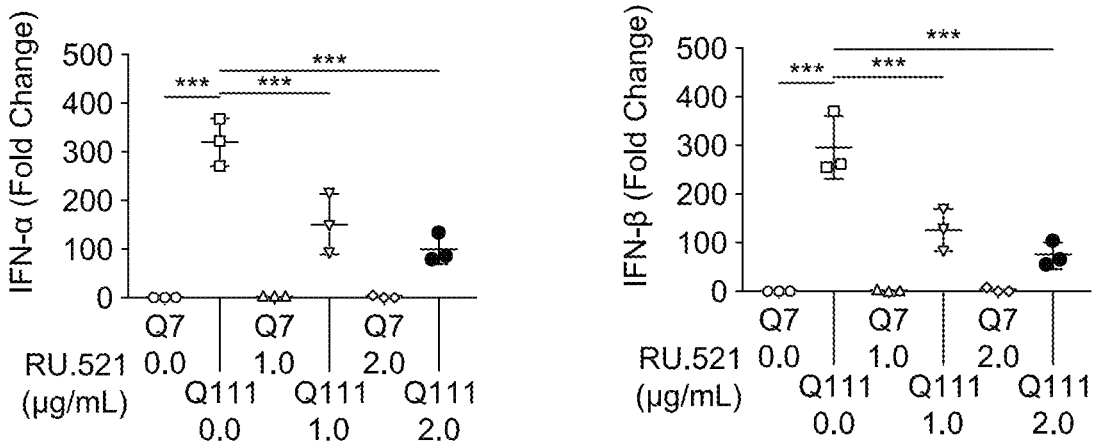

To confirm that inflammatory response is mediated by cGAS, differentiated Q7 and Q111 neurons were treated with RU.521 (cGAS pharmacological inhibitor). RU.521 did not affect cGAS level; however, it reduced STING and IRF3 level in differentiated Q7 and Q111 neurons (FIGS. 14A and B). Moreover, RU.521 exposure also inhibited INF-α and IFN-β levels in differentiated Q7 and Q111 neurons (FIG. 14C). These results further confirm that the inflammatory response induced by cytosolic mtDNA is mediated by cGAS.

Melatonin Regulates mtDNA Mediated Inflammation in HD

Figure 12A:
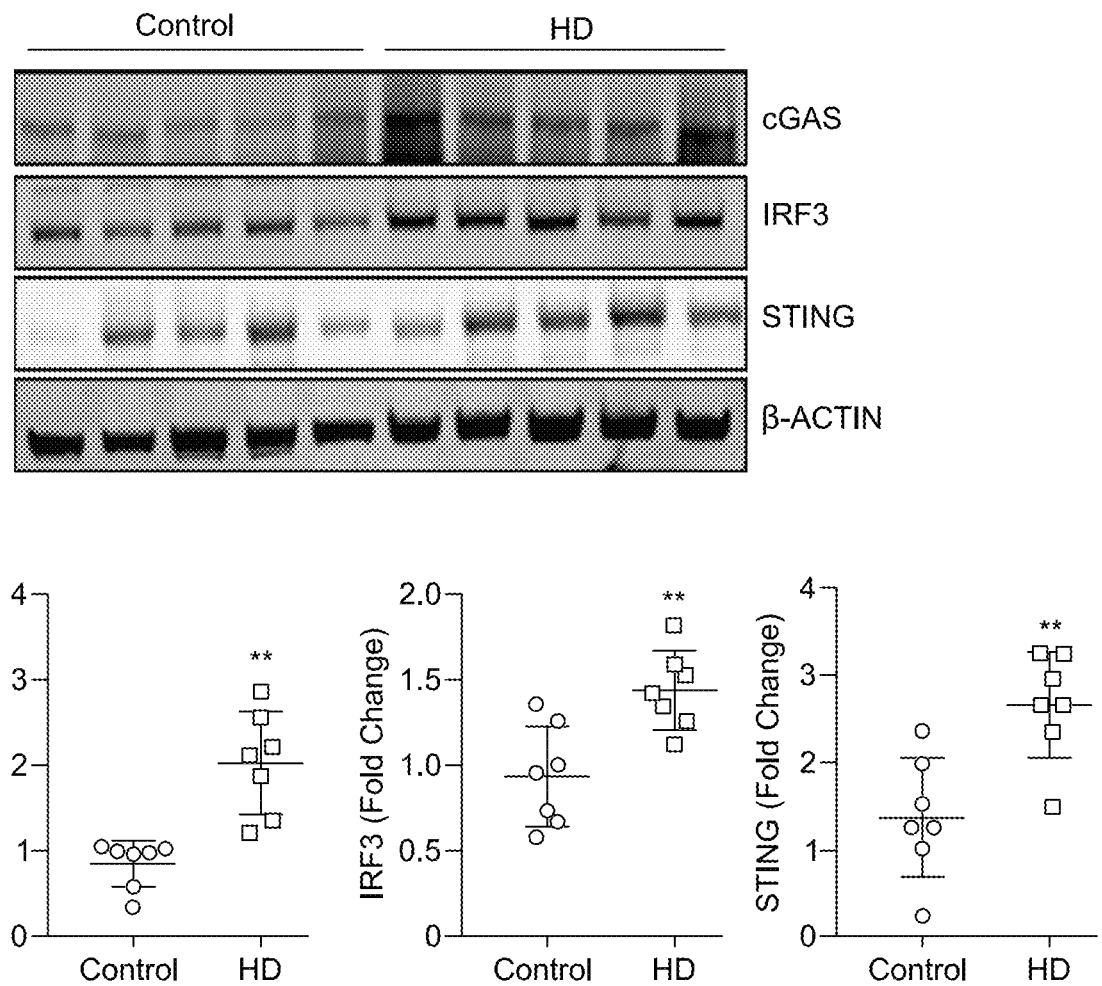
FIG. 12: Melatonin inhibits mtDNA release and inflammation in HD. (A) Representative immunoblots and quantification of cGAS, IRF3, STING and β-Actin in human postmortem brain lysate of control and HD grade 2 striatum. Expression was normalized to β-actin and shown relative to control, N=7. (B) ELISA quantification of 8-hydroxy-2'deoxyguanosine (8-OHDG), a marker of DNA oxidation, in total DNA, non synaptosomal mtDNA and synaptosomal mtDNA in 9-week WT and R6/2 cortical and striatal brain tissue, N=3. (C) qPCR analysis of cytosolic mtDNA in pre-symptomatic (3-week), early symptomatic (6-week) and mid-symptomatic (9-week) WT and R6/2 cortex and striatum. Cytosolic mtDNA is plotted relative to amount of in WT cortex and striatum after normalization to β-actin from the corresponding total DNA sample, N=6. (D) qPCR analysis of cytosolic mtDNA in WT and R6/2 striatum injected with melatonin (30 mg/kg) or vehicle from 6 to 9-weeks of age. Cytosolic mitochondrial genes are plotted relative to WT striatum after normalization to β-actin from the corresponding total DNA sample, N=5. (E) Representative immunoblots and quantification of cGAS, IRF3, STING and β-Actin in 9-week WT and R6/2 striatum injected with melatonin or vehicle. Expression was normalized to β-actin and shown relative to vehicle treated control, N=5. (F) Cytokine ELISA in WT and R6/2 cortex injected with melatonin or vehicle. Data shown as pg cytokine per mg of protein lysate, N=3. Data is expressed as mean±SD and analyzed by Student's t-test (panel A) or ANOVA (panels B-F) *P<0.05, P<0.01, *P<0.001.
Figure 12B:
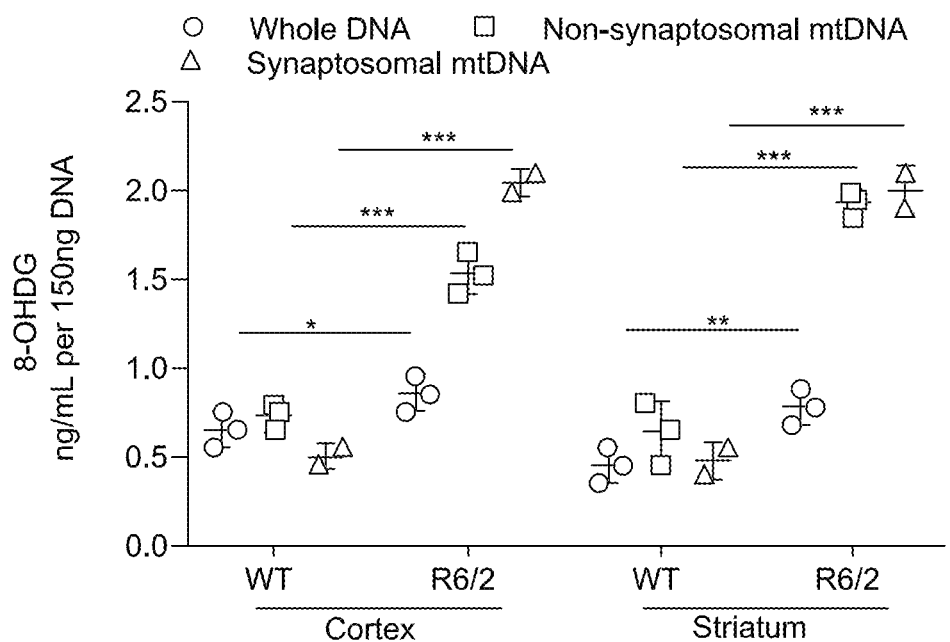
Figure 12C:
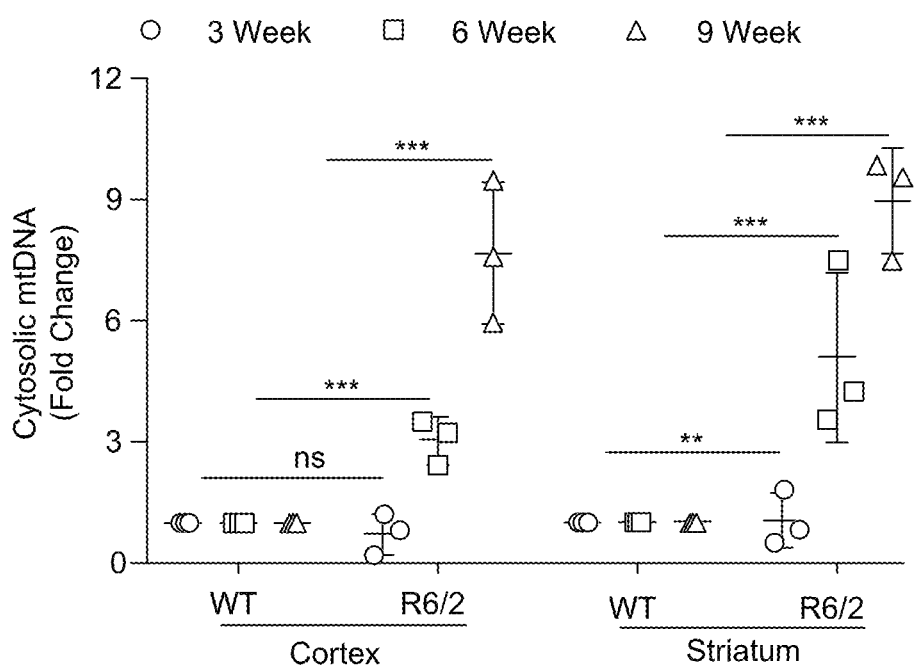

The relationship between mHTT and mtDNA signaling was examined in vivo. To evaluate whether cytosolic mtDNA induces neuroinflammation in HD, a human HD patient's striatum (grade 2) was analyzed and cGAS/STING/IRF3 signaling activation was found (FIG. 12A). The R6/2 mouse model of HD was evaluated at 9 weeks of age (mid symptomatic stage) and mtDNA oxidative damage in cortex and striatum was assessed. WT brain lysates, which possess mtDNA and nuclear DNA have low levels of 8-OHdG (DNA oxidation marker) (FIG. 12B). 8-OHDG demonstrated a 1.4 and 1.6-fold increase in brain DNA cortex and striatum, respectively (FIG. 12B). However, non-synaptosomal mitochondria DNA has 1.8 and 3.5-fold increase 8-OHDG concentrations in R6/2 cortex and striatum, respectively compared to WT (FIG. 12B). In synaptosomal mitochondria, the level of oxidized DNA is 3.7 and 3.9-fold higher in R6/2 cortex and striatum, respectively, suggesting that synaptic mitochondria are more likely to have damaged DNA (FIG. 12B). Cytosolic mtDNA was then quantified and incremental accumulation of cytosolic mtDNA-associated with disease progression was found (FIG. 12C).

Figure 12D:
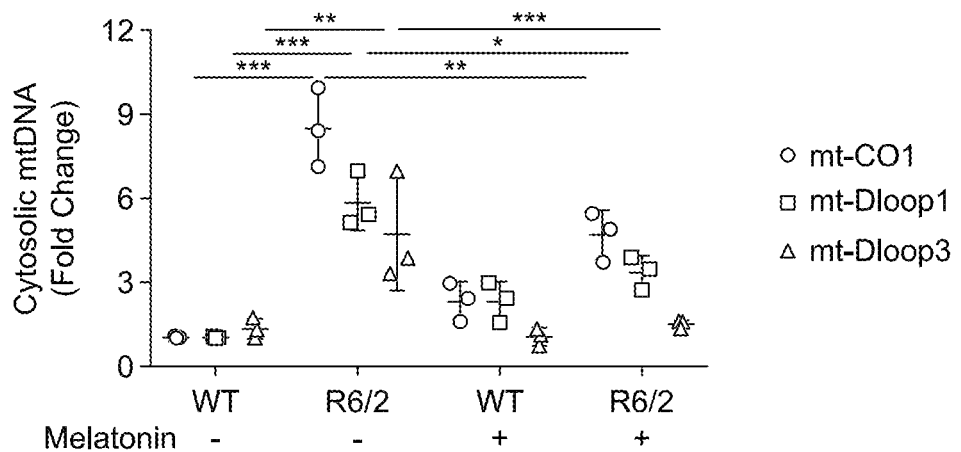
Figure 12E:
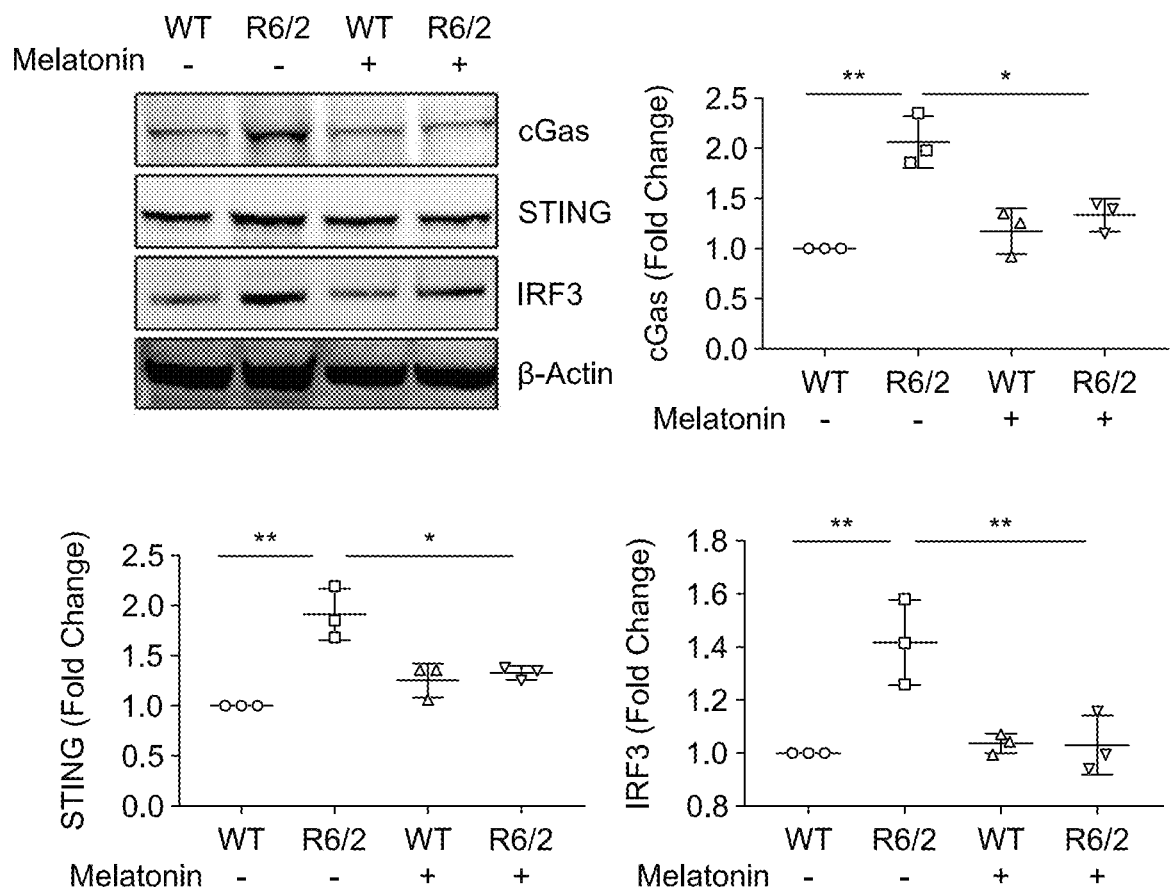
Figure 12F:
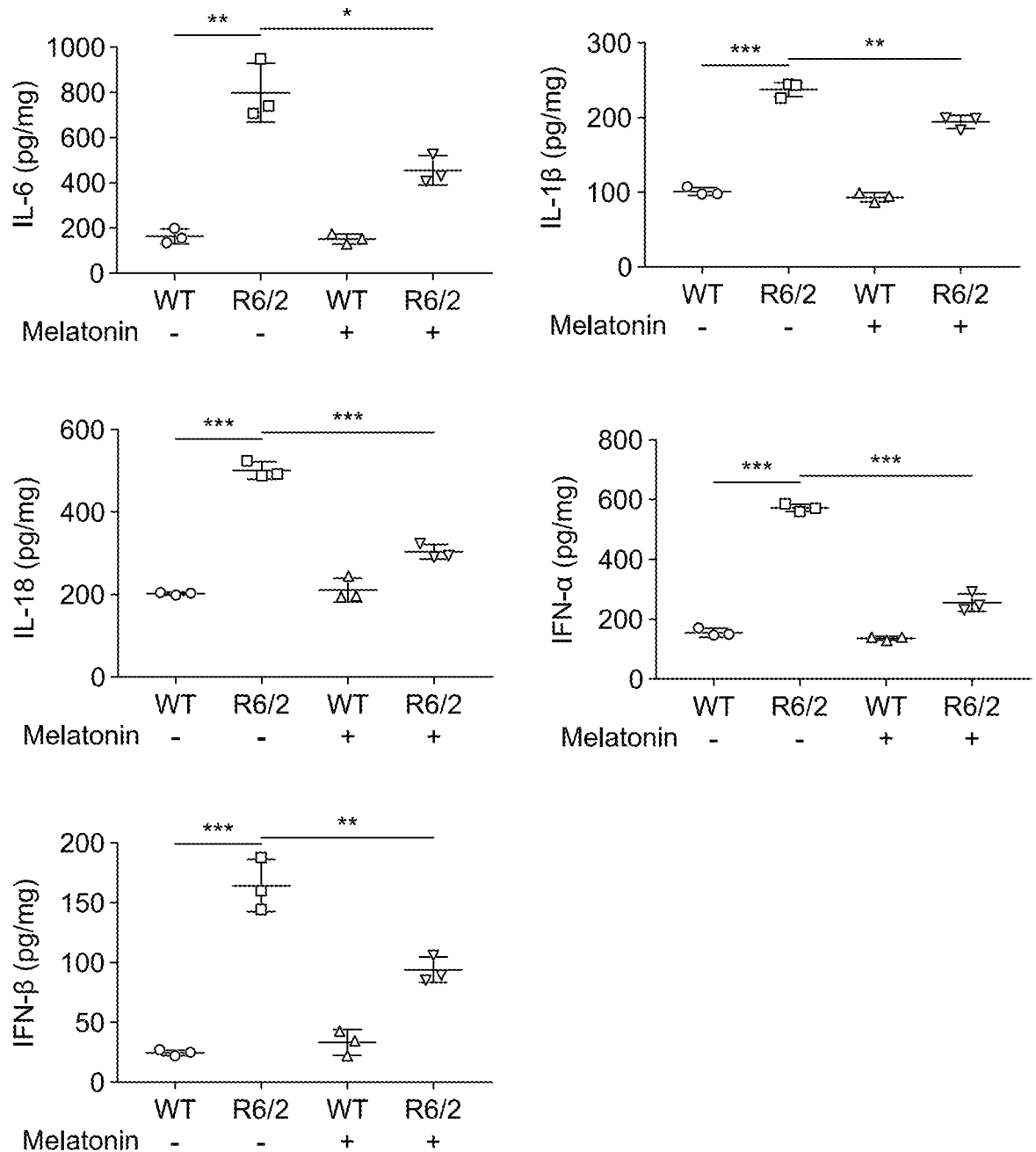
Figure 13A:
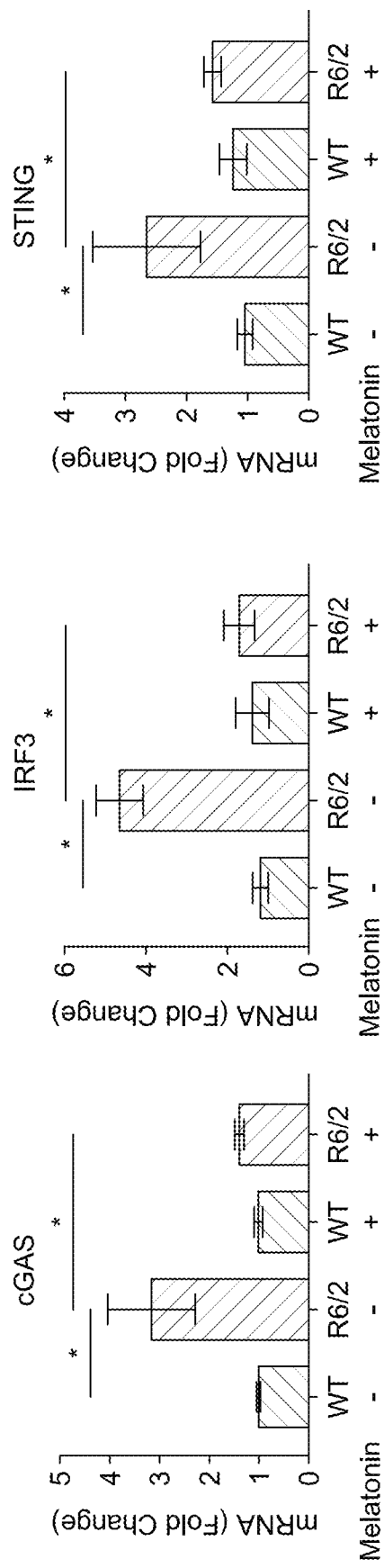
FIG. 13: Melatonin regulates mtDNA-mediated inflammation in HD Striatum. (A) qPCR analysis of mRNA of cGAS, STING, IRF3 in WT and R6/2 striatum with or without melatonin (30 mg/kg) treatment. β-actin was used as endogenous control, the amount of mRNA is presented relative to the amount in vehicle-treated WT striatum after normalization to β-actin, N=3. (B) Quantitative qPCR analysis of mRNA of IL-6, IL-1β, IL-18, IFN-α and IFN-β in WT and R6/2 striatum with or without melatonin (30 mg/kg) treatment. β-actin was used as endogenous control, the amount of mRNA is presented relative to the amount in vehicle-treated WT striatum after normalization to β-Actin, N=3. Data are shown as mean±SD analyzed by ANOVA followed by Tuckey's test, *P<0.05, P<0.01, *P<0.001.
Figure 13B:
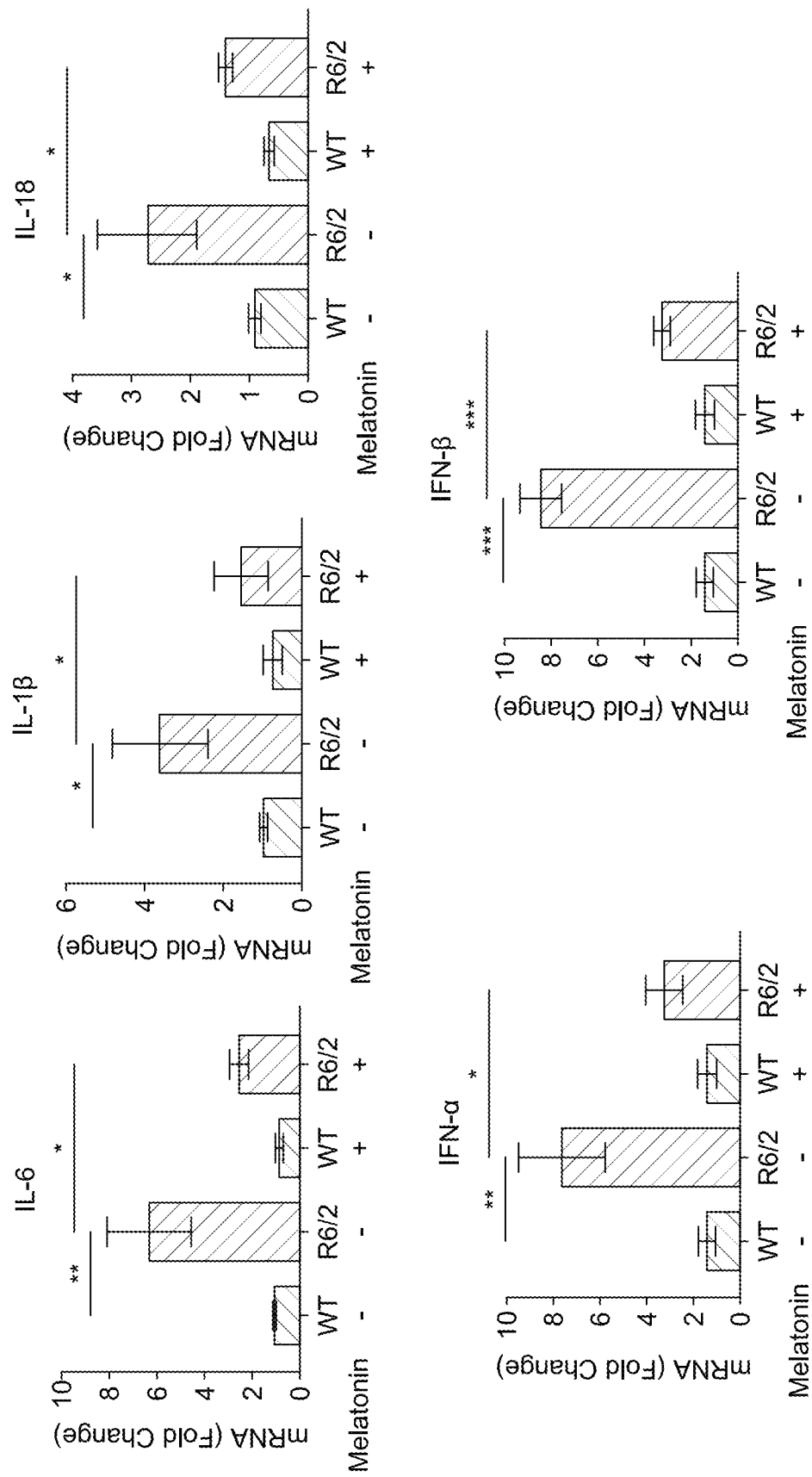

Since melatonin is protective in R6/2 mice and melatonin is deficient in humans with HD, it was evaluated whether exogenous melatonin reduces mtDNA release and consequent inflammation. Six-week old R6/2 mice were injected with melatonin daily for 3 weeks. Melatonin inhibited mtDNA release and ameliorated cGAS/STING/IRF3 upregulation in cortex and striatum in 9-week R6/2 mice (FIGS. 12D and E, and FIG. 13A). Consistent with the inhibition of the master inflammatory regulators caspase-1 and cGAS, melatonin also reduced expression of pro-inflammatory cytokines in R6/2 brain (FIG. 12F and FIG. 13B).

Methods

Materials

Commercially available materials used are as shown in Table 1.

TABLE 1

| Reagent or Resource | Source | Identifier |
| --- | --- | --- |
| Antibodies | | |
| Mouse monoclonal anti-β-Actin | Millipore-Sigma | Cat#A5441; RRID |
| Rabbit monoclonal anti-cGAS | Cell signaling Technology | Cat#31659; RRID |
| Rabbit monoclonal anti-STING | Cell signaling Technology | Cat#50494; RRID |
| Rabbit monoclonal anti-caspase-3 | Cell signaling Technology | Cat#4790; RRID |
| Mouse monoclonal anti-caspase-9 | Cell signaling Technology | Cat#9508S; RRID |
| Rabbit monoclonal anti-pNF-kB | Cell signaling Technology | Cat#3033S; RRID |
| Rabbit polyclonal anti-IRF3 | Proteintech | Cat#11312-1-AP; RRID |
| Rabbit polyclonal anti-TOM20 | Proteintech | Cat#11802-1-AP; RRID |
| Rabbit polyclonal anti-caspase-1 | Proteintech | Cat#22915-1-AP; RRID |
| Rabbit polyclonal anti-PSD95 | Abcam | Cat# ab18258; RRID |
| Mouse monoclonal anti-Cytochrome C | Abcam | Cat#ab110325 |
| Mouse monoclonal anti-mt-CO1 | Abcam | Cat# ab 14705; RRID |
| Mouse monoclonal anti-Synaptophysin | Santacruz biotechnology | Cat# sc-17750; RRID |
| Goat polyclonal anti-BID | R&D Systems | Cat# AF860-SP; RRID |
| Mouse monoclonal anti-8'-OHDG | Stressmarq Biosceinces | Cat# SMC-155; RRID |
| Mouse monoclonal anti-βIII-tubulin | Millipore-Sigma | Cat#T8660 |
| Rabbit polyclonal anti-Map2 | Santacruz Biotechnology | Cat#sc-20172 |
| Chemicals, Peptides, and Recombinant Proteins | | |
| Melatonin | Millipore-Sigma | Cat#M5250 |
| Retinoic Acid | Millipore-Sigma | Cat#R2625 |
| Ethidium bromide | Millipore-Sigma | Cat#E7637 |
| Sodium pyruvate | ThermoFisher | Cat#11360070 |
| Uridine | Millipore-Sigma | Cat# U3003 |
| TMRM | ThermoFisher | Cat#T668 |

TABLE 1-continued

| Reagent or Resource | Source | Identifier |
|---|---|---|
| Mitosox | ThermoFisher | Cat#M36008 |
| Poly-D-Lysine | Millipore-Sigma | Cat#P6407 |
| DCFDA | Millipore-Sigma | Cat# D6883 |
| JC-1 Iodide | Santacruz biotechnology | Cat#CAS47729-63-5 |
| DNaseI | ThermoFisher | Cat#18047019 |
| IBMX | abcam | Cat#ab120840 |
| Forskolin | abcam | Cat# ab 120058 |
| Recombinant Human FGF-acidic | Peprotech | Cat3 100-17A |
| Hoechst stain | Millipore-Sigma | Cat#B2883 |
| PowerUP Sybr Green | ThermoFisher | Cat# A25742 |
| Bolt ™ 4-12% Bis-Tris Plus Gels | ThermoFisher | Cat#NW04120BOX |
| Commercial Assays | | |
| Reagent Protein Delivery Pulsin | Polyplus | Cat#89129-956 |
| Mitoprobe transition pore assay Kit | ThermoFisher | Cat# M34153 |
| Protein Carbonyl Content Assay Kit | Millipore-Sigma | Cat# MAK094 |
| Lipid Peroxidation (Mda) Assay Kit | Millipore-Sigma | Cat#MAK085 |
| RNeasy Kit | Qiagen | Cat#74104 |
| DNeasy blood and Tissue Kit | Qiagen | Cat#69504 |
| High Capacity Reverse Transcription Kit | ThermoFisher | Cat#4368814 |
| Cell Fractionation Kit - Standard | Abcam | Cat#ab 109719 |
| IL-6 ELISA Kit | ThermoFisher | Cat#BMS603-2 |
| IL-18 ELISA Kit | ThermoFisher | Cat#BMS618-3 |
| IL-1β ELISA Kit | ThermoFisher | Cat#BMS6002 |
| IFN-α ELISA Kit | ThermoFisher | Cat#BMS6027 |
| IFN-β ELISA Kit | ThermoFisher | Cat#424001 |
| DNA Damage (8-OHdG) ELISA Kit | Stressmarq | Cat#SKT-120-96S |
| Experimental Models and Cell Lines | | |
| Neuro-2a Cells | ATCC | ATCC ® CCL-131 |
| STHdh$^{Q7/Q7}$ (Q7) | Coriell Institute | CHDI-90000073 |
| STHdh$^{Q111/Q111}$ (Q111) | Coriell Institute | CHDI-90000072 |

Human Tissues

Striatum samples of grade 2 HD patients, and control patients' samples were obtained. Clinical information of the patients and subjects is indicated in Table 2.

TABLE 2

Human brain tissue information.

| Type | Grade | Specimen | Age | Gender | CAG repeats | Standard brain block (SBB)[1] | Postmortem interval before frozen |
|---|---|---|---|---|---|---|---|
| Control | n.a. | T-110 | 62 | M | N.E. | SBB7.1 | N.E. |
| Control | n.a. | T-133 | 33 | F | N.E. | SBB7.1 | 11:25 |
| Control | n.a. | T-169 | 69 | M | N.E. | SBB6.2 | 49:20 |
| Control | n.a. | T-180 | 53 | F | N.E. | SBB7.2 | 6:07 |
| Control | n.a. | T-638 | 78 | M | N.E. | SBB7.1 | 8:00 |
| Control | n.a. | T-3925 | 79 | F | N.E. | SBB6.1 | 18:50 |
| Control | n.a. | T-5404 | 54 | F | N.E. | SBB6.1 | 16:36 |
| HD2 | 2 | T-461 | 77 | M | 41/15 | SBB7.2 | 19:28 |
| HD2 | 2 | T-3221 | 58 | M | 42/15 | SBB7.2 | 85:11 |
| HD2 | 2 | T-4394 | 75 | F | 41/17 | SBB7.2 | 22:50 |
| HD2 | 2 | T-4498 | 59 | M | 43/17 | SBB6.2 | 32:45 |
| HD2 | 2 | T-4964 | 89 | M | 40/17 | SBB6.0 | 10:35 |
| HD2 | 2 | T-4989 | 75 | F | 42/15 | SBB6.1 | 37:35 |
| HD2 | 2 | T-5263 | 55 | F | 54/30 | SBB6.2 | 30:50 |

Grade—diagnosed HD grade,
Specimen—frozen tissue samples,
Age—years at death,
F—female,
M—male,
N.E.—not estimated,
n.a.—not applicable,
CAG repeats—number of CAG repeats of both alleles.
[1]SBB as described in Vonsattel et al., *Acta Neuropathol* 115:509-532 (2008)

Murine Tissues

R6/2 mice, which carry the promoter sequence and exon 1 of a mutant human HTT gene with approximately 150 CAG repeats, were obtained from JAX (Bar Harbor, ME). A colony was maintained by breeding R6/2 males with B6CBAF1 females (JAX). CAG repeat length was determined for every mouse in the colony and mice with 150+/− 10 CAG repeats were used. PCR genotyping was performed. Three, six and Nine week-old R6/2 mice were used in the experiments.

AANAT-KO mice on CBA and DBA backgrounds were generated using CRISPR-Cas9 methods. CBA/J embryos and DBA/J2 embryos were injected with a mixture of Cas9 mRNA, Aanat-guide1-F sequence TAATACGACTCAC-TATAGGTGATGTTCAACA-TGGGCGTCGTTTTAGA-GCTAGAAATAGCA; SEQ ID NO:1) and Aanat-guide2-F sequence TAATACGACTCACTATAGGGGGAGACAG-CGGTTCCCAACGTTTT-AGAGCTAGAAATAGCA; SEQ ID NO:2). From the injected zygotes, 2-cell embryos were transferred to the oviducts of pseudopregnant female recipients. Potential founder mice were genotyped and those with AANAT deletion were bred with WT to determine germline transmission. Founders with germline transmission were bred with WT to generate heterozygotes. Heterozygotes are bred to generate littermate PCN and F2 KO and WT mice. Tissues were obtained from mice within the colony resulting from age and sex matched offspring of KOxKO or WTxWT F3 breeding.

Brain and Ventricle Size Analysis

Histological staining and stereotactic analysis were done. AANAT-KO and littermate control mice were anesthetized and transcardially perfused with 4% buffered paraformaldehyde. The brains were removed and postfixed in the perfusate for overnight, rinsed in buffer, weighed, and cryoprotected in a graded series of 10 and 20% glycerol/2% dimethyl sulfoxide (DMSO). Frozen serial sections were cut at 50 mm, stored in six-well plates, and stained for Nissl substance by using cresyl violet. Serial-cut coronal tissue sections (every fourth section) from the rostral segment of the neostriatum to the level of the anterior commissure (interaural 5.34 mm/bregma 1.54 mm to interaural 3.7 mm/bregma 0.10 mm were used for volumetric analysis. Images were captured by Nikon E800 microscope with SPOT Flex camera and analysed with NIH ImageJ software.

Melatonin Detection

Mouse pineal gland, differentiated N2a cell pellet and isolated mitochondria were re-suspended in 500 µL of 1×PBS solution with protease inhibitor set III (Millipore, 539134) and MAO-A inhibitor (Clorgyline, M3778, SigmaAldrich), followed by sonication on ice (3 strokes each). All samples were analyzed using UPLC-MS/MS. The UPLC-MS/MS method for quantitation of melatonin employs liquid-liquid extraction and detection with a triple quad mass spectrometer. To each sample (0.5 mL) is added 50 L ammonium hydroxide and 10 µL internal standard (d4 melatonin 50 ng/mL). Samples are vortexed and extracted with 2 mL methylene chloride. After centrifugation, the methylene chloride was evaporated under a gentle stream of nitrogen and the residue reconstituted in 50 µl $H_2O$ for injection onto an Acquity UPLC BEH C18 column (2.1×100 mm). Samples are eluted with 2 mM ammonium formate in water and acetonitrile using a gradient from 97:3 (initial water:ACN) to 60:40 over five minutes and maintained at 60:40 for 0.5 minutes before re-equilibration at 97:3. Total run time was 7.5 minutes. Melatonin and the internal standard were detected in the positive mode with a Thermo Fisher TSQ Quantum Ultra mass spectrometer interfaced via an electrospray ionization probe with the Waters UPLC Acquity solvent delivery system. Transitions used for analysis were 237.1→178.1 for d4 melatonin and 233.1→174.1 for melatonin. The method was used to quantify melatonin in brain homogenates, cell culture media, cell lysates, and serum/plasma samples. Calibrators were extracted from PBS buffer, cell culture media or stripped human plasma to match the sample matrix. The lower limit of quantitation is 1 pg/mL.

Cell Culture and Differentiation

N2a cells were obtained from ATCC and grown in DMEM/F12 medium with 10% FBS. AANAT-KO N2a cells were generated as described elsewhere (see, e.g., Suofu et al., *PNAS* 114:E7997-E8006 (2017)). N2a cells were differentiated by exposing them to 10 µM retinoic acid (RA) with 2% fetal bovine serum (FBS) for 8 days. Every alternate day, the culture medium of differentiating N2a cells was replaced with fresh medium containing 10 µM of RA. N2a cells were treated with 5 µM melatonin during differentiation to evaluate the effect of melatonin in WT and AANAT-KO N2a differentiated neurons. Fresh melatonin was added with RA every alternate day for 8 days. All experiments were performed in 8-day-differentiated neurons with or without melatonin. STHdh$^{Q7/Q7}$ (Q7) STHdh$^{Q111/Q111}$ (Q111) cells were grown in MEM culture medium with 10% FBS. Differentiation of Q7 and Q111 cells was induced by exposing cells to 10 ng/mL α-FGF, 250 µM 3-isobutyl-1-methylxanthine (IBMX), 200 nM phorbol 12-myristate 13-acetate (TPA), 50 µM forskolin and 10 µM dopamine for 2 days. AANAT-KO and littermate WT primary cerebro-cortical neuron (PCN) cultures were prepared from embryonic day (E) 15.5 embryos, as described elsewhere (see, e.g., Yano et al., *Nature neuroscience* 17:822 (2014)).

Generation of mtDNA-Deficient Cells

To generate the mtDNA deficient phenotype, N2a cells were grown in DMEM/F12 supplemented with 10% (vol/vol) FBS, 100 µg/mL pyruvate, 50 µg/mL uridine and 1 µg/mL ethidium bromide for 3 weeks. mtDNA depletion was evaluated by quantitative real-time PCR and immunoblots of mtDNA-encoded proteins.

Immunostaining

Cells were fixed in 4% paraformaldehyde in PBS for 10 minutes, permeabilized with 0.1% Triton X-100 in PBS for 15 minutes at room temperature, and subjected to immunofluorescence with the indicated primary and secondary antibodies. Samples were imaged with the Olympus IX-81-DSU in confocal mode.

Reactive Oxygen Species (ROS), Mitochondrial Membrane Potential (AIMP), Mitochondrial Permeability Transition (MPT) Assays ROS accumulation in cells was estimated by either DCFDA for total ROS or Mitosox for mitochondrial ROS. Cells were incubated in 20 µM DCFDA for 45 minutes or 5 µM Mitosox for 15 minutes at 37° C. and fluorescence was measured using plate reader or flowcytometry. For MMP estimation, JC-1 or TMRM were used. Cells were incubated in 2 µg/mL JC-1 or 25 nM TMRM for 30 minutes at 37° C. and fluorescence were measured using plate reader or flow-cytometry. MPT was assayed using MitoProbe™ Transition Pore Assay Kit (Invitrogen) according to the manufacturer's protocol.

Mitochondrial Isolation

Brain mitochondria were isolated by Percoll density centrifugation as described elsewhere (see, e.g., Yano et al., *Nature neuroscience* 17:822 (2014); and Baranov et al., *PNAS* 116:650-659 (2019)). Cellular mitochondria were isolated by using Mitochondria Isolation kit, mouse (Miltenyi Biotec). In brief, 1×10$^7$ cells were collected and centrifuged at 300×g for 5 minutes and washed with PBS. After washing, cells were lysed in 1 mL ice-cold lysis buffer by passing through a 27-gauge needle 15 times on ice. After lysis, lysate was incubated with 50 µL of anti-Tom22 microbeads in 1× separation buffer for 1 hour at 4° C. Further, suspension was then passed through pre-separation filter (Miltenyi Biotec) on LS column and washed with 1× separation buffer. Mitochondria were eluted with IM-2 (Isolation Buffer 2, 225 mM sucrose, 75 mM mannitol, 5 mM HEPES, PH 7.4 at 4° C.) and centrifuged at 13,000×g for 4 minutes at 4° C.

Immunoblotting

Samples (isolated mitochondria or whole-cell lysates) were cleared by centrifugation at 20,000×g, equal amounts of protein were separated on Novex 4-12% gradient polyacrylamide gels (Invitrogen), and proteins transferred overnight onto 0.45 m polyvinylidene difluoride (PVDF) membranes. The membranes were then incubated with the indicated primary antibodies overnight at 4° C. followed by incubation with secondary antibodies (Li-Cor) for 1 hour at room temperature, which were detected using the Odyssey CLx Infrared Imaging System (Li-Cor). Band intensities were quantified using Image Studio (Li-Cor).

RNA Isolation and Quantitative PCR

Total RNA was isolated using the RNeasy Plus kit (Qiagen) and quantified using a ND-1000 spectrophotometer. cDNA was prepared using 1000 ng total RNA by a reverse transcription PCR (RT-PCR) using a high capacity cDNA reverse transcription kit (Applied Biosystems). qPCR was performed on cDNA using SYBR Green chemistry. qPCR was performed on a Biorad CFX touch PCR using Applied Biosystems PowerUp SYBR green master mix. Fold changes in expression were calculated by the ΔΔCt method using mouse β-Actin as an endogenous control for mRNA expression. All fold changes were expressed normalized to the untreated control. Primers used are listed in Table 3.

Mitochondrial In Vitro Protein Import Assay

Ornithine transcarbamylase (OTC) precursor cDNA in pGEM-3Zf(+)-pOTC plasmid was transcribed and translated in vitro using the TNT Coupled Reticulocyte Lysate

TABLE 3

Oligonucleotide/Primers

| Target | Sequence | SEQ ID NO: |
|---|---|---|
| mt-CO1 | F: 5'-GCCCCAGATATAGCATTCCC-3' | 3 |
| | R: 5'-GTTCATCCTGTTCCTGCTCC-3' | 4 |
| mt-Dloop1 | F: 5'-AATCTACCATCCTCCGTGAAACC-3' | 5 |
| | R: 5'-TCAGTTTAGCTACCCCCAAGTTTAA-3' | 6 |
| mt-Dloop3 | F: 5'-TCCTCCGTGAAACCAACAA-3' | 7 |
| | R: 5'-AGCGAGAAGAGGGGCATT-3' | 8 |
| cGAS | F: 5'-ACCGGACAAGCTAAAGAAGGTGCT-3' | 9 |
| | R: 5'-GCAGCAGGCGTTCCACAACTTTAT-3' | 10 |
| STING | F: 5'-GTCCTCTATAAGTCCCTAAGCATG-3' | 11 |
| | R: 5'-AAGATCAACCGCAAGTACCC-3' | 12 |
| IRF3 | F: 5'-CACAAGGACAAGGACGGAG-3' | 13 |
| | R: 5'-ATGCAGAACCACAGAGTGTAG-3' | 14 |
| Caspase-1 | F: 5'-TCTGTATTCACGCCCTGTTG-3' | 15 |
| | R: 5'-GATAAATTGCTTCCTCTTTGCCC-3' | 16 |
| IL-6 | F: 5'-CCACTCACCTCTTCAGAACG-3' | 17 |
| | R: 5'-CATCTTTGGAAGGTTCAGGTTG-3' | 18 |
| IL-1β | F: 5'-ACGGACCCCAAAAGATGAAG-3' | 19 |
| | R: 5'-TTCTCCACAGCCACAATGAG-3' | 20 |
| IL-18 | F: 5'-GCCTCAAACCTTCCAAATCAC-3' | 21 |
| | R: 5'-GTTGTCTGATTCCAGGTCTCC-3' | 22 |
| IFN-α | F: 5'-TCTGTGCTTTCCTGATGGTC-3' | 23 |
| | R: 5'-GGTTATGAGTCTGAGGAAGGTC-3' | 24 |
| IFN-β | F: 5'-CAGCCCTCTCCATCAACTATAAG-3' | 25 |
| | R: 5'-TCTCCGTCATCTCCATAGGG-3' | 26 |
| PSD95 | F: 5'-GTGACAACCAAGAAATACCGC-3' | 27 |
| | R: 5'-TTCACCTGCAACTCATATCCTG-3' | 28 |
| Synaptophysin | F: 5'-AGTGCCCTCAACATCGAAG-3' | 29 |
| | R: 5'-GCCACGGTGACAAAGAATTC-3' | 30 |
| Homer-1 | F: 5'-CAGAGCAAGTTTTCATTGGGC-3' | 31 |
| | R: 5'-TGTGTTCGGGTCAATCTGG-3' | 32 |
| B-Actin | F: 5'-ACCTTCTACAATGAGCTGCG-3' | 33 |
| | R: 5'-CTGGATGGCTACGTACATGG-3' | 34 |

Cytosolic mtDNA Quantification

For measurement of mtDNA in cytosol in cells, cell fractions were prepared using Cell Fractionation Kit (Abcam). For measurement of cytosolic mtDNA in brain, tissues were homogenized in IM buffer (5 mM HEPES-Tris (pH 7.4), 225 mM sucrose, 75 mM mannitol and 1 mM EGTA) and divided into two equal parts. One part is then centrifuged at 1,300×g for 3 minutes and supernatant again spun at 20000×g for 10 minutes. Resultant supernatant was collected as cytosolic fraction. Cytosolic fraction (200 μL) and corresponding total tissue or cellular homogenate were used to isolate cytosolic and total DNA, respectively. The copy number of mtDNA encoding cytochrome c oxidase 1 (mt-CO1), mt-Dloop1 and mt-Dloop3 was measured by quantitative real-time PCR with same volume of DNA solution. Normalization to the nuclear genome was performed using DNA isolated from tissue homogenate using β-actin.

System (Promega) in the presence of [$^{35}$S] methionine (PerkinElmer). Following translation, [$^{35}$S] methionine-labeled pOTC was incubated with isolated mitochondria at 25° C. for the indicated times, and mitochondria containing imported OTC were collected by centrifugation (9,000×g, 10 minutes) and subjected to SDS/PAGE. Mature OTC, which represents the cleaved protein after translocation into the mitochondrial matrix, was quantified by ImageJ (NIH). The data are presented as normalized by input (total [$^{35}$S] pOTC per lane).

Protein Transfection

Q7/Q111 cells were plated in six-well plates a day before protein transfections. Cells were washed twice with warm DMEM without FBS, then transfected for 4 hours at 37° C. with 2 μg/mL DNase I or lactate dehydrogenase as a non-targeted protein control through the use of PULSin reagent (Polyplus transfection). After 4 hours, transfection medium was removed and cells were incubated for 2 hours in complete growth media, and differentiation induced by differentiation media as described above.

Statistics

Statistical analyses were performed with Prism software (GraphPad). Data were obtained from at least three independent experiments and expressed as mean±SEM unless otherwise specified. The Student's t-test was used for parametric data. Paired t-tests were used for experiments with multiple samples from the same source. ANOVA followed by Tuckey's test were used for analysis of more than two groups. P-values less than 0.05 were considered statistically significant (indicated in figures as: *, P<0.05; , P<0.01; *, P<0.001).

Example 2: Characterization of AANAT-KO Mice

AANAT-KO mice were further characterized at 1 year. For each experiment, at least three (N≥3) AANAT-KO mice were examined and at least seven (N≥7) WT were examined.

Figure 15:
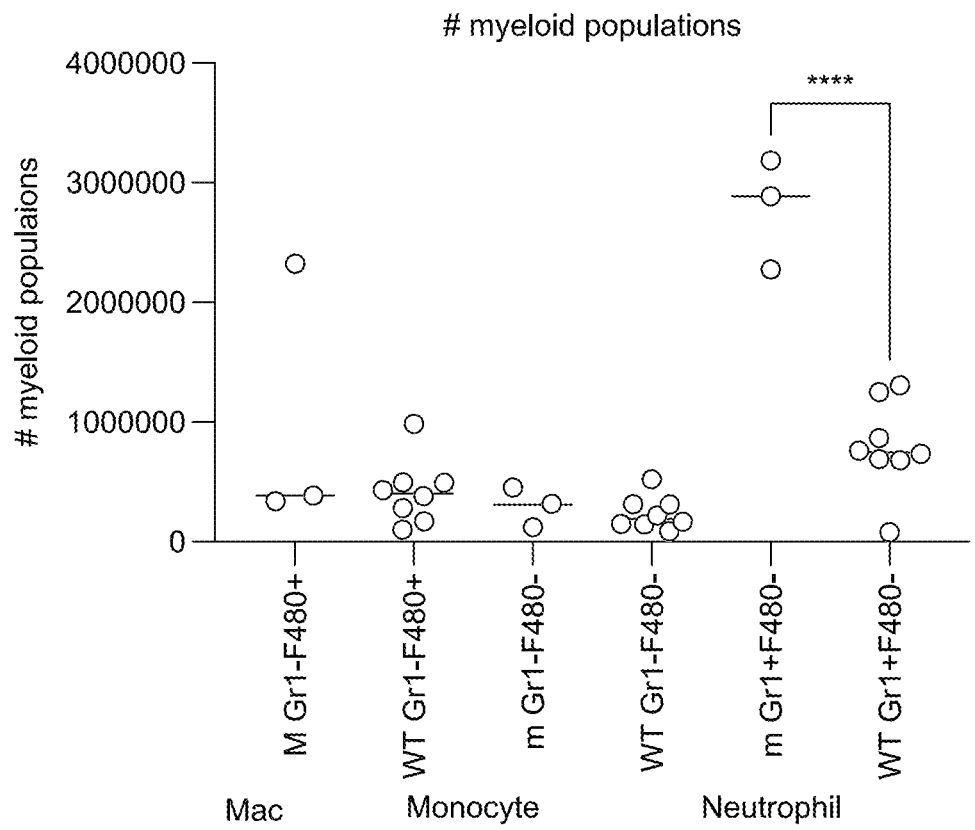
FIG. 15: Immune cytology suggestive of inflammatory dysfunction in 1 year old AANAT-KO mice. *p<0.05; *p<0.001, **p<0.0001.
Figure 15:
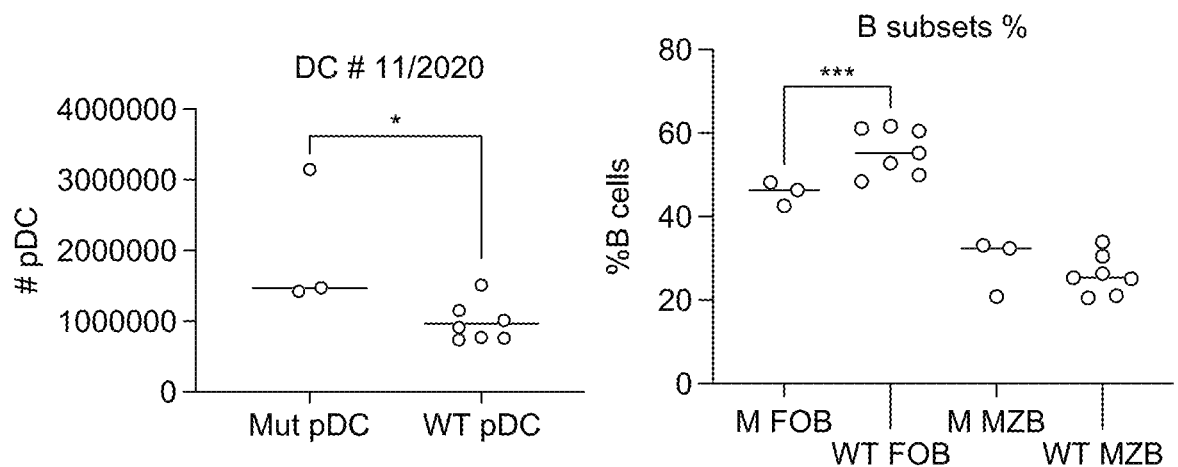

Immune Cytology suggestive of inflammatory dysfunction was examined in 1-year old AANAT-KO mice. 1 year old AANAT-KO, compared to WT, have increased % of B-cells, increased number of dendritic cells, increased number of neutrophils, and increased NK cells (FIG. 15). These data show that, at 1 year of age, AANAT-KO mice have an immune system profile similar to older mice.

Figure 16:
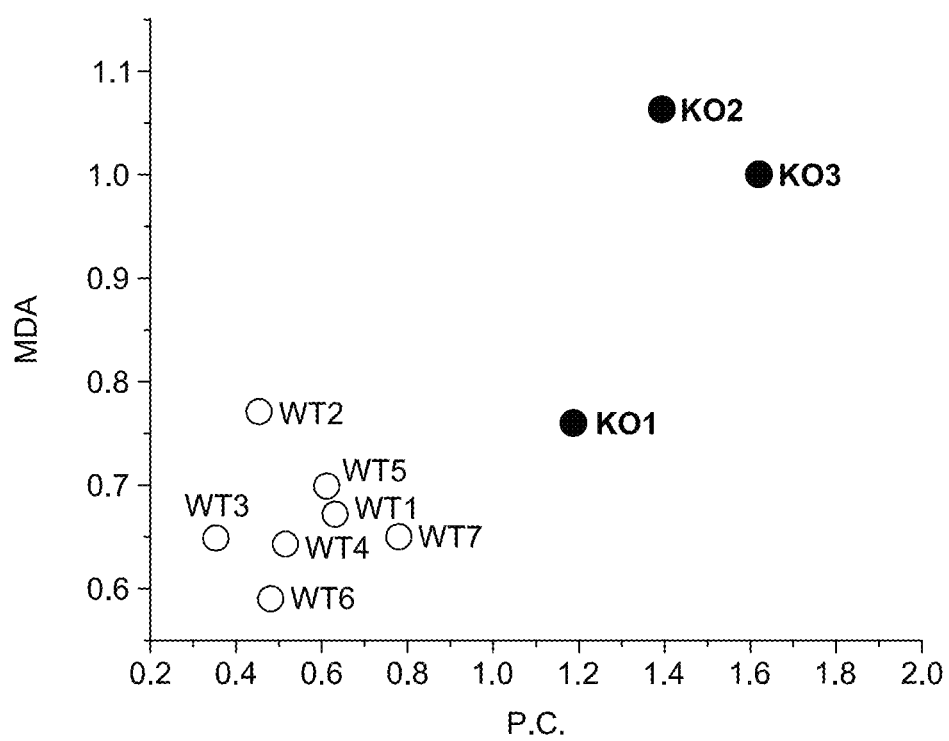
FIG. 16: Lipid oxidation in the brain of 1-year old AANAT-KO mice.

Lipid oxidation was examined in 1-year old AANAT-KO mice. Reactive oxygen species levels increased with age (FIG. 16). Increased lipid oxidation in AANAT-KO mice suggests accumulation of this damage happens faster, consistent with accelerated aging.

Figure 17A:
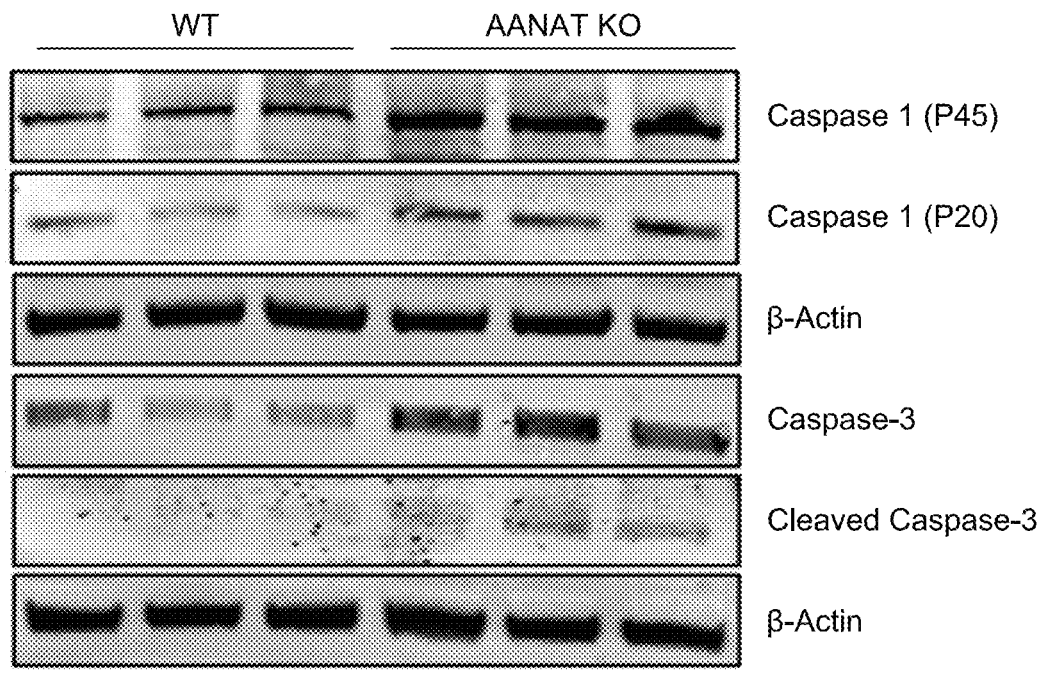
FIG. 17: Increased activation of caspases in the brain of 1-year old AANAT-KO mice. (A) A representative immunoblot and (B) quantifications of the immunoblot. *p<0.05; ***p<0.001.
Figure 17B:
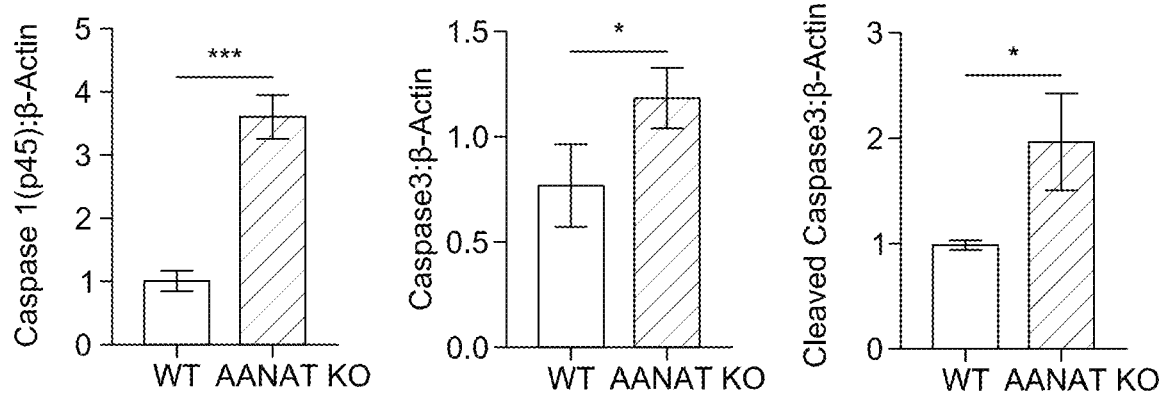

Increased activation of caspases was examined in 1-year old AANAT-KO mice. Caspase activation increased with age (FIG. 17).

Figure 18:
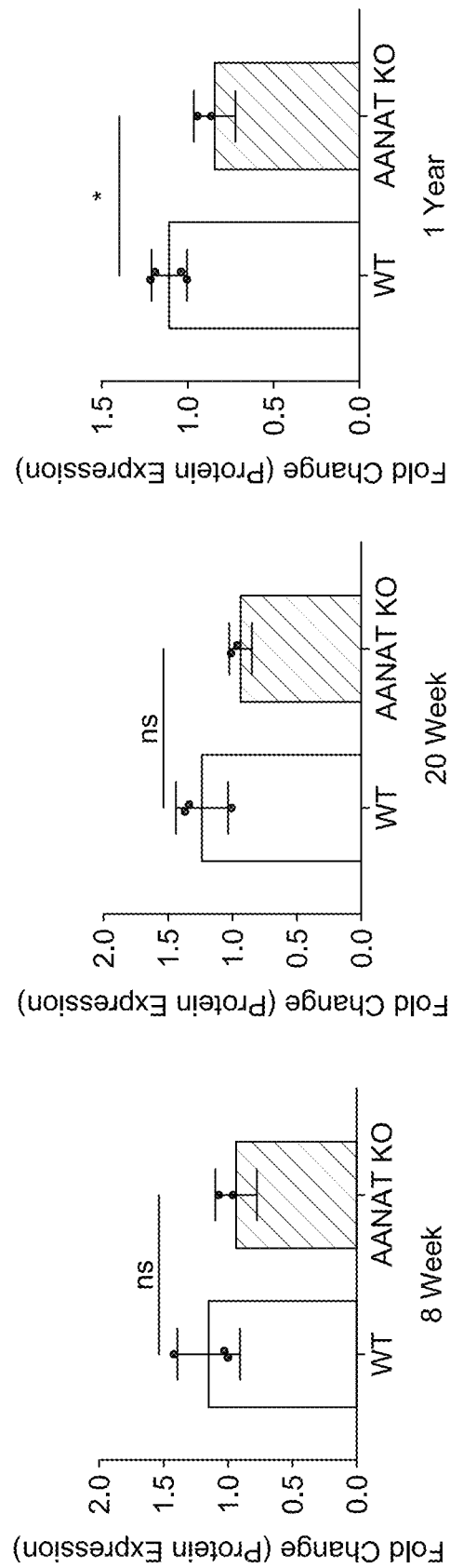
FIG. 18: PCG1α expression in the brain of 1-year old AANAT-KO mice. *p<0.05.

Mitochondrial biogenesis (as indicated by PCG1α polypeptide expression) was examined in 1-year old AANAT-KO mice. Decreased brain mitochondrial biogenesis was observed with age (FIG. 18).

Figure 19:
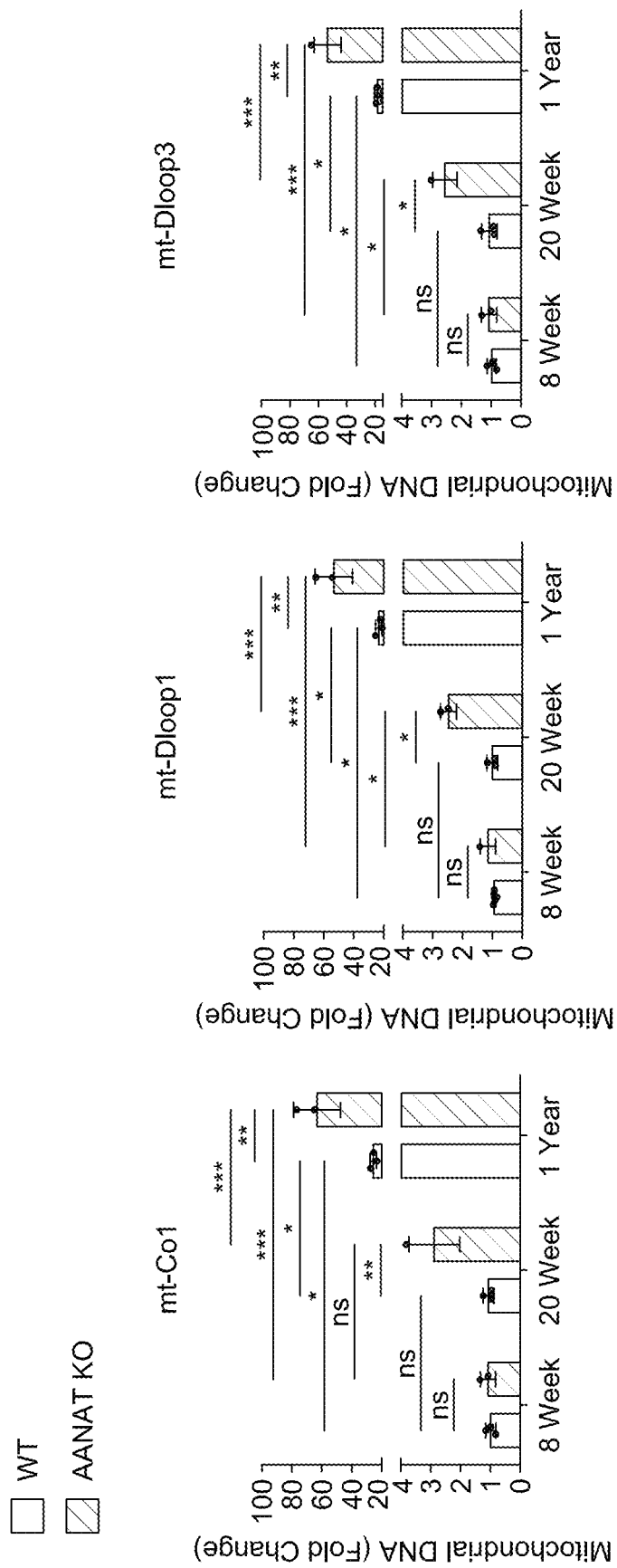
FIG. 19: Mitochondrial DNA in the cytoplasm of 1-year old AANAT-KO mice. *p<0.05; p<0.01, *p<0.001.
Figure 20A:
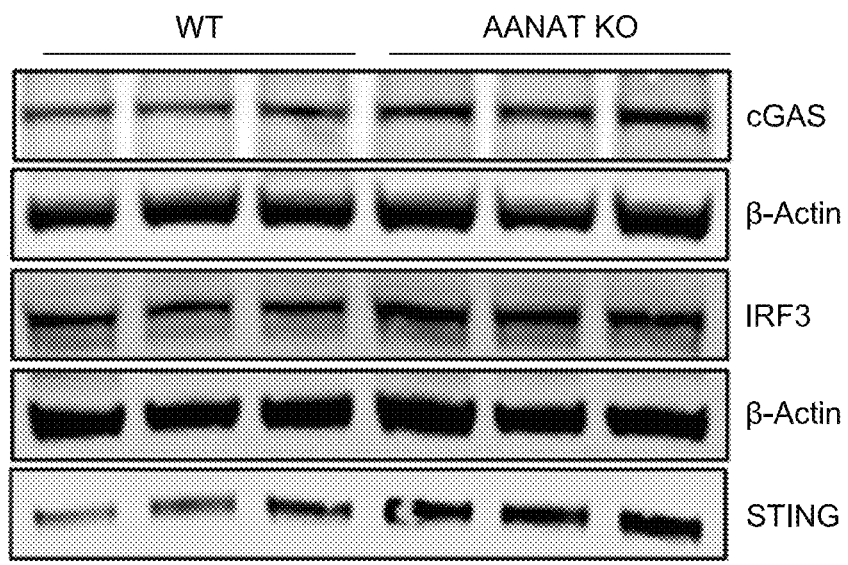
FIG. 20: Activation of the cGAS-STING-IRF3 pathway in the brain of 1-year old AANAT-KO mice. (A and B) Activation of the cGAS-STING-IRF3 pathway as measured in brain proteins (A) A representative immunoblot and (B) quantifications of the immunoblot. (C) Activation of the cGAS-STING-IRF3 pathway (top graph) and downstream cytokines (bottom graph) as measured in brain mRNA by qPCR. *p<0.05; p<0.01, *p<0.001.
Figure 20B:
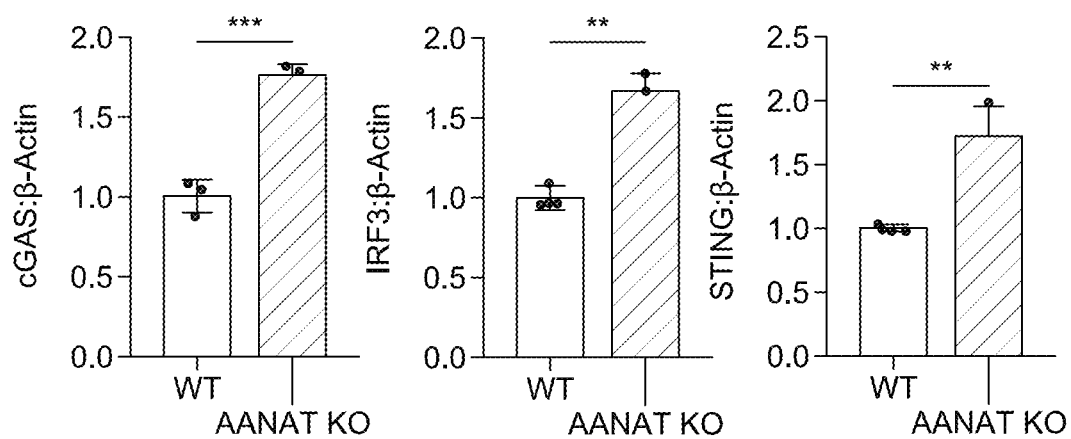
Figure 20C:
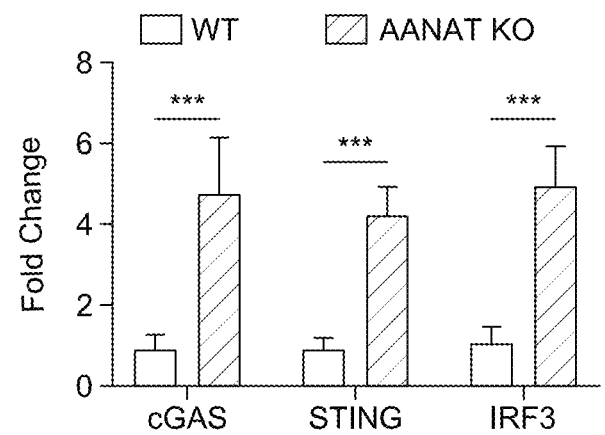
Figure 20C:
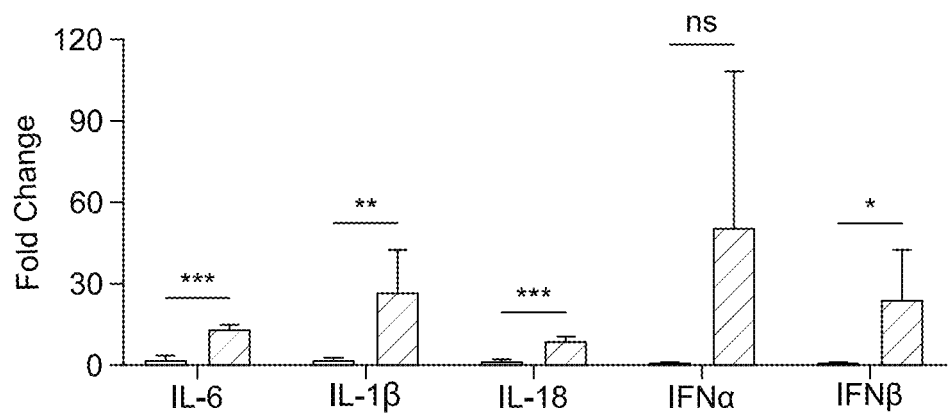

Mitochondrial DNA is released from dysfunctional mitochondria, and mitochondrial DNA release increases with age. Release of mitochondrial DNA into the cytoplasm was examined in 1-year old AANAT-KO mice. Mitochondrial release was accelerated in AANAT-KO mice (FIG. 19).

Activation of cytoplasmic DNA sensing pathways (as indicated by activation of the cGAS-STING-IRF3 pathway and downstream cytokines) was examined in 1-year old AANAT-KO mice. Activation of the cGAS-STING-IRF3 pathway was observed in both brain protein and in brain mRNA (FIG. 20). Activation of the cGAS-STING-IRF3 pathway is consistent with an overactive inflammatory phenotype with age.

Figure 21:
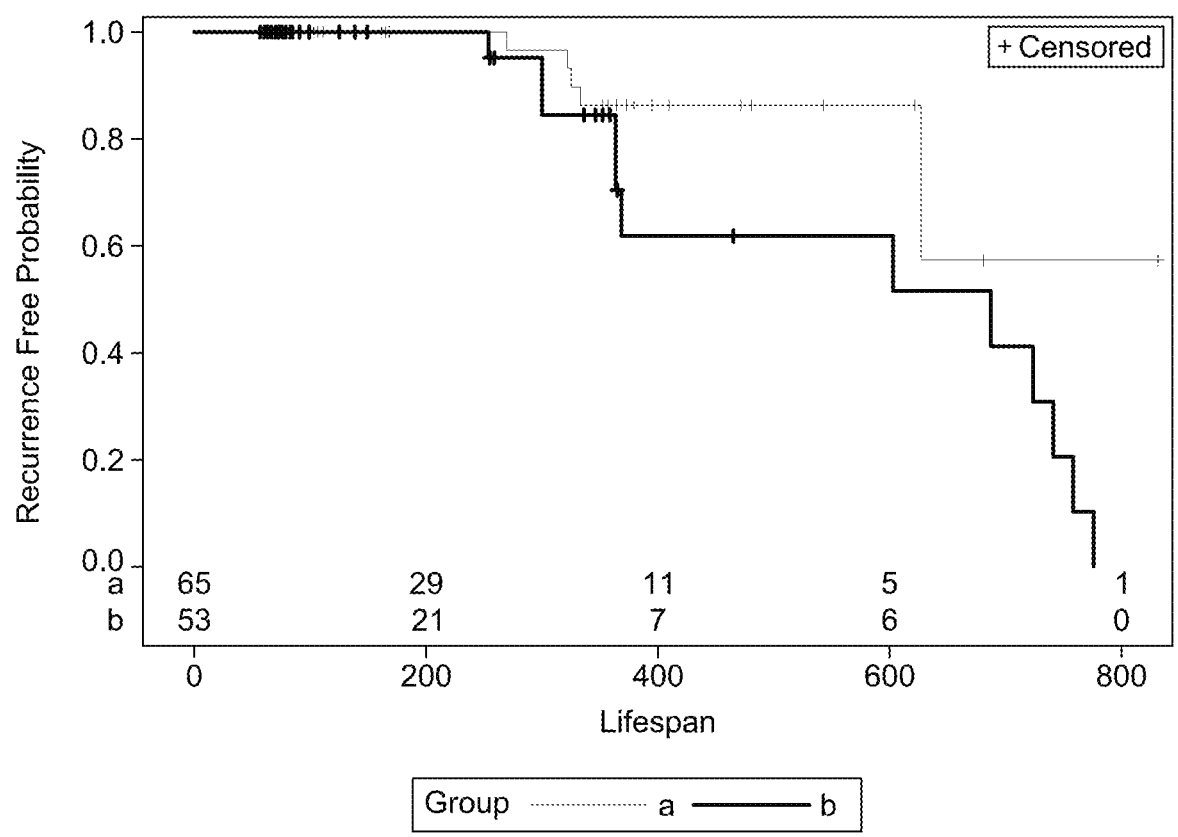
FIG. 21: Kaplan-Meier plot of wild type (group a) and AANAT-KO (group b) mice.

Survival of AANAT-KO mice was also compared to survival of WT mice. WT mice have shorter lifespans than AANAT-KO mice (FIG. 21).

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A genetically engineered mouse whose genome comprises a homozygous disruption in an aralkylamine N-acetyltransferase (AANAT) gene, wherein said mouse expresses decreased amounts of AANAT, exhibits premature neurodegeneration, exhibits less weight gain, exhibits increased cytosolic mitochondrial reactive oxygen species (ROS) damage, and exhibits increased neuroinflammation as compared to a mouse without a disruption in an endogenous AANAT gene.

2. The mouse of claim 1, wherein said mouse comprises a CBA/J genetic background.

3. A method of identifying a molecule capable of slowing the progression of aging, the method comprising:
   a) administering a molecule to the genetically engineered mouse of claim 1;
   b) determining whether the molecule slows the progression of aging in the genetically modified mouse with the disruption in an endogenous AANAT gene as compared to an equivalent genetically modified mouse not given the molecule.

* * * * *